United States Patent
Yamahira et al.

(10) Patent No.: US 7,932,770 B2
(45) Date of Patent: Apr. 26, 2011

(54) CHARGE PUMP CIRCUIT

(75) Inventors: Seiji Yamahira, Kyoto (JP); Yasuhiro Tomita, Osaka (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 12/027,593

(22) Filed: Feb. 7, 2008

(65) Prior Publication Data

US 2008/0186081 A1 Aug. 7, 2008

(30) Foreign Application Priority Data

Feb. 7, 2007 (JP) .................................. 2007-028466
Jan. 17, 2008 (JP) .................................. 2008-008081

(51) Int. Cl.
*H02M 3/00* (2006.01)
*G05F 3/16* (2006.01)

(52) U.S. Cl. .......................................... 327/536; 363/60

(58) Field of Classification Search .................. None
See application file for complete search history.

(56) References Cited

U.S. PATENT DOCUMENTS

| | | | |
|---|---|---|---|
| 4,214,174 A | | 7/1980 | Dickson |
| 5,422,586 A | | 6/1995 | Tedrow et al. |
| 6,107,864 A | | 8/2000 | Fukushima et al. |
| 6,501,325 B1 | * | 12/2002 | Meng .......................... 327/536 |
| 7,023,260 B2 | | 4/2006 | Thorp et al. |
| 7,248,096 B2 | * | 7/2007 | Mensi et al. ................ 327/536 |
| 2002/0130703 A1 | * | 9/2002 | Tsai .............................. 327/536 |
| 2008/0169864 A1 | * | 7/2008 | Yamahira .................... 327/536 |
| 2009/0237149 A1 | * | 9/2009 | Ueda ........................... 327/536 |

FOREIGN PATENT DOCUMENTS

JP 11-098821 4/1999

OTHER PUBLICATIONS

Ker, Ming-Dou, et al., "Design of Charge Pump Circuit with Consideration of Gate-Oxide Reliability in Low-Voltage CMOS Processes," IEEE Journal of Solid-State Circuits, vol. 41 No. 5, May 2006.

Wu, Jieh-Tsorng, et al., "MOS Charge Pumps for Low-Voltage Operation," IEEE Journal of Solid-State Circuits, vol. 33 No. 4, Apr. 1998.

* cited by examiner

*Primary Examiner* — Lincoln Donovan
*Assistant Examiner* — Terry L Englund
(74) *Attorney, Agent, or Firm* — McDermott Will & Emery LLP

(57) ABSTRACT

Each of a plurality of pump stages has an input node and an output node and performs a charge pump operation in response to any one of the first and second clock signals. The plurality of pump stages include a first pump stage, in which a charge transfer transistor is connected between the input node and the output node. One end of a pump capacitor is connected to the output node, and the other end is supplied with one of the first and second clock signals corresponding to the first pump stage. A connection switcher connects to the gate of the charge transfer transistor any one of the output node of a pump stage which is supplied with one of the clock signals corresponding to the first pump stage and the input node of a pump stage which is supplied with the other clock signal not corresponding to the first pump stage and which is included in a pump stage row not including the first pump stage.

10 Claims, 37 Drawing Sheets

CHARGE PUMP CIRCUIT

BACKGROUND OF THE INVENTION

The present invention relates to a charge pump circuit.

In recent years, in nonvolatile memory devices called flash memories, reading/rewriting of data with a single supply voltage or low supply voltage is required, and a charge pump circuit which supplies a pumped voltage or negatively-pumped (pumped-down) voltage is necessary for performing each operation.

The specification of U.S. Pat. No. 5,422,586 (Patent Document 1) discloses a charge pump circuit wherein a charge pump operation is carried out with four clock signals having different phases to generate a pumped voltage. However, this charge pump circuit needs to have a sufficiently large clock margin for appropriately switching the four different clocks and has difficulty in increasing the clock frequency because of complicated clock control.

The specification of U.S. Pat. No. 4,214,174 (Patent Document 2) discloses a charge pump circuit wherein a charge pump operation is carried out with two clock signals having different phases to generate a pumped voltage. However, a transistor for transferring charge is a diode-connected transistor, which disadvantageously decreases the charge transfer efficiency.

With the intention to solve the above problems, IEEE_JOURNAL_OF_SOLID-STATE_CIRCUITS_VOL33_NO. 4_APRIL_1998 (Non-patent Document 1) discloses a charge pump circuit which will be described below.

FIG. 36 shows the structure of a charge pump circuit disclosed in Non-patent Document 1. The charge pump circuit 9 performs a charge pump operation with two clock signals CLK1 and CLK2 having different phases to generate pumped voltage Vpump. The charge pump circuit 9 includes pump cells 91, 92, 93, and 94, a subsidiary pump cell 95, and an anti-backflow circuit 96. The pump cells 91 and 93 (odd-numbered pump cells) receive clock signal CLK1, and the pump cells 92 and 94 (even-numbered pump cells) receive clock signal CLK2. The subsidiary pump cell 95 controls the trailing end pump cell 94. The anti-backflow circuit 96 prevents the backflow of charge.

The pump cells 91, 92, 93, and 94 each includes a charge transfer transistor 901, an off-switch transistor 902, an on-switch transistor 903, and a pump capacitor 904. The off-switch transistor 902 included in each of the pump cells 91, 92, 93, and 94 equalizes the input/output terminal N91, N92, N93 or N94 and the gate potential of the charge transfer transistor 901 such that the charge transfer transistor 901 is turned off. The on-switch transistor 903 turns on the charge transfer transistor 901. The pump capacitor 904 is pumped in synchronization with clock signal CLK1 (or CLK2). A subsidiary pump capacitor 905 is pumped in synchronization with clock signal CLK1 to turn on the charge transfer transistor 901 of the trailing end pump cell 94. A diode-connected transistor 906 transmits to the subsidiary pump capacitor 905 a voltage lower than the voltage of the input/output terminal N96 by a threshold voltage. A subsidiary input terminal N95 is connected to one end of the subsidiary pump capacitor 905 and also connected to the diode-connected transistor 906 and to the trailing end pump cell 94.

Next, the operation of the charge pump circuit shown in FIG. 36 is briefly described with reference to FIG. 37. First, at time T1, clock signal CLK1 transitions to HIGH level so that the voltages at the input/output terminals N92 and N94 and the subsidiary input terminal N95 are increased. Accordingly, in the pump cells 91 and 93, the off-switch transistor 902 becomes conducting, and the charge transfer transistor 901 becomes non-conducting. Meanwhile, clock signal CLK2 transitions to LOW level so that the voltages at the input/output terminals N93 and N96 are decreased. Accordingly, in the pump cells 92 and 94, the on-switch transistor 903 becomes conducting, and the charge transfer transistor 901 also becomes conducting. As a result, charge is transferred from the input/output terminal N92 to the input/output terminal N93 while charge is transferred from the input/output terminal N94 to the input/output terminal N96, so that the voltages at the input/output terminal N93 and the input/output terminal N96 increase.

Then, at time T2, clock signal CLK2 transitions to HIGH level so that the voltages at the input/output terminals N93 and N96 are increased. Accordingly, in the pump cells 92 and 94, the off-switch transistor 902 becomes conducting, and the charge transfer transistor 901 becomes non-conducting. Meanwhile, clock signal CLK1 transitions to LOW level so that the voltages at the input/output terminals N92 and N94 and the subsidiary input terminal N95 are decreased. Accordingly, in the pump cells 91 and 93, the on-switch transistor 903 becomes conducting, and the charge transfer transistor 901 also becomes conducting. As a result, charge is transferred from the input/output terminal N91 to the input/output terminal N92 while charge is transferred from the input/output terminal N93 to the input/output terminal N94, so that the voltages at the input/output terminal N92 and the input/output terminal N94 increase. The increase of the voltage at the input/output terminal N96 results in transfer of charge to the output of the pump cell 94 via the anti-backflow circuit 96, so that pumped voltage Vpump increases. Then, time T3, the same operation as that carried out at time T1 is performed.

In this charge pump circuit, the charge pump operation and charge transfer operation simultaneously occur in the pump cells 91 to 94 so that a long charge transfer duration can be secured. Also, clock signals are easily controlled. Further, the gate potential of the charge transfer transistor 901 which performs the charge transfer operation is controlled, whereby a decrease in charge transfer efficiency can be suppressed.

However, in the charge pump circuit disclosed in Non-patent Document 1, to control the charge transfer transistor of each pump cell to be conducting, the output voltage of the pump cell of the next circuit stage is used, and therefore, the difference in potential between terminals of the charge transfer transistor is large. For example, to render the charge transfer transistor non-conducting, the off-switch transistor is rendered conducting. Accordingly, the difference in potential between the gate and drain of the charge transfer transistor is "2·Vdd". Thus, it is necessary to increase the breakdown voltage of the charge transfer transistor.

The charge pump circuit disclosed in Non-patent Document 1 can suppress the decrease in charge transfer efficiency in the pump cell as compared with the charge pump circuit of Patent Document 2 but uses a diode-connected transistor in the anti-backflow circuit at the trailing end circuit stage of the charge pump circuit, and therefore, the charge transfer efficiency disadvantageously decreases.

SUMMARY OF THE INVENTION

In view of the above circumstances, an objective of the present invention is to provide a charge pump circuit wherein the breakdown voltage limit on charge transfer transistors can be alleviated.

According to one aspect of the present invention, there is provided a charge pump circuit which performs a charge pump operation in response to complementary first and second clock signals to generate a pumped voltage, the charge pump circuit including a plurality of pump stage rows, each of the plurality of pump stage rows including a plurality of pump stages which are cascaded, wherein each of the plurality of pump stages has an input node and an output node and performs a charge pump operation in response to any one of the first and second clock signals, and the plurality of pump stages which are included in any one of the plurality of pump stage rows includes a first pump stage, the first pump stage including a charge transfer transistor connected between the input node and the output node, a pump capacitor, one end of which is connected to the output node, and the other end receiving one of the first and second clock signals corresponding to the first pump stage, and a connection switcher for connecting to the gate of the charge transfer transistor any one of an output node of a pump stage which is supplied with the clock signal corresponding to the first pump stage (which can be the first pump stage) and an input node of a pump stage which is supplied with the other clock signal not corresponding to the first pump stage and which is included in one of the pump stage rows not including the first pump stage.

In the above charge pump circuit, the potential difference between the gate and drain and the potential difference between the gate and source of a charge transfer transistor which is conducting can be small as compared with the conventional techniques. Therefore, the breakdown voltage limit on the charge transfer transistor can be alleviated.

According to another aspect of the present invention, there is provided a charge pump circuit which performs a charge pump operation in response to complementary first and second clock signals to generate a pumped voltage, the charge pump circuit including a plurality of pump stage rows, each of the plurality of pump stage rows including a plurality of pump stages which are cascaded, wherein each of the plurality of pump stages has an input node and an output node and performs a charge pump operation in response to any one of the first and second clock signals; and the plurality of pump stages which are included in any one of the plurality of pump stage rows includes a first pump stage, the first pump stage including a charge transfer transistor connected between the input node and the output node, a pump capacitor, one end of which is connected to the output node, and the other end receiving one of the first and second clock signals corresponding to the first pump stage, an off-switch transistor that has a drain connected to the gate of the charge transfer transistor, a source connected to an input node of a pump stage which is supplied with the clock signal corresponding to the first pump stage (which can be the first pump stage), and a gate connected to an input node of a pump stage which is supplied with the other clock signal not corresponding to the first pump stage and which is included in one of the pump stage rows not including the first pump stage, and an on-switch transistor that has a drain connected to the gate of the charge transfer transistor, a source connected to an output node of the pump stage which is supplied with the other clock signal not corresponding to the first pump stage and which is included in one of the pump stage rows not including the first pump stage, and a gate connected to an output node of the pump stage which is supplied with the clock signal corresponding to the first pump stage (which can be the first pump stage).

In the above charge pump circuit, in each of the charge transfer transistor, off-switch transistor and on-switch transistor, the potential difference between the gate and drain and the potential difference between the gate and source can be small as compared with the conventional techniques. Therefore, the breakdown voltage limit on the transistors can be further alleviated.

According to still another aspect of the present invention, there is provided a charge pump circuit which performs a charge pump operation in response to complementary first and second clock signals to generate a pumped voltage, the charge pump circuit including: a plurality of pump stage rows, each of the plurality of pump stage rows including a plurality of pump stages which are cascaded; and an analog comparator circuit, wherein each of the plurality of pump stages has an input node and an output node and performs a charge pump operation in response to any one of the first and second clock signals, the plurality of pump stages which are included in any one of the plurality of pump stage rows includes a first pump stage, the first pump stage including a charge transfer transistor connected between the input node and the output node, a pump capacitor, one end of which is connected to the output node, and the other end receiving one of the first and second clock signals corresponding to the first pump stage, an off-switch transistor that has a drain connected to the gate of the charge transfer transistor, a source connected to an input node of a pump stage which is supplied with the clock signal corresponding to the first pump stage (which can be the first pump stage), and a gate, and an on-switch transistor that has a drain connected to the gate of the charge transfer transistor, a source connected to an output node of a pump stage which is supplied with the other clock signal not corresponding to the first pump stage and which is included in one of the pump stage rows not including the first pump stage, and a gate, and the analog comparator circuit compares a voltage at an output node of a pump stage corresponding to the first clock signal and a voltage at an output node of a pump stage corresponding to the second clock signal to connect to the gates of the off-switch transistor and the on-switch transistor any one of the output nodes of these two pump stages according to a result of the comparison.

In the above charge pump circuit, in each of the charge transfer transistor, off-switch transistor and on-switch transistor, the potential difference between the gate and drain and the potential difference between the gate and source can be small as compared with the conventional techniques. Therefore, the breakdown voltage limit on the transistors can be further alleviated. Further, at the gate of each of the off-switch transistor and the on-switch transistor, the amount of charge to be charged or discharged can be reduced.

According to still another aspect of the present invention, there is provided a charge pump circuit which performs a charge pump operation in response to complementary first and second clock signals to generate a pumped voltage, the charge pump circuit including a plurality of pump stage rows, each of the plurality of pump stage rows including a plurality of pump stages which are cascaded, wherein each of the plurality of pump stages has an input node and an output node and performs a charge pump operation in response to any one of the first and second clock signals, the plurality of pump stages which are included in any one of the plurality of pump stage rows includes a first pump stage, the first pump stage including a charge transfer transistor connected between the input node and the output node, a pump capacitor, one end of which is connected to the output node, and the other end receiving one of the first and second clock signals corresponding to the first pump stage, an off-switch transistor that has a drain connected to the gate of the charge transfer transistor, a source connected to an input node of a pump stage which is supplied with the clock signal corresponding to the first pump stage (which can be the first pump stage), and a gate connected to a gate control node, an on-switch transistor that has a drain connected to the gate of the charge transfer transistor, a source connected to an output node of a pump stage which is supplied with the other clock signal not corresponding to the first pump stage and which is included in one of the pump stage rows not including the first pump stage, and a gate connected to the gate control node, and a subsidiary charge transfer transistor located between the input node and the output node and connected in series with the charge transfer transistor, the subsidiary charge transfer transistor having a gate connected to the output node of the pump stage which is supplied with the other clock signal not corresponding to the first pump stage and which is included in one of the pump stage rows not including the first pump stage, and a connection node of the charge transfer transistor and the subsidiary charge transfer transistor is connected to the gate control node.

In the above charge pump circuit, in each of the charge transfer transistor, off-switch transistor and on-switch transistor, the potential difference between the gate and drain and the potential difference between the gate and source can be small as compared with the conventional techniques. Therefore, the breakdown voltage limit on the transistors can be further alleviated.

According to still another aspect of the present invention, there is provided a charge pump circuit which performs a charge pump operation in response to complementary first and second clock signals to generate a pumped voltage, the charge pump circuit including: a plurality of pump stage rows, each of which repeats a charge pump operation in response to the first and second clock signals; a plurality of anti-backflow circuits respectively corresponding to the plurality of pump stage rows; and an output terminal for outputting the pumped voltage, wherein each of the plurality of anti-backflow circuits has an input node connected to the pump stage row, an output node connected to the output terminal, and an intermediate node at which a voltage is pumped in response to any one of the first and second clock signals, and the plurality of anti-backflow circuits includes a first anti-backflow circuit, the first anti-backflow circuit including a charge transfer transistor connected between the input node and the output node, a pump capacitor, one end of which is connected to the intermediate node, and the other end receiving one of the first and second clock signals corresponding to the first anti-backflow circuit, and a connection switcher for connecting to a gate of the charge transfer transistor any one of an intermediate node of an anti-backflow circuit which is supplied with the clock signal corresponding to the first anti-backflow circuit (which can be the first anti-backflow circuit) and an input node of an anti-backflow circuit which is supplied with the other clock signal not corresponding to the first anti-backflow circuit.

In the above charge pump circuit, the potential difference between the gate and drain and the potential difference between the gate and source of a charge transfer transistor which is conducting can be small as compared with the conventional techniques. Therefore, the breakdown voltage limit on the charge transfer transistor can be alleviated. Further, the charge transfer efficiency in the anti-backflow circuit can be improved as compared with the conventional techniques.

According to still another aspect of the present invention, there is provided a charge pump circuit which performs a charge pump operation in response to complementary first and second clock signals to generate a pumped voltage, the charge pump circuit including: a plurality of pump stage rows, each of which repeats a charge pump operation in response to the first and second clock signals; a plurality of anti-backflow circuits respectively corresponding to the plurality of pump stage rows; and an output terminal for outputting the pumped voltage, wherein each of the plurality of anti-backflow circuits has an input node connected to the pump stage row, an output node connected to the output terminal, and an intermediate node at which a voltage is pumped in response to any one of the first and second clock signals, and the plurality of anti-backflow circuits includes a first anti-backflow circuit, the first anti-backflow circuit including a charge transfer transistor connected between the input node and the output node, a pump capacitor, one end of which is connected to the intermediate node, and the other end receiving one of the first and second clock signals corresponding to the first anti-backflow circuit, and a connection switcher for connecting to a gate of the charge transfer transistor any one of an input node of an anti-backflow circuit which is supplied with the clock signal corresponding to the first anti-backflow circuit (which can be the first anti-backflow circuit) and an intermediate node of an anti-backflow circuit which is supplied with the other clock signal not corresponding to the first anti-backflow circuit.

In the above charge pump circuit, the breakdown voltage limit on the charge transfer transistor can be alleviated as compared with the conventional techniques. Further, the charge transfer efficiency in the anti-backflow circuit can be improved as compared with the conventional techniques.

According to still another aspect of the present invention, there is provided a charge pump circuit which performs a charge pump operation in response to complementary first and second clock signals to generate a pumped voltage, the charge pump circuit including: a plurality of pump stage rows, each of which repeats a charge pump operation in response to the first and second clock signals; a plurality of anti-backflow circuits respectively corresponding to the plurality of pump stage rows; and an output terminal for outputting the pumped voltage, wherein each of the plurality of anti-backflow circuits has an input node connected to the pump stage row and an intermediate node at which a voltage is pumped in response to any one of the first and second clock signals, the plurality of anti-backflow circuits includes a first anti-backflow circuit, the first anti-backflow circuit including a charge transfer transistor connected between the input node and the intermediate node, a pump capacitor, one end of which is connected to the intermediate node, and the other end receiving one of the first and second clock signals corresponding to the first anti-backflow circuit, a connection switcher for connecting to a gate of the charge transfer transistor any one of an input node of an anti-backflow circuit which is supplied with the clock signal corresponding to the first anti-backflow circuit (which can be the first anti-backflow circuit) and the intermediate node of an anti-backflow circuit which is supplied with the other clock signal not corresponding to the first anti-backflow circuit, and a subsidiary charge transfer transistor located between the input node and the intermediate node and connected in series with the charge transfer transistor, the subsidiary charge transfer transistor having a gate connected to an intermediate node of the anti-backflow circuit which is supplied with the other clock signal not corresponding to the first anti-backflow circuit, and a connection node of the charge transfer transistor and the subsidiary charge transfer transistor is connected to the output terminal.

In the above charge pump circuit, the breakdown voltage limit on the charge transfer transistor can be alleviated as compared with the conventional techniques. Further, the gate voltage of the charge transfer transistor can be increased.

Therefore, the transfer efficiency and transfer rate of the charge transfer transistor can be improved.

DESCRIPTION OF THE PREFERRED EMBODIMENTS

Figure 1:
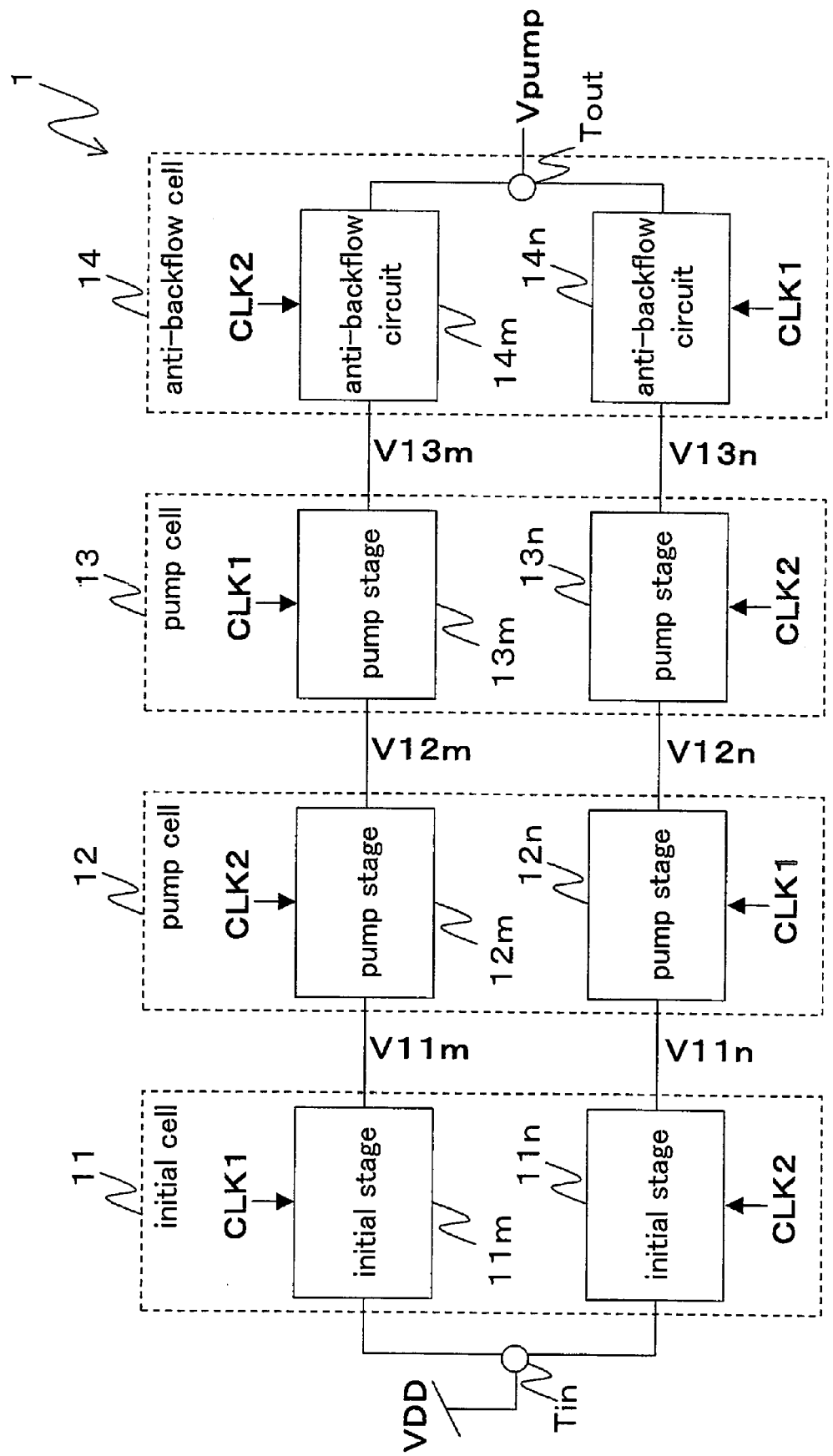
FIG. 1 is a block diagram showing the structure of a charge pump circuit according to embodiment 1 of the present invention.

Hereinafter, embodiments of the present invention will be described in detail with reference to the drawings. It should be noted that, throughout the drawings, the same or equivalent elements will be denoted by the same reference numerals, and the descriptions thereof will not be repeated.

Embodiment 1

FIG. 1 shows a charge pump circuit according to embodiment 1 of the present invention. The charge pump circuit 1 performs a charge pump operation in response to clock signals CLK1 and CLK2 to generate pumped voltage Vpump. The charge pump circuit 1 includes initial stages 11*m* and 11*n*, pump stages 12*m*, 12*n*, 13*m* and 13*n*, and anti-backflow circuits 14*m* and 14*n*.

Clock signals CLK1 and CLK2 transition complementarily to each other. Herein, it is assumed that one of clock signals CLK1 and CLK2 transitions from LOW level (Vss) to HIGH level (Vdd) before the other transitions from HIGH level to LOW level.

The initial stage 11*m* and pump stages 12*m* and 13*m* are cascaded to form a first pump stage row. The initial stage 11*n* and pump stages 12*n* and 13*n* are cascaded to form a second pump stage row. The anti-backflow circuit 14*m* is connected to the pump stage 13*m* at the trailing end of the first pump stage row. The anti-backflow circuit 14*n* is connected to the pump stage 13*n* at the trailing end of the second pump stage row. It should be noted that the charge pump circuit 1 may include three or more pump stage rows.

In the first pump stage row, the odd-numbered pump stages (the initial stage 11*m* and the pump stage 13*m*) operate in response to clock signal CLK1, and the even-numbered pump stages (the pump stage 12*m*) operate in response to clock signal CLK2. On the other hand, in the second pump stage row, the odd-numbered pump stages (the initial stage 11*n* and the pump stage 13*n*) operate in response to clock signal CLK2, and the even-numbered pump stages (the pump stage 12*n*) operate in response to clock signal CLK1.

It should be noted that the initial stages 11*m* and 11*n*, the pump stages 12*m* and 12*n*, the pump stages 13*m* and 13*n*, and the anti-backflow circuits 14*m* and 14*n* are corresponding to each other and form an initial stage cell 11, a pump cell 12, a pump cell 13, and the anti-backflow cell 14, respectively.

[Pump Cell]

Figure 2:
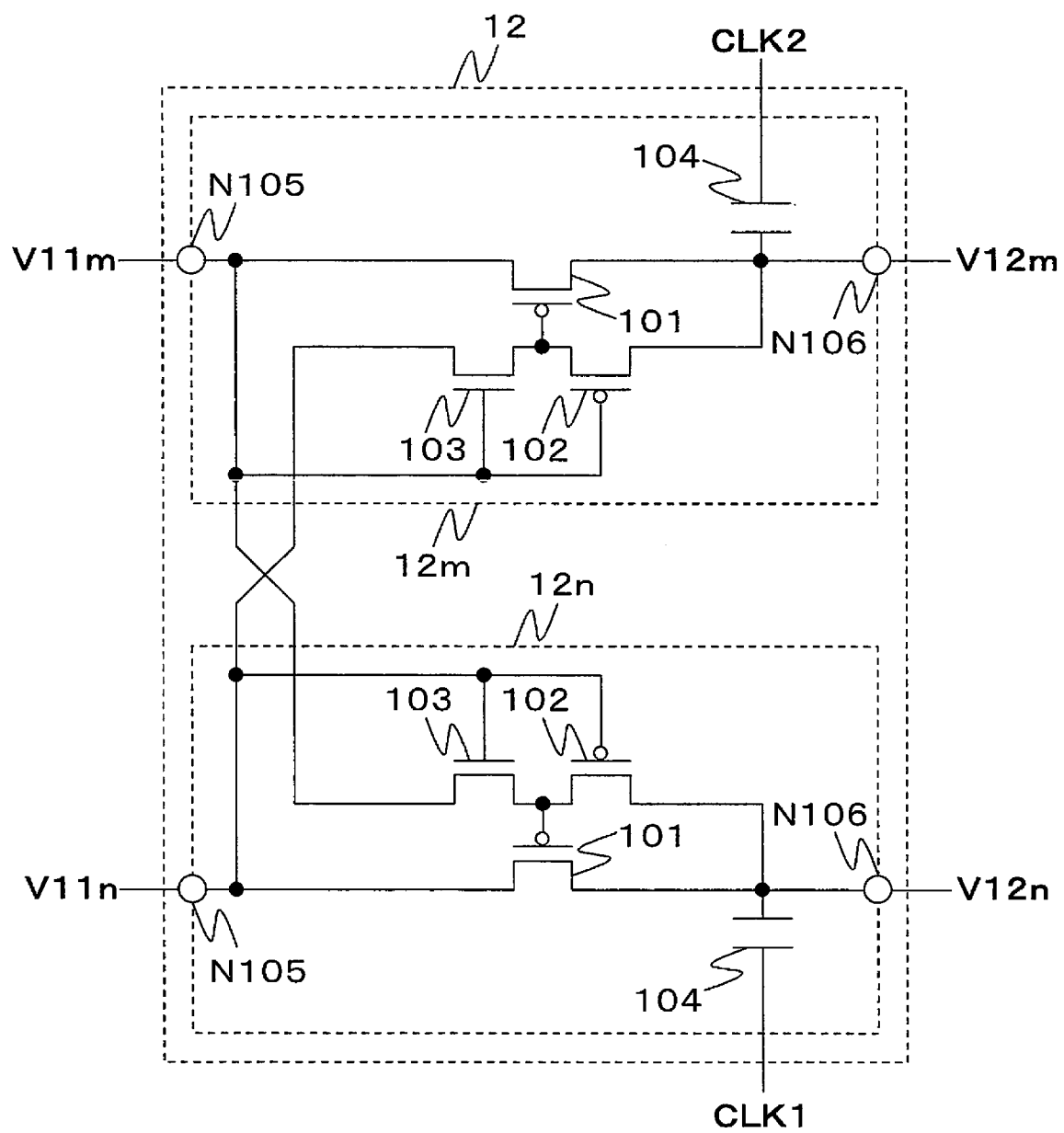
FIG. 2 is a circuit diagram showing the structure of a pump cell shown in FIG. 1.

FIG. 2 shows the structure of the pump cell 12 shown in FIG. 1. The pump stages 12*m* and 12*n* each include a charge transfer transistor 101, an off-switch transistor 102, an on-switch transistor 103, and a pump capacitor 104. Herein, the charge transfer transistor 101 and the off-switch transistor 102 are P-type transistors, and the on-switch transistor 103 is an N-type transistor. It should be noted that the structure of the pump cell 13 is the same as that of the pump cell 12, and therefore, the descriptions thereof are herein omitted.

The charge transfer transistor 101 is connected between an input node N105 and an output node N106 and transfers charge from the input node N105 to the output node N106. The off-switch transistor 102 equalizes the voltage of the output node N106 and the gate voltage of the charge transfer transistor 101 so that the charge transfer transistor 101 is turned off. The on-switch transistor 103 supplies the voltage of the input node N105 of the counterpart pump stage to the gate of the charge transfer transistor 101 so that the charge transfer transistor 101 is turned on. One end of the pump capacitor 104 is connected to the output node N106, and the other end of the pump capacitor 104 is supplied with one of the clock signals corresponding to the pump stage which includes this pump capacitor 104 (CLK1 or CLK2).

[Initial Stage Cell]

Figure 3:
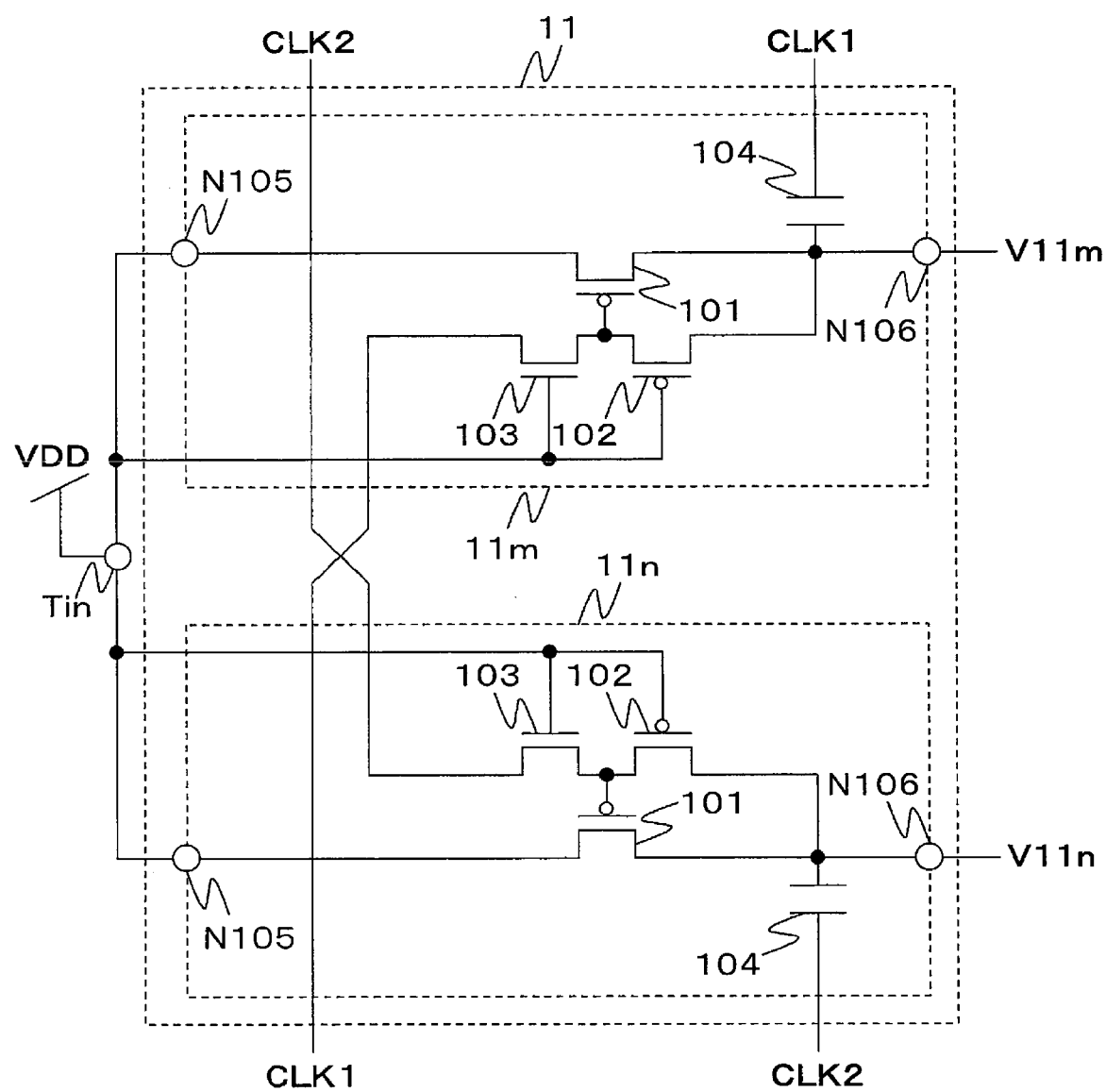
FIG. 3 is a circuit diagram showing the structure of an initial cell shown in FIG. 1.

FIG. 3 shows the structure of the initial stage cell 11 of FIG. 1. The input nodes N105 of the initial stages 11*m* and 11*n* are respectively connected to an input terminal Tin which receives supply voltage VDD. In each of the initial stages 11*m* and 11*n*, the source of the on-switch transistor 103 is supplied with clock signal CLK1 or CLK2. The other elements are the same as those of the pump cell 12 of FIG. 2.

[Anti-Backflow Cell]

Figure 4:
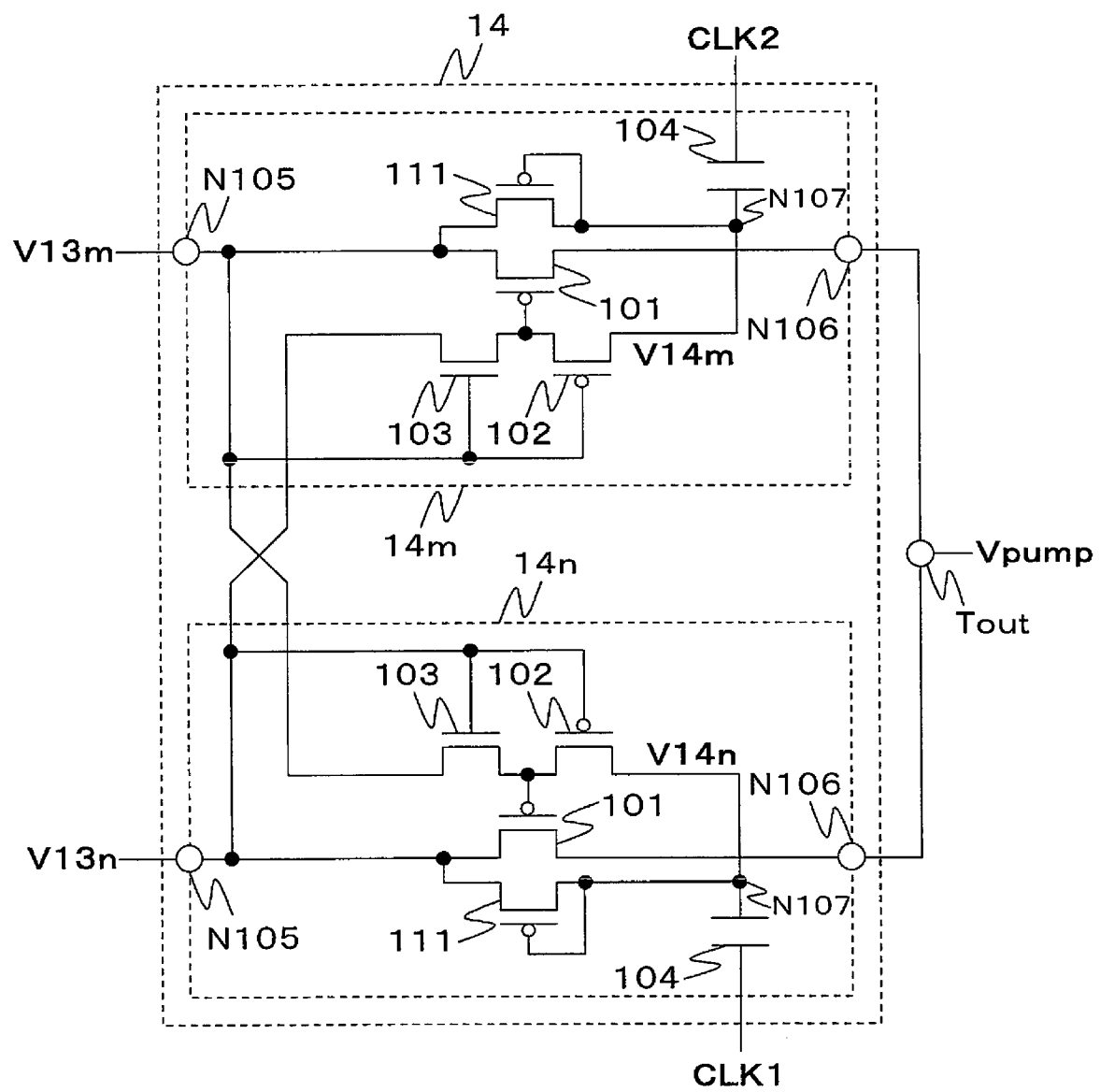
FIG. 4 is a circuit diagram showing the structure of an anti-backflow cell shown in FIG. 1.

FIG. 4 shows the structure of the anti-backflow cell 14 of FIG. 1. The anti-backflow circuits 14*m* and 14*n* each includes a diode-connected transistor 111 in addition to the charge transfer transistor 101, the off-switch transistor 102, the on-switch transistor 103 and the pump capacitor 104 shown in FIG. 2. One end of the pump capacitor 104 and the source of the off-switch transistor 102 are not connected to the output node N106 but to an intermediate node N107. The diode-connected transistor 111 is connected between the input node N105 and the intermediate node N107 for supplying the voltage of the input node N105 to the intermediate node N107 in a unidirectional (irreversible) fashion. The pump capacitor 104 is pumped in synchronization with clock signal CLK1 (or CLK2), whereby the off-switch transistor 102 and the on-switch transistor 103 are turned on/off. The output nodes N106 of the anti-backflow circuits 14*m* and 14*n* are connected to an output terminal Tout at which pumped voltage Vpump is output. The other elements are the same as those of the pump cell 12 of FIG. 2.

[Operation]

Figure 5:
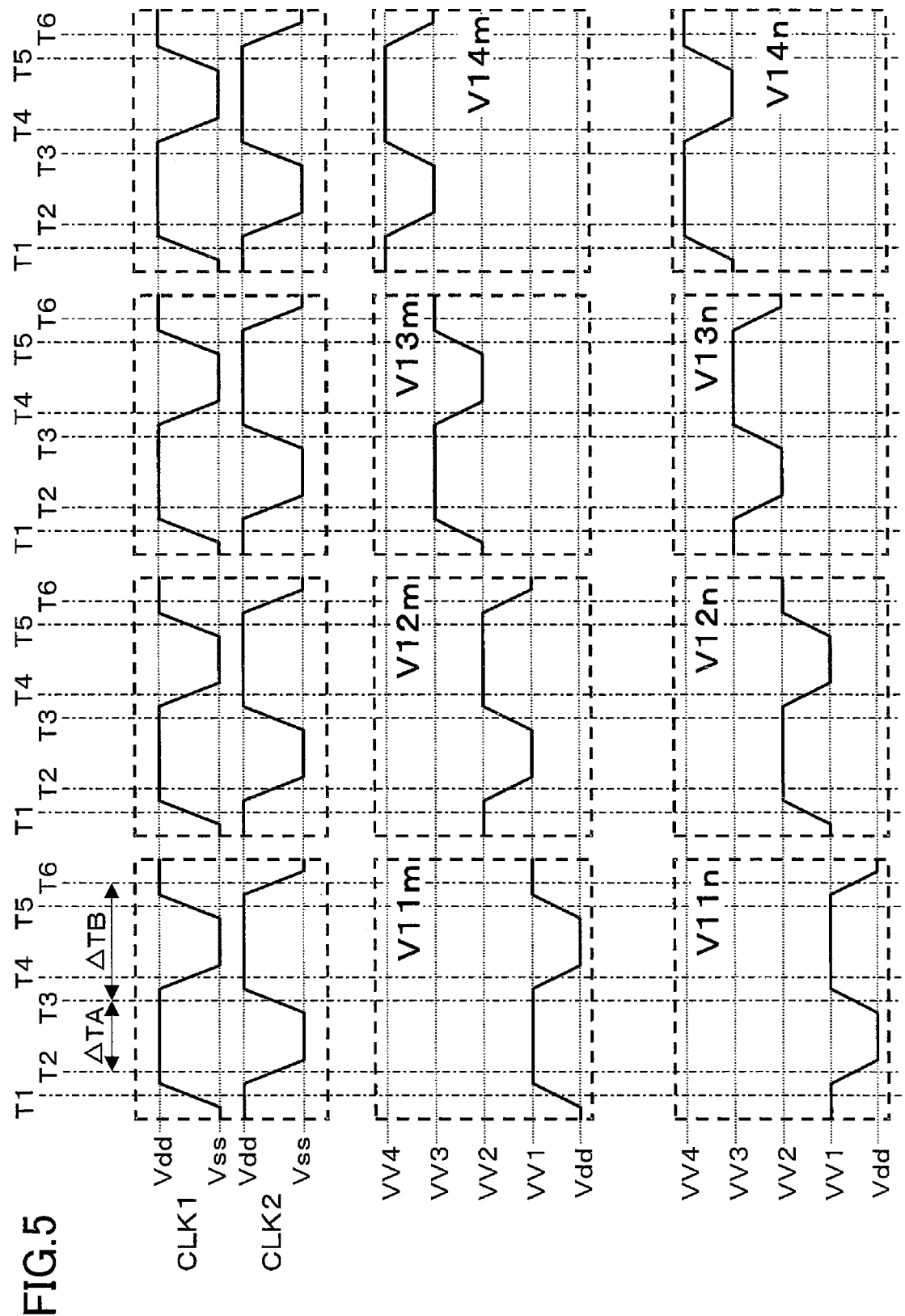
FIG. 5 is a timing chart which illustrates an operation of the charge pump circuit shown in FIG. 1.

Next, an operation of the charge pump circuit shown in FIG. 1 is described with reference to FIG. 5. It should be noted that the descriptions presented herein are on the assumption that clock signals CLK1 and CLK2 each varies between supply potential Vdd and ground potential Vss and that the output terminal Tout of the charge pump circuit does not have current load or voltage limit. In FIG. 5, voltages "VV1", "VV2", "VV3" and "VV4" are as follows:

$$(VV1) = Vdd + \alpha Vdd$$

$$(VV2) = Vdd + 2\alpha \cdot Vdd$$

$$(VV3) = Vdd + 3\alpha \cdot Vdd$$

$$(VV4) = Vdd + 4\alpha \cdot Vdd - Vt$$

where "$\alpha$" is an effective pumping clock voltage and satisfies $\alpha \leq 1$, and "Vt" is the threshold voltage of the transistor.

At time T1, clock signal CLK1 transitions from LOW level to HIGH level. Accordingly, voltages V11*m*, V12*n*, V13*m* and V14*n* increase. As a result, voltages V11*m* to V14*m* and V11*n* to V14*n* are as follows:

$$(V11m) = (V11n) = Vdd + \alpha \cdot Vdd$$

$$(V12m) = (V12n) = Vdd + 2\alpha \cdot Vdd$$

$$(V13m) = (V13n) = Vdd + 3\alpha \cdot Vdd$$

$$(V14m) = (V14n) = Vdd + 4\alpha \cdot Vdd - Vt$$

In each of the initial stages 11*m* and 11*n*, the pump stages 12*m*, 12*n*, 13*m* and 13*n* and the anti-backflow circuits 14*m* and 14*n*, the gate and source of the on-switch transistor 103 have an equal potential so that the on-switch transistor 103 is non-conducting.

In each of the initial stages 11*m* and 11*n* and the pump stages 12*m*, 12*n*, 13*m* and 13*n*, the gate-source potential difference (difference in potential between gate and source) of the off-switch transistor 102 is "$\alpha \cdot Vdd$" so that the off-switch transistor 102 is conducting. Likewise, in each of the anti-backflow circuits 14*m* and 14*n*, the gate-source potential difference of the off-switch transistor 102 is "$\alpha \cdot Vdd - Vt$" so that the off-switch transistor 102 is conducting.

Thus, in each of the initial stages 11*m* and 11*n*, the pump stages 12*m*, 12*n*, 13*m* and 13*n* and the anti-backflow circuits 14*m* and 14*n*, the charge transfer transistor 101 is non-conducting. With such an arrangement, the backflow of charge in the initial stage cell 11, the pump cells 12 and 13 and the anti-backflow cell 14 can be prevented during transition of clock signals CLK1 and CLK2.

At time T2, clock signal CLK2 transitions from HIGH level to LOW level. Accordingly, voltages V11*n*, V12*m*, V13*n* and V14*m* decrease. Meanwhile, voltages V11*m*, V12*n*, V13*m* and V14*n* do not vary. As a result, voltages V11*m* to V14*m* and V11*n* to V14*n* are as follows:

$$(V11m) = Vdd + \alpha \cdot Vdd \quad (V11n) = Vdd$$

$$(V12m) = Vdd + \alpha \cdot Vdd \quad (V12n) = Vdd + 2\alpha \cdot Vdd$$

$$(V13m) = Vdd + 3\alpha \cdot Vdd \quad (V13n) = Vdd + 2\alpha \cdot Vdd$$

$$(V14m) = Vdd + 3\alpha \cdot Vdd \quad (V14n) = Vdd + 4\alpha \cdot Vdd - Vt$$

In each of the initial stage 11*n* and the pump stages 12*m* and 13*n*, the gate-source potential difference of the off-switch transistor 102 is "0" so that the off-switch transistor 102 is non-conducting. The gate-source potential difference of the on-switch transistor 103 is "$\alpha \cdot Vdd$" so that the on-switch transistor 103 is conducting. As a result, the charge transfer transistor 101 is conducting.

On the other hand, in each of the initial stage 11*m* and the pump stages 12*n* and 13*m*, the off-switch transistor 102 is conducting while the on-switch transistor 103 is non-conducting. As a result, the charge transfer transistor 101 is non-conducting.

In the anti-backflow circuit 14*m*, the gate-source potential difference of the off-switch transistor 102 is "0" so that the off-switch transistor 102 is non-conducting. Meanwhile, the gate-source potential difference of the on-switch transistor 103 is "α·Vdd" so that the on-switch transistor is conducting. As a result, the charge transfer transistor 101 is conducting.

In the anti-backflow circuit 14n, on the other hand, the off-switch transistor 102 is conducting while the on-switch transistor 103 is non-conducting. As a result, the charge transfer transistor 101 is non-conducting.

Thus, charge is transferred in each of the initial stage 11n, the pump stages 12m and 13n and the anti-backflow circuit 14m so that voltages V11n, V12m, V13n and pumped voltage Vpump increase. In each of the initial stage 11m, the pump stages 12n and 13m and the anti-backflow circuit 14n, the backflow of charge can be prevented.

At time T3, clock signal CLK2 transitions from LOW level to HIGH level. Accordingly, voltages V11n, V12m, V13n and V14m increase. Meanwhile, voltages V11m, V12n, V13m and V14n do not vary. As a result, voltages V11m to V14m and V11n to V14n are as follows:

$$(V11m)=(V11n)=Vdd+\alpha \cdot Vdd$$

$$(V12m)=(V12n)=Vdd+2\alpha \cdot Vdd$$

$$(V13m)=(V13n)=Vdd+3\alpha \cdot Vdd$$

$$(V14m)=(V14n)=Vdd+4\alpha \cdot Vdd-Vt$$

In each of the initial stages 11m and 11n, the pump stages 12m, 12n and 13m and 13n and the anti-backflow circuits 14m and 14n, the same process as that carried out at time T1 is performed.

At time T4, clock signal CLK1 transitions from HIGH level to LOW level. Accordingly, voltages V11m, V12n, V13m and V14n decrease. Meanwhile, voltages V11n, V12m, V13n and V14m do not vary. As a result, voltages V11m to V14m and V11n to V14n are as follows:

$$(V11m)=Vdd \; (V11n)=Vdd+\alpha \cdot Vdd$$

$$(V12m)=Vdd+2\alpha \cdot Vdd \; (V12n)=Vdd+\alpha \cdot Vdd$$

$$(V13m)=Vdd+2\alpha \cdot Vdd \; (V13n)=Vdd+3\alpha \cdot Vdd$$

$$(V14m)=Vdd+4\alpha \cdot Vdd-Vt \; (V14n)=Vdd+3\alpha \cdot Vdd$$

In each of the initial stage 11m, the pump stages 12n and 13m and the anti-backflow circuit 14n, the on-switch transistor is conducting so that the charge transfer transistor 101 is conducting. On the other hand, in each of the initial stage 11n, the pump stages 12m and 13n and the anti-backflow circuit 14m, the off-switch transistor 102 is conducting so that the charge transfer transistor 101 is non-conducting.

Thus, charge is transferred in each of the initial stage 11m, the pump stages 12n and 13m and the anti-backflow circuit 14n so that voltages V11m, V12n and V13m and pumped voltage Vpump increase. In each of the initial stage 11n, the pump stages 12m and 13n and the anti-backflow circuit 14m, the backflow of charge can be prevented.

At time T5 and time T6, the same processes as those carried out at time T1 and time T2 are performed. In this way, the charge pump operation is repeated.

According to this embodiment, the gate-drain potential difference and the gate-source potential difference of the charge transfer transistor 101 which is conducting can be set to "Vdd" or lower. Therefore, the breakdown voltage limit on the charge transfer transistor can be alleviated as compared with the conventional techniques. Further, the charge transfer efficiency in the anti-backflow cell 14 can be improved as compared with the conventional techniques.

Since a P-type transistor is used as the charge transfer transistor 101, the substrate bias effect of the charge transfer transistor 101 can be reduced in a twin-well process. Further, the gate-substrate potential difference (difference in potential between gate and substrate) of the charge transfer transistor 101 can be decreased.

Since the N-type transistor (herein, the on-switch transistor 103) is connected to the input node N105 whose voltage is lower than that of the output node N106, the gate-substrate potential difference of the N-type transistor can also be decreased.

It should be noted that the source of the off-switch transistor 102 may be connected to the output node N106 of a pump stage which is supplied with one of the clock signals corresponding to the pump stage that includes this off-switch transistor 102 and which is located at the same circuit stage as or a subsequent circuit stage to the pump stage that includes this off-switch transistor 102.

The source of the on-switch transistor 103 may be connected to the input node N105 of a pump stage which is supplied with one of the clock signals not corresponding to the pump stage that includes this on-switch transistor 103 and which is located at the same circuit stage as or a precedent circuit stage to the pump stage that includes this on-switch transistor 103.

Each of the gates of the off-switch transistor 102 and the on-switch transistor 103 may be connected to the input node N105 of a pump stage which is supplied with one of the clock signals corresponding to the pump stage that includes these transistors 102 and 103 and which is located at the same circuit stage as or a precedent circuit stage to the pump stage that includes these transistors 102 and 103.

Embodiment 2

Figure 6:
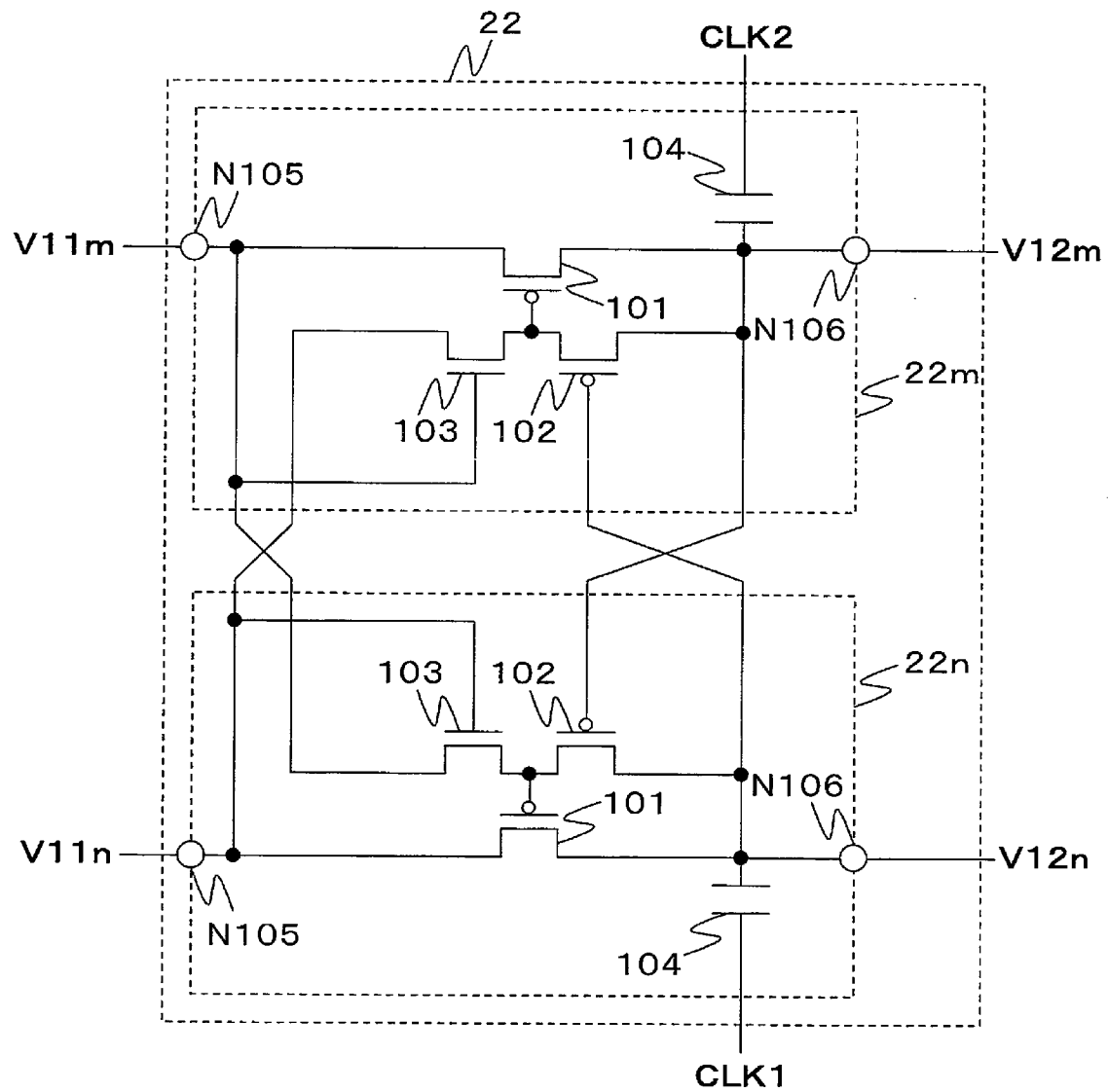
FIG. 6 is a circuit diagram showing the structure of a pump cell according to embodiment 2 of the present invention.
Figure 7:
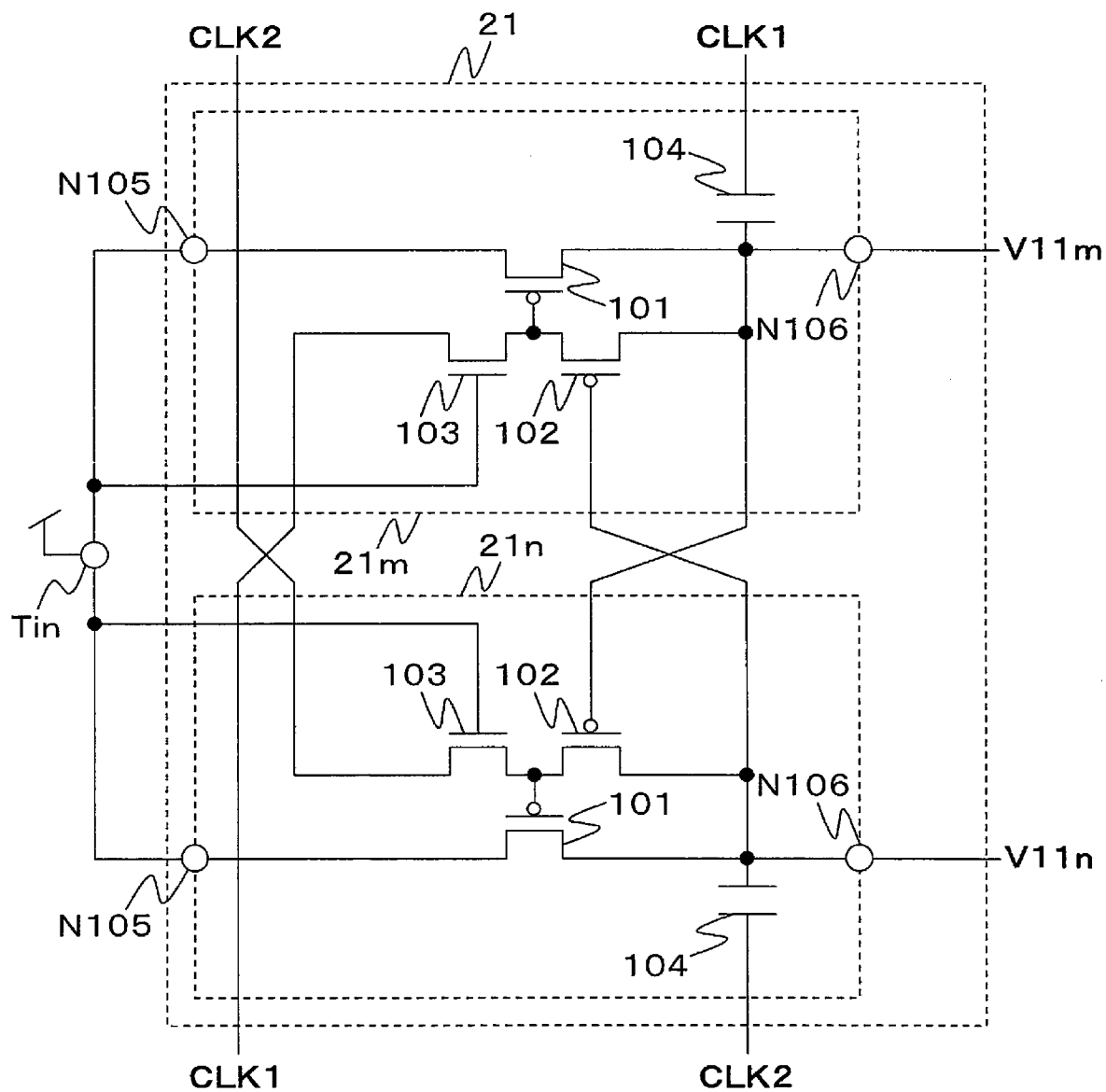
FIG. 7 is a circuit diagram showing the structure of an initial cell according to embodiment 2 of the present invention.
Figure 8:
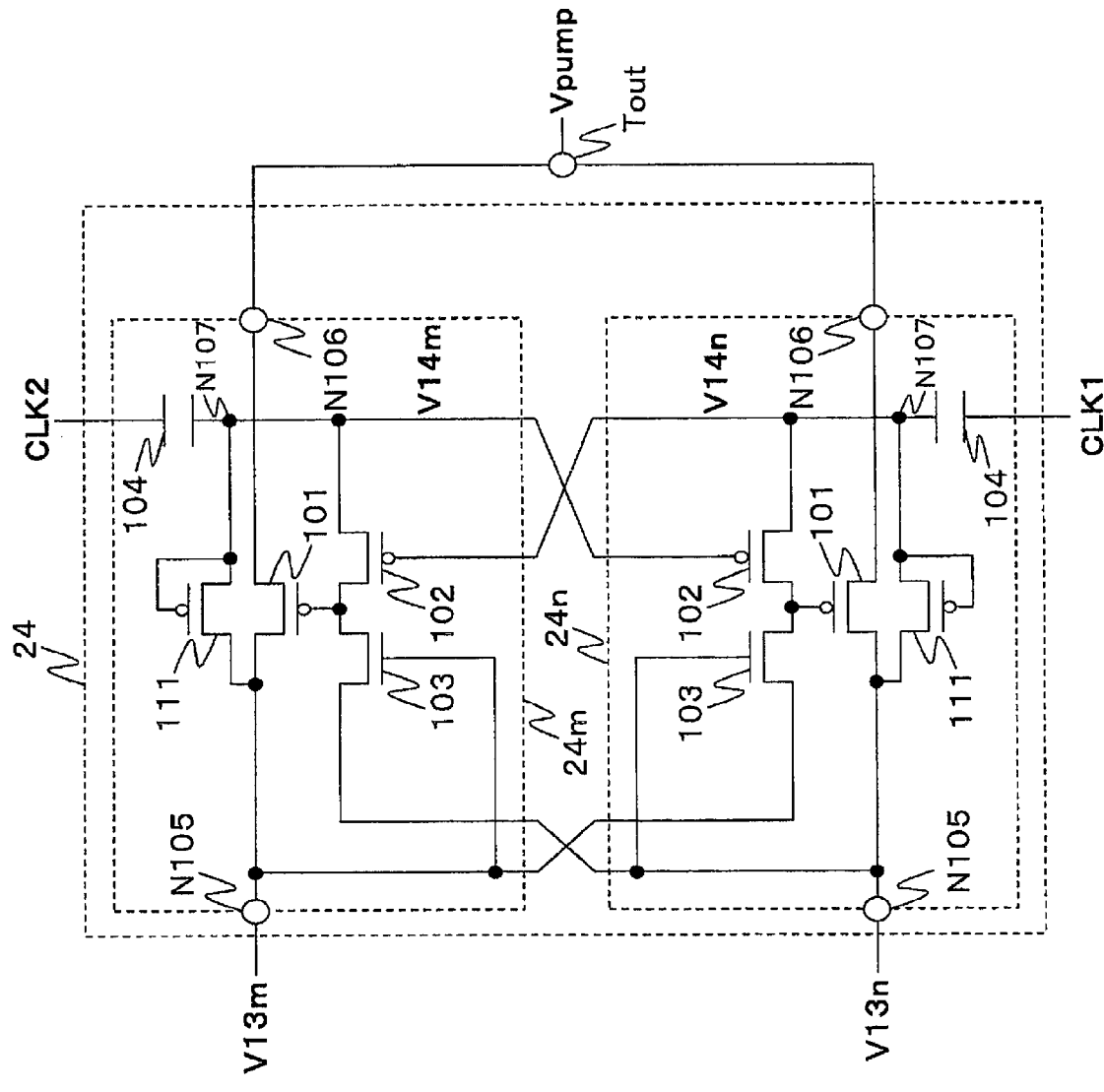
FIG. 8 is a circuit diagram showing the structure of an anti-backflow cell according to embodiment 2 of the present invention.

FIG. 6, FIG. 7 and FIG. 8 show the structure of a pump cell, initial stage cell and anti-backflow cell, respectively, according to embodiment 2 of the present invention.

[Pump Cell]

The pump cell 22 shown in FIG. 6 includes pump stages 22m and 22n. In each of the pump stages 22m and 22n, the gate of the off-switch transistor 102 is not connected to the input node N105 of that pump stage but to the output node N106 of the counterpart pump stage. The other elements are the same as those of the pump cell 12 of FIG. 2.

When voltages V11m, V11n, V12m and V12n are, respectively, "Vdd+α·Vdd", "Vdd", "Vdd+α·Vdd" and "Vdd+2α·Vdd" (i.e., at time T2 of FIG. 5), the gate-source potential difference of the off-switch transistor 102 in the pump stage 12n of FIG. 2 is "2α·Vdd". Meanwhile, in the pump stage 22n of FIG. 6, the gate-source potential difference of the off-switch transistor 102 is "α·Vdd".

Likewise, when voltages V11m, V11n, V12m and V12n are, respectively, "Vdd", "Vdd+α·Vdd", "Vdd+2α·Vdd" and "Vdd+α·Vdd" (i.e., at time T4 of FIG. 5), the gate-source potential difference of the off-switch transistor 102 in the pump stage 22m of FIG. 6 is "α·Vdd".

[Initial Stage Cell]

The initial stage cell 21 shown in FIG. 7 includes initial stages 21m and 21n. In each of the initial stages 21m and 21n, the gate of the off-switch transistor 102 is not connected to the input terminal Tin but to the output node N106 of the counterpart initial stage. The other elements are the same as those of the initial stage cell 11 of FIG. 3.

[Anti-Backflow Cell]

The anti-backflow cell 24 shown in FIG. 8 includes anti-backflow circuits 24m and 24n. In each of the anti-backflow circuits 24m and 24n, the gate of the off-switch transistor 102 is not connected to the input node N105 of this anti-backflow circuit but to the intermediate node N107 of the counterpart anti-backflow circuit. The other elements are the same as those of the anti-backflow cell 14 of FIG. 4.

With the above-described arrangement of the pump cell, initial stage cell and anti-backflow cell, the gate-drain potential difference (difference in potential between gate and drain) and the gate-source potential difference in each of the charge transfer transistor 101, the off-switch transistor 102 and the on-switch transistor 103 can be set to "α·Vdd" or lower. Therefore, the breakdown voltage limit on the transistors can be further alleviated.

It should be noted that the gate of the off-switch transistor 102 may be connected to the output node N106 of a pump stage which is supplied with one of the clock signals not corresponding to the pump stage that includes this off-switch transistor 102 and which is located at the same circuit stage as or a subsequent circuit stage to the pump stage that includes this off-switch transistor 102.

Embodiment 3

Figure 9:
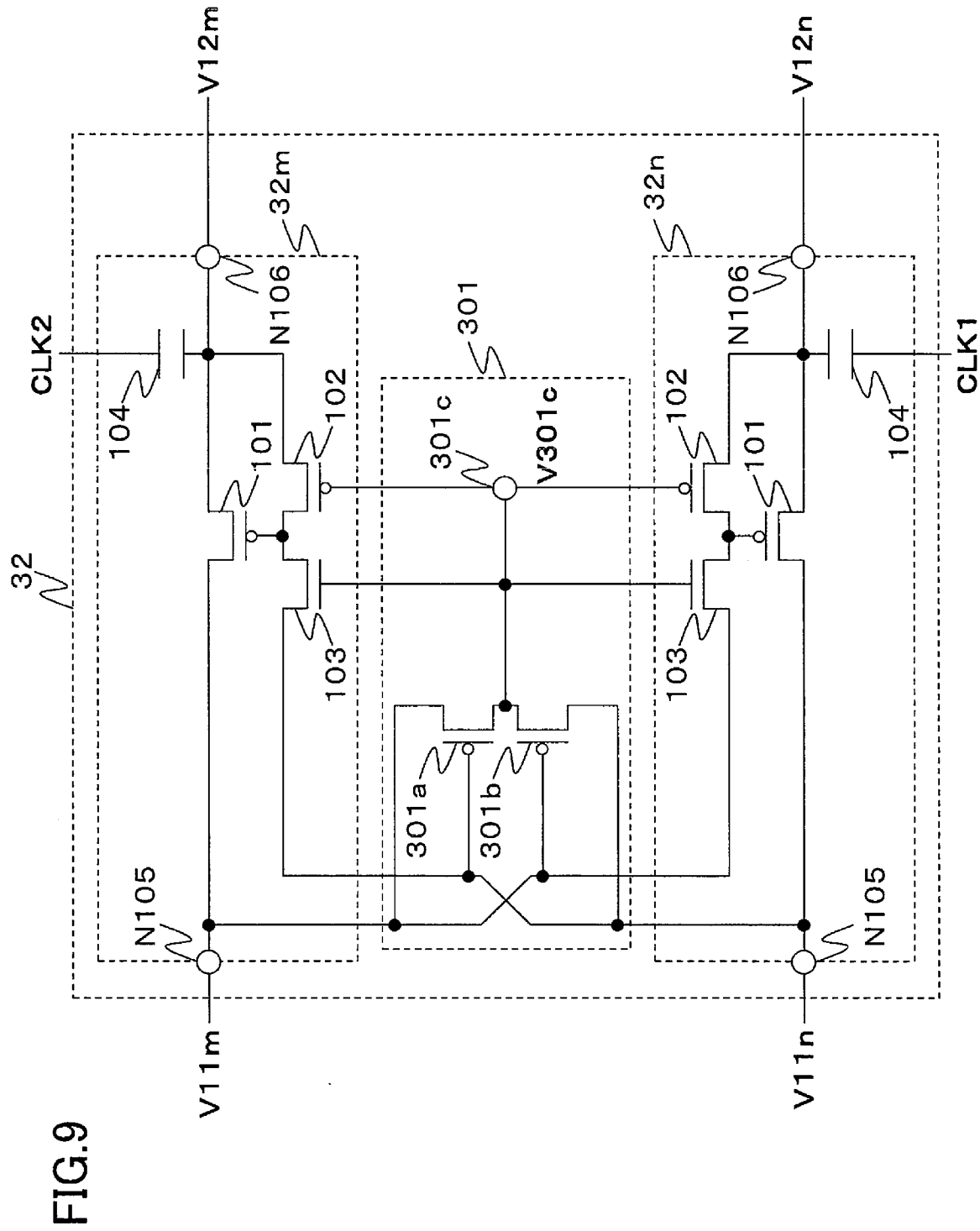
FIG. 9 is a circuit diagram showing the structure of a pump cell according to embodiment 3 of the present invention.

FIG. 9 shows the structure of a pump cell according to embodiment 3 of the present invention. The pump cell 32 of FIG. 9 includes pump stages 32m and 32n and an analog comparator circuit 301. The analog comparator circuit 301 corresponds to the pump stages 32m and 32n and includes the transistors 301a and 301b. In each of the pump stages 32m and 32n, the gates of the off-switch transistor 102 and the on-switch transistor 103 are respectively connected to a gate control node 301c. The analog comparator circuit 301 connects to the gate control node 301c one of the input nodes N105 of the pump stages 32m and 32n which has a higher voltage. The other elements are the same as those of the pump cell 12 of FIG. 2.

[Operation]

Figure 10:
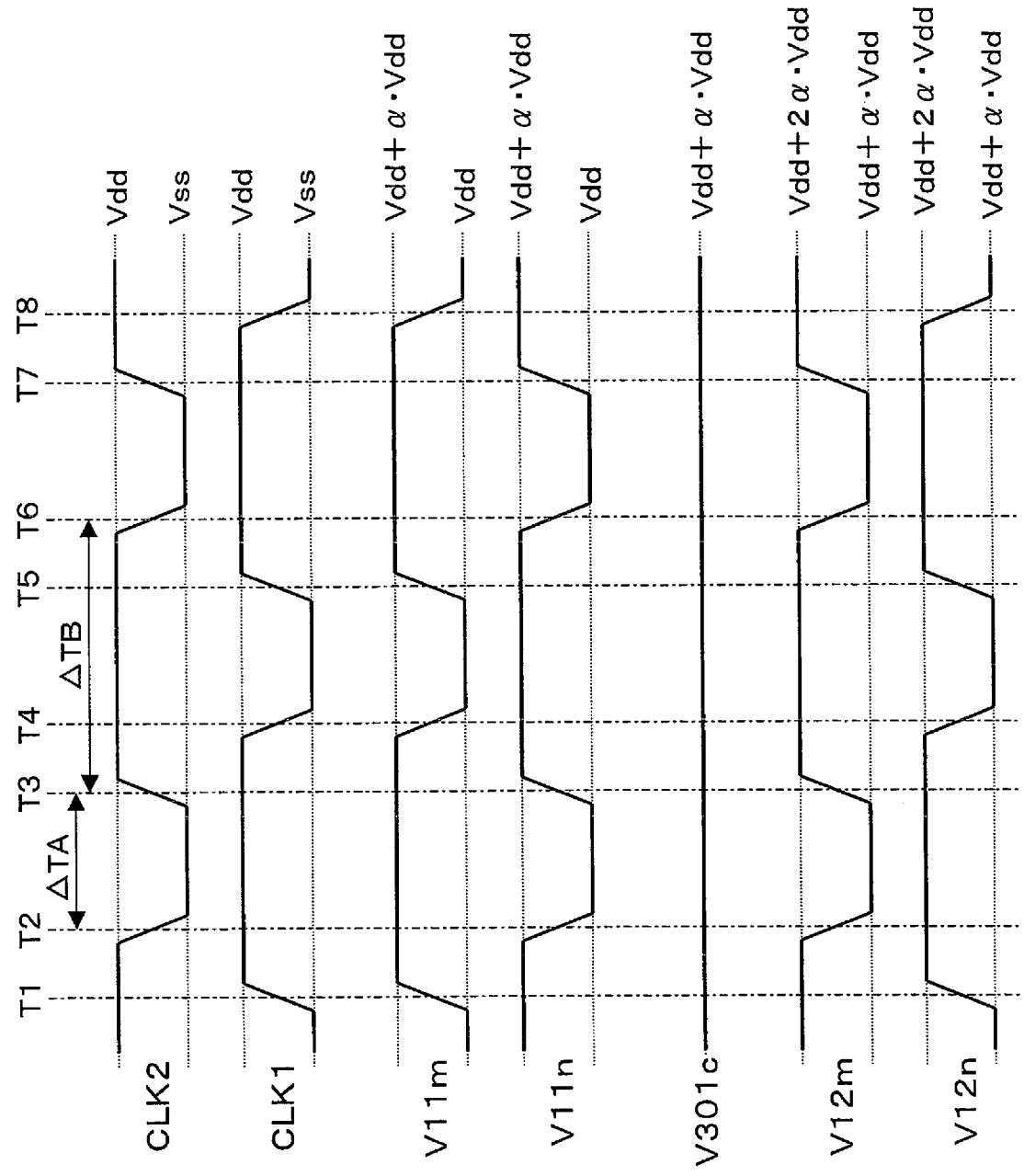
FIG. 10 is a timing chart which illustrates an operation of the pump cell shown in FIG. 9.

Next, an operation of the pump cell 32 shown in FIG. 9 is described with reference to FIG. 10.

When voltages V11m, V11n, V12m and V12n are, respectively, "Vdd+α·Vdd", "Vdd", "Vdd+α·Vdd" and "Vdd+2α·Vdd" (e.g., in the period from time T2 to time T3), in the analog comparator circuit 301, the transistor 301a is conducting so that the input node N105 of the pump stage 32m is connected to the gate control node 301c. In the pump stage 32m, the on-switch transistor 103 is conducting so that the charge transfer transistor 101 is conducting. Meanwhile, in the pump stage 32n, the off-switch transistor 102 is conducting so that the charge transfer transistor 101 is non-conducting.

When voltages V11m, V11n, V12m and V12n are, respectively, "Vdd", "Vdd+α·Vdd", "Vdd+2α·Vdd" and "Vdd+α·Vdd" (e.g., in the period from time T4 to time T5), in the analog comparator circuit 301, the transistor 301b is conducting so that the input node N105 of the pump stage 32n is connected to the gate control node 301c. In the pump stage 32m, the off-switch transistor 102 is conducting so that the charge transfer transistor 101 is non-conducting. Meanwhile, in the pump stage 32n, the on-switch transistor 103 is conducting so that the charge transfer transistor 101 is also conducting.

When both voltages V11m and V11n are "Vdd+α·Vdd" and both voltages V12m and V12n are "Vdd+2α·Vdd" (e.g., in the period from time T1 to time T2), in the analog comparator circuit 301, both the transistors 301a and 301b are non-conducting. Thus, voltage V301c at the gate control node 301c is maintained equal to "Vdd+α·Vdd". Also, in each of the pump stages 32m and 32n, the off-switch transistor 102 is conducting so that the charge transfer transistor 101 is non-conducting.

Thus, voltage V301c at the gate control node 301c is always maintained at "Vdd+α·Vdd". Therefore, in each of the charge transfer transistor 101, the off-switch transistor 102 and the on-switch transistor 103, the gate-drain potential difference and the gate-source potential difference can always be set to "α·Vdd" or smaller. For example, when voltages V11m, V11n, V12m and V12n are "Vdd+α·Vdd", "Vdd", "Vdd+α·Vdd" and "Vdd+2α·Vdd", respectively, in the pump stage 12n of FIG. 2, the gate-source potential difference of the off-switch transistor 102 is "2α·Vdd". However, in the pump stage 32n of FIG. 9, the gate-source potential difference of the off-switch transistor 102 can be "α·Vdd". In this way, the breakdown voltage limit on the transistor can be further alleviated.

In each of the gates of the off-switch transistor 102 and the on-switch transistor 103, the amount of charge to be charged or discharged can be reduced.

It should be noted that the analog comparator circuit 301 may correspond to a pump stage which is supplied with clock signal CLK1 and to a pump stage which is supplied with clock signal CLK2 and which is located at the same circuit stage as that pump stage.

Variations of Embodiment 3

Figure 11:
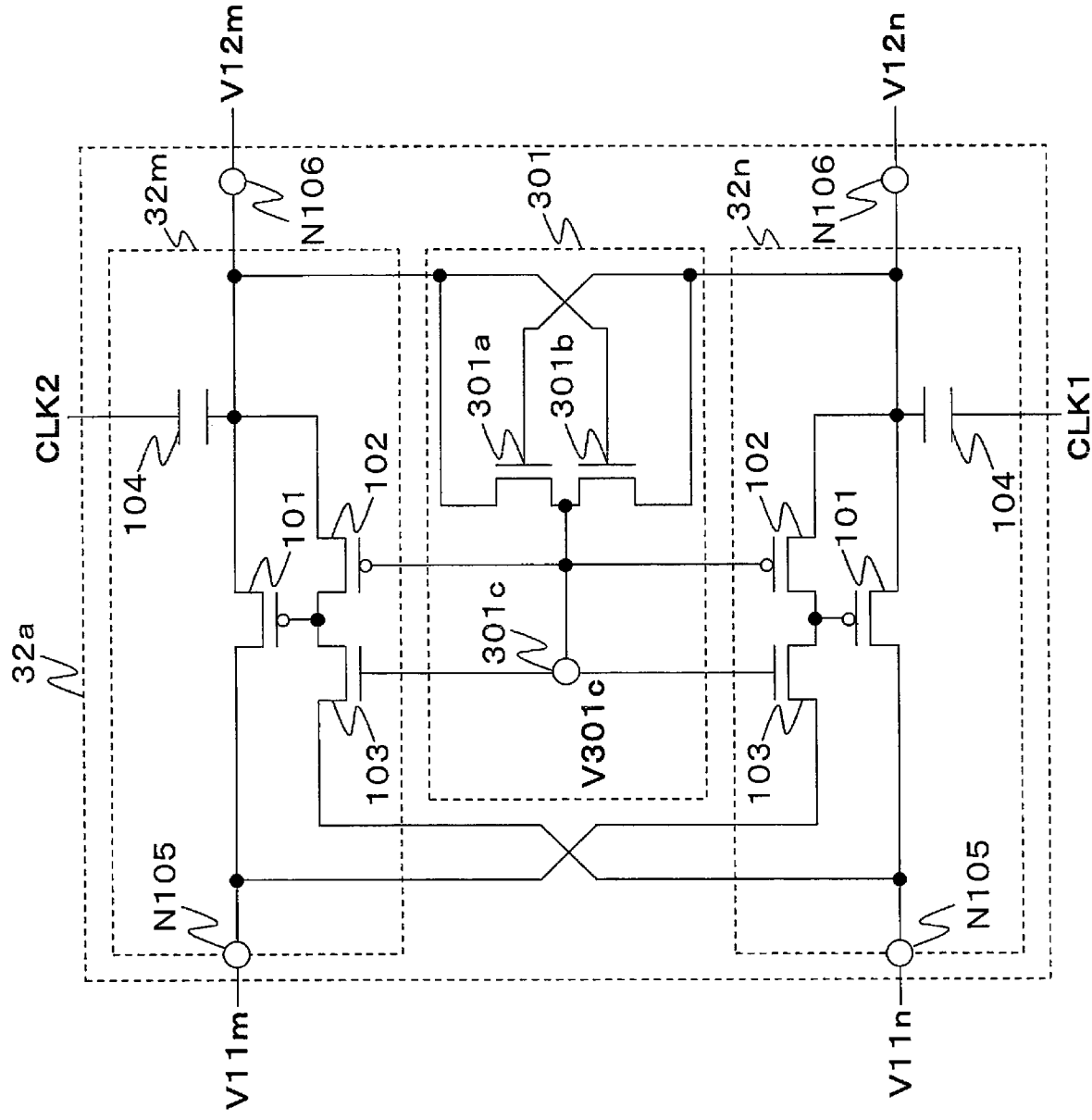
FIG. 11 is a circuit diagram showing a variation of the pump cell shown in FIG. 9.

The structure shown in FIG. 11 is also possible within the scope of the present invention wherein the analog comparator circuit 301 compares the voltage at the output node N106 of the pump stage 32m and the voltage at the output node N106 of the pump stage 32n to select any one of the output nodes N106 of the pump stages 32m and 32n according to the comparison result. In the pump cell 32a shown in FIG. 11, the analog comparator circuit 301 connects to the gate control node 301c one of the output nodes N106 of the pump stages 32m and 32n which has a lower voltage.

With such an arrangement, in each of the charge transfer transistor 101, the off-switch transistor 102 and the on-switch transistor 103, the gate-drain potential difference and the gate-source potential difference can always be set to "α·Vdd" or lower.

Embodiment 4

Figure 12:
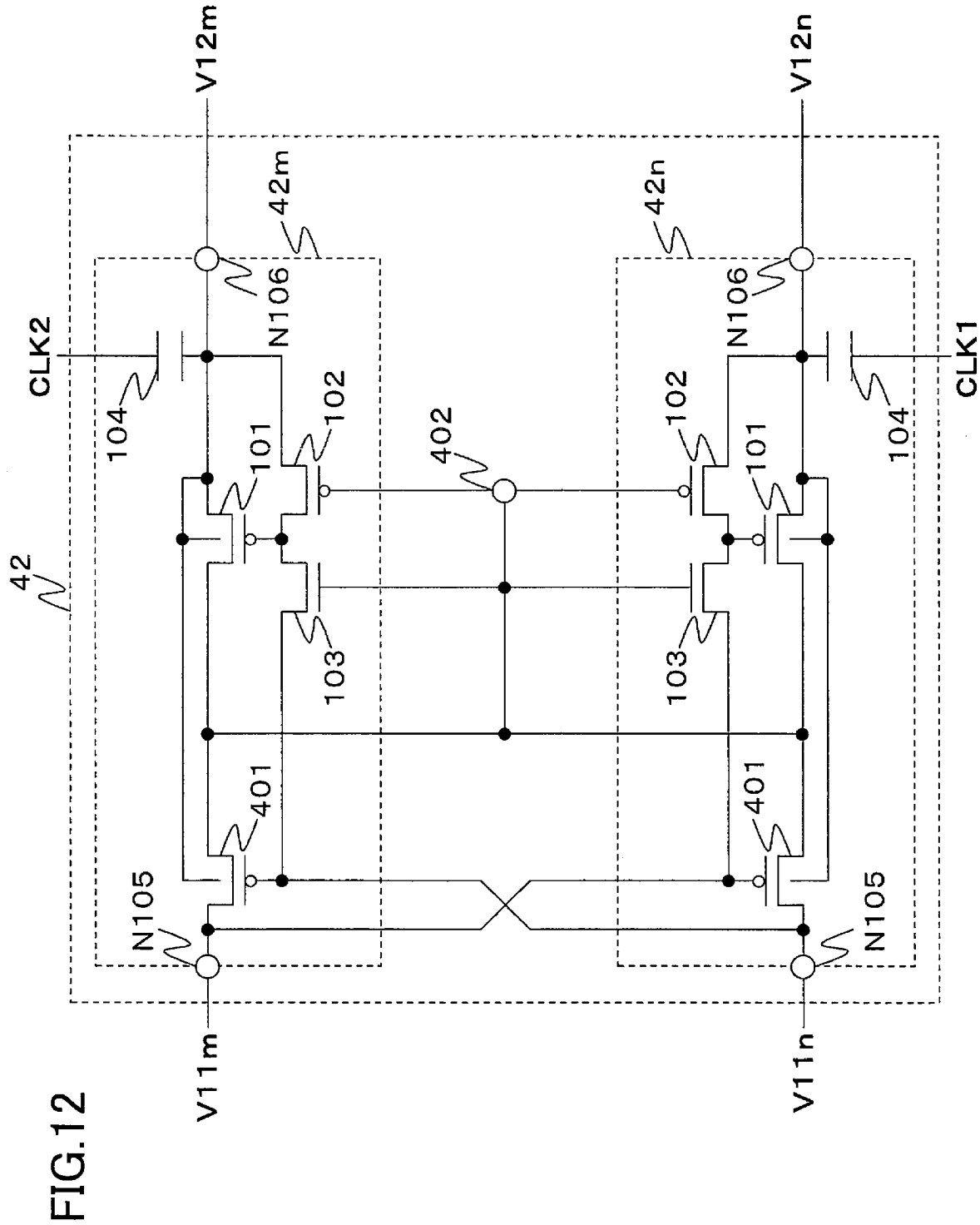
FIG. 12 is a circuit diagram showing the structure of a pump cell according to embodiment 4 of the present invention.

FIG. 12 shows a pump cell according to embodiment 4 of the present invention. In the pump cell 42 shown in FIG. 12, pump stages 42m and 42n each includes a subsidiary charge transfer transistor 401 in addition to the charge transfer transistor 101, the off-switch transistor 102, the on-switch transistor 103 and the pump capacitor 104 shown in FIG. 2. The subsidiary charge transfer transistor 401 and the charge transfer transistor 101 have the same polarity and are connected together in series between the input node N105 and the output node N106. The connection node of the charge transfer transistor 101 and the subsidiary charge transfer transistor 401 is connected to a gate control node 402. In each of the pump stages 42m and 42n, the gates of the off-switch transistor 102 and the on-switch transistor 103 are connected to the gate control node 402.

In each of the pump stages 42m and 42n, the well of the charge transfer transistor 101 and the well of the subsidiary charge transfer transistor 401 are connected together for the purpose of area reduction.

[Operation]

Next, an operation of the pump cell 42 shown in FIG. 12 is described.

When voltages V11m, V11n, V12m and V12n are "Vdd+α·Vdd", "Vdd", "Vdd+α·Vdd" and "Vdd+2α·Vdd", respectively, the subsidiary charge transfer transistor 401 of the pump stage 42m is conducting while the subsidiary charge transfer transistor 401 of the pump stage 42n is non-conducting. As a result, the voltage at the gate control node 402 is "Vdd+α·Vdd". In the pump stage 42m, the on-switch transistor 103 is conducting, and the charge transfer transistor 101 is also conducting. Meanwhile, in the pump stage 42n, the off-switch transistor 102 is conducting, and the charge transfer transistor 101 is non-conducting.

When voltages V11m, V11n, V12m and V12n are "Vdd", "Vdd+α·Vdd", "Vdd+2α·Vdd" and "Vdd+α·Vdd", respectively, the subsidiary charge transfer transistor 401 of the pump stage 42m is non-conducting, while the subsidiary charge transfer transistor 401 of the pump stage 42n is conducting. As a result, the voltage at the gate control node 402 is "Vdd+α·Vdd". In the pump stage 42m, the off-switch transistor 102 is conducting, and the charge transfer transistor 101 is non-conducting. Meanwhile, in the pump stage 42n, the on-switch transistor 103 is conducting, and the charge transfer transistor 101 is also conducting.

When both voltages V11m and V11n are "Vdd+α·Vdd" and both voltages V12m and V12n are "Vdd+2α·Vdd", the subsidiary charge transfer transistor 401 is non-conducting in any of the pump stages 42m and 42n. As a result, the voltage at the gate control node 402 is maintained at "Vdd+α·Vdd". In each of the pump stages 42m and 42n, the off-switch transistor 102 is conducting, and the charge transfer transistor 101 is non-conducting.

As described above, the voltage at the gate control node 402 is always maintained at "Vdd+α·Vdd". Thus, in each of the charge transfer transistor 101, the off-switch transistor 102 and the on-switch transistor 103, the gate-drain potential difference and the gate-source potential difference can always be maintained at "α·Vdd" or lower. Therefore, the breakdown voltage limit on the transistors can be further alleviated.

It should be noted that the gate of the subsidiary charge transfer transistor 401 may be connected to the input node N105 of a pump stage which is supplied with one of the clock signals not corresponding to the pump stage that includes this subsidiary charge transfer transistor 401 and which is located at the same circuit stage as or a precedent circuit stage to the pump stage that includes this subsidiary charge transfer transistor 401.

Variations of Embodiment 4

Figure 13:
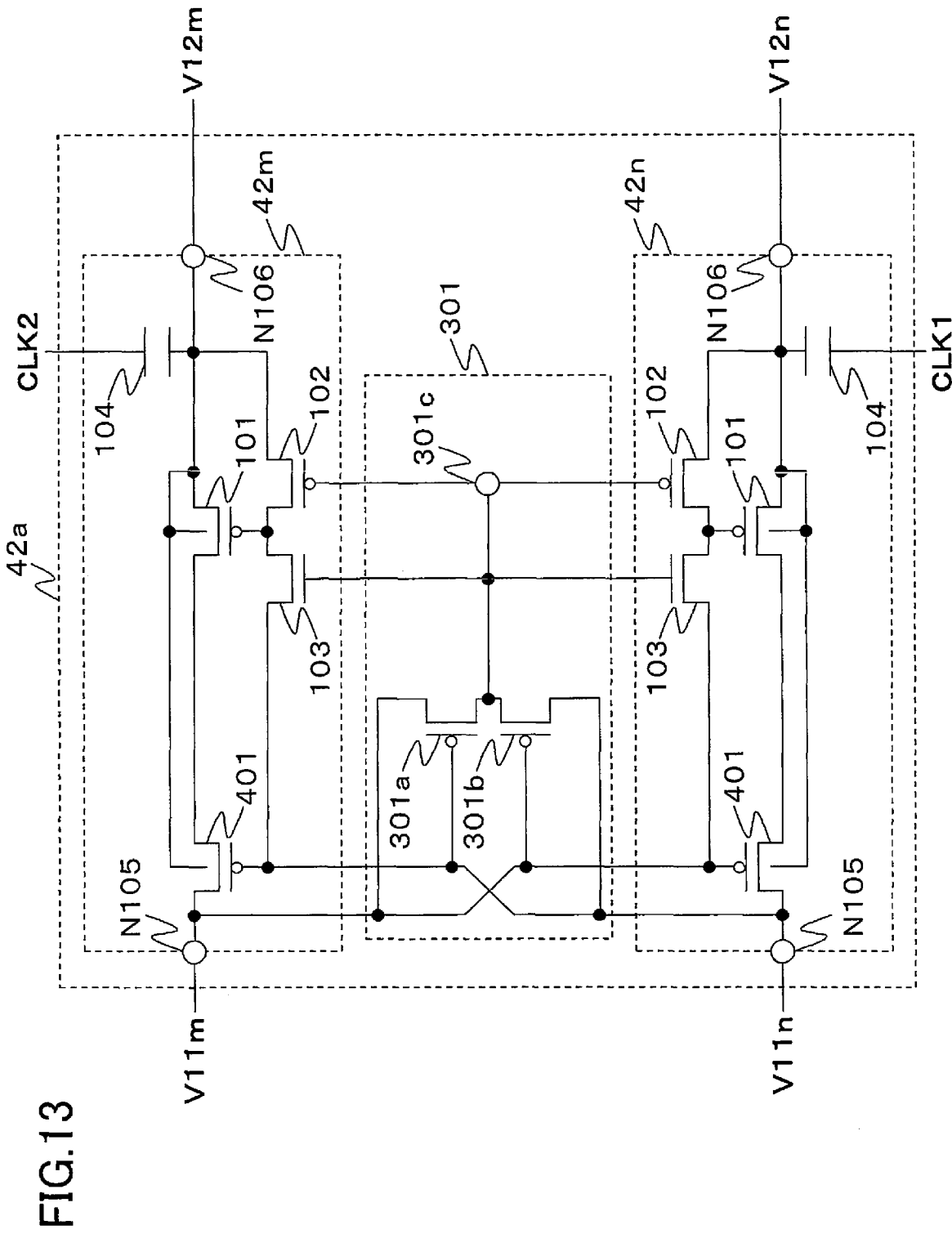
FIG. 13 is a circuit diagram showing a variation of the pump cell shown in FIG. 12.

As in a pump cell 42a shown in FIG. 13, the subsidiary charge transfer transistor 401 of FIG. 12 and the analog comparator circuit 301 of FIG. 9 may be used together. With such an arrangement, in each of the charge transfer transistor 101, the off-switch transistor 102, the on-switch transistor 103 and the subsidiary charge transfer transistor 401, the gate-drain potential difference and the gate-source potential difference can be set to "α·Vdd" or lower. Further, in each of the charge transfer transistor 101 and the subsidiary charge transfer transistor 401, the amount of charge to be charged or discharged in the diffusion capacitance can be reduced.

Embodiment 5

Figure 14:
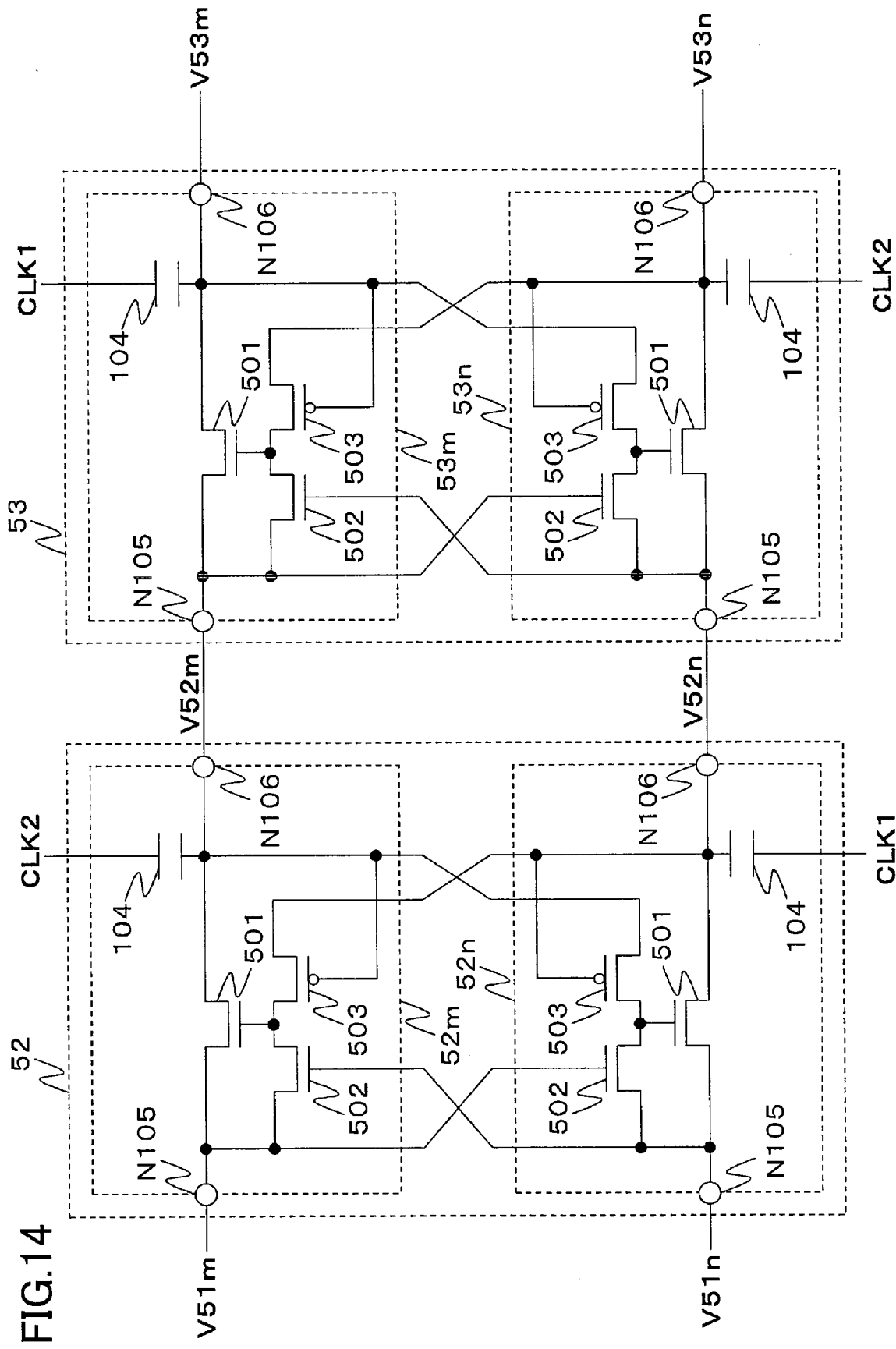
FIG. 14 is a circuit diagram showing the structure of a pump cell according to embodiment 5 of the present invention.
Figure 15:
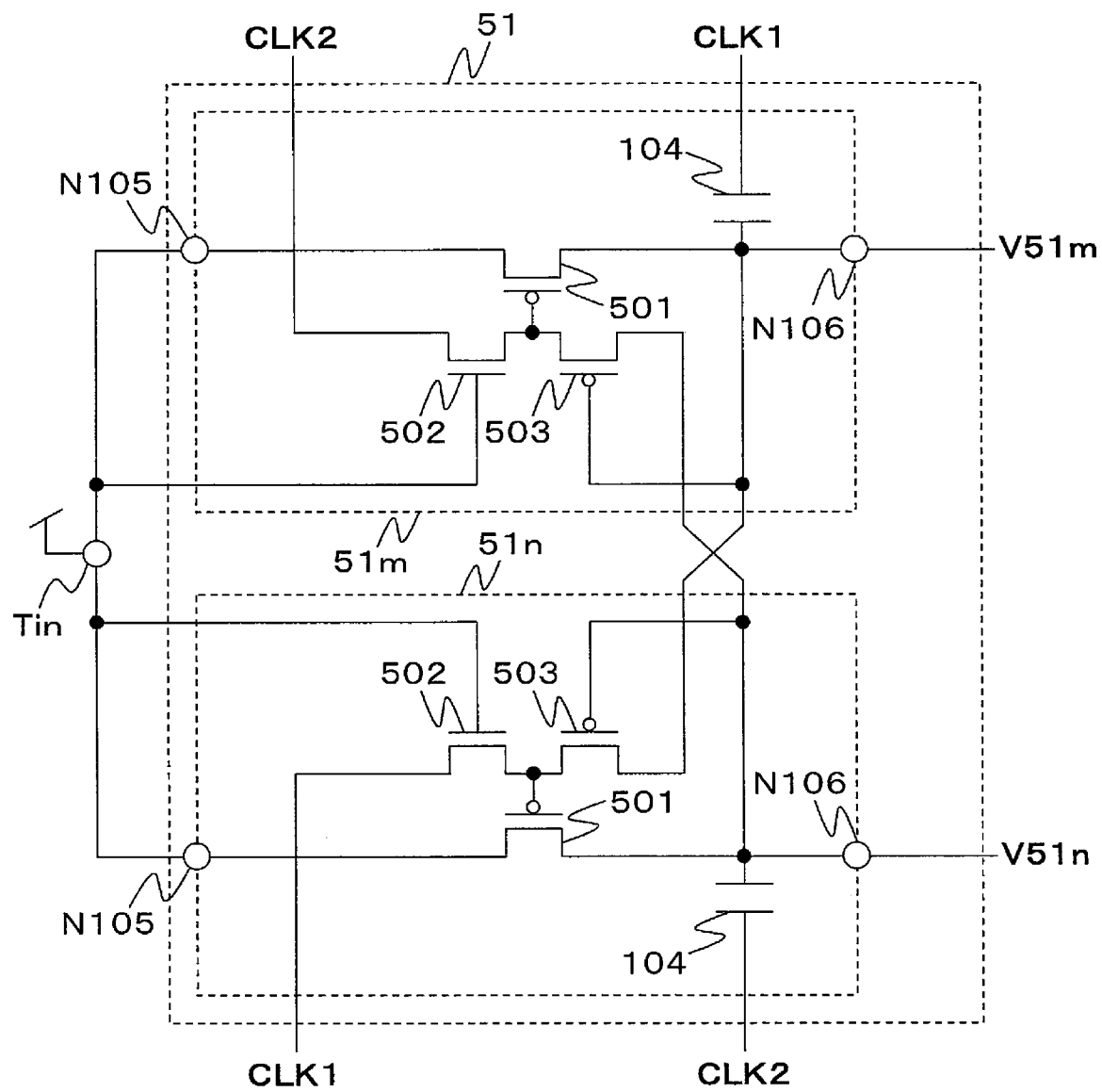
FIG. 15 is a circuit diagram showing the structure of an initial cell according to embodiment 5 of the present invention.
Figure 16:
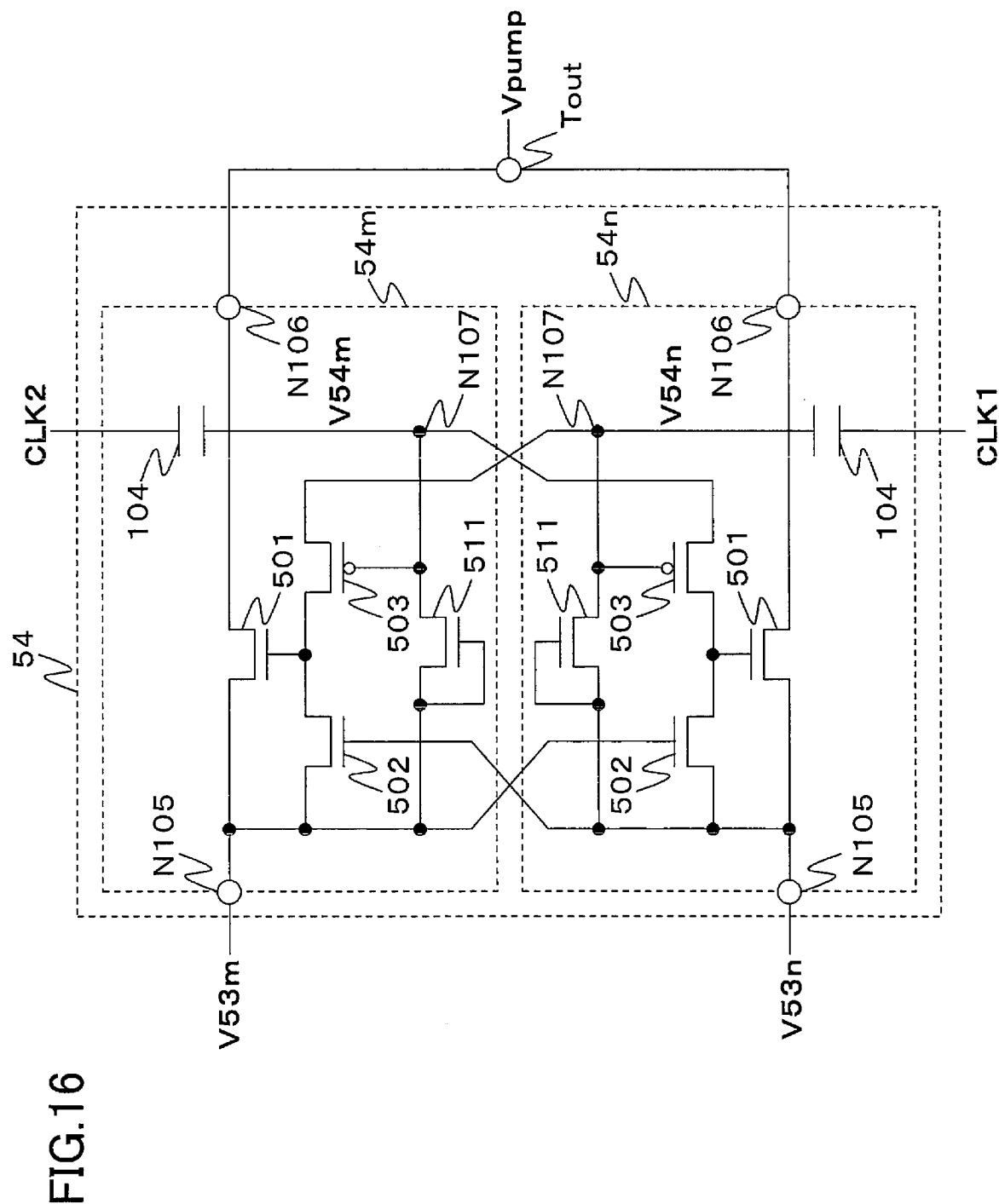
FIG. 16 is a circuit diagram showing the structure of an anti-backflow cell according to embodiment 5 of the present invention.

FIG. 14, FIG. 15 and FIG. 16 show the structure of a pump cell, initial stage cell and anti-backflow cell, respectively, according to embodiment 5 of the present invention.

[Pump Cell]

Pump cells 52 and 53 shown in FIG. 14 each include pump stages 52m and 52n and pump stages 53m and 53n. The pump stages 52m and 52n and pump stages 53m and 53n each include a charge transfer transistor 501, an off-switch transistor 502, an on-switch transistor 503 and a pump capacitor 104. Herein, the charge transfer transistor 501 and the off-switch transistor 502 are N-type transistors, and the on-switch transistor 503 is a P-type transistor.

The charge transfer transistor 501 is connected between the input node N105 and the output node N106 for transferring charge from the input node N105 to the output node N106. The off-switch transistor 502 equalizes the voltage at the input node N105 and the gate voltage of the charge transfer transistor 501 so that the charge transfer transistor 501 is turned off. The on-switch transistor 503 supplies the voltage of the output node N106 of the counterpart pump stage to the gate of the charge transfer transistor 501 so that the charge transfer transistor 501 is turned on.

[Initial Stage Cell]

The initial stage cell 51 shown in FIG. 15 includes initial stages 51m and 51n. In the initial stages 51m and 51n, the input node N105 and the gate of the off-switch transistor 502 are connected to the input terminal Tin, and the source of the off-switch transistor 502 is supplied with clock signal CLK1 or CLK2. The other elements are the same as those of the pump cell 52 of FIG. 14.

[Anti-Backflow Cell]

The anti-backflow cell 54 shown in FIG. 16 includes anti-backflow circuits 54m and 54n. The anti-backflow circuits 54m and 54n each include a diode-connected transistor 511 in addition to the charge transfer transistor 501, the off-switch transistor 502, the on-switch transistor 503 and the pump capacitor 104 shown in FIG. 14. One end of the pump capacitor 104 and the source of the on-switch transistor 503 are connected not only to the intermediate node N107, not to the output node N106. The diode-connected transistor 511 is connected between the input node N105 and the intermediate node N107 for supplying the voltage of the input node N105 to the intermediate node N107 and to the gate of the on-switch transistor 103 in a unidirectional (irreversible) fashion. The pump capacitor 104 is pumped in synchronization with clock signal CLK1 (or CLK2), whereby the off-switch transistor 502 and the on-switch transistor 503 are turned on/off. The output nodes N106 of the anti-backflow circuits 54m and 54n are connected to the output terminal Tout. The other elements are the same as those of the pump cell 52 of FIG. 14.

[Operation]

Figure 17:
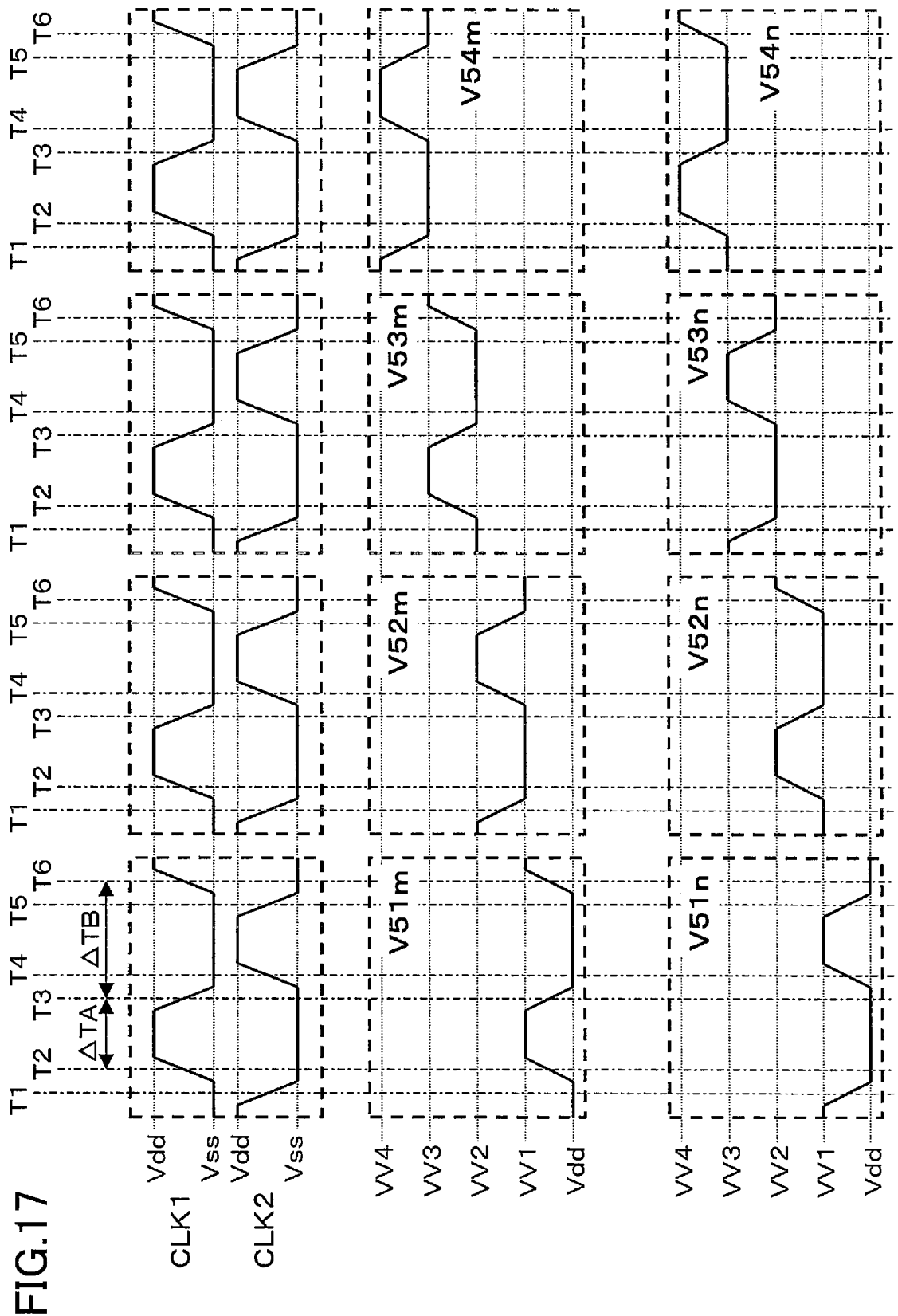
FIG. 17 is a timing chart which illustrates an operation of the charge pump circuit according to embodiment 5 of the present invention.

Next, an operation of the charge pump circuit according to embodiment 5 is described with reference to FIG. 17. Herein, it is assumed that one of clock signals CLK1 and CLK2 transitions from HIGH level (Vdd) to LOW level (Vss) before the other transitions from LOW level to HIGH level.

At time T1, clock signal CLK2 transitions from HIGH level to LOW level. Accordingly, voltages V51n, V52m, V53n and V54m decrease. As a result, voltages 51m to V54m and V51n to V54n are as follows:

$(V51m)=(V51n)=Vdd$ $(V52m)=(V52n)=Vdd+\alpha \cdot Vdd$ $(V53m)=(V53n)=Vdd+2\alpha \cdot Vdd$ $(V54m)=(V54n)=Vdd+3\alpha \cdot Vdd$ In each of the initial stages 51m and 51n, the pump stages 52m, 52n, 53m and 53n and the anti-backflow circuits 54m and 54n, the gate and source of the off-switch transistor 502 have an equal potential so that the off-switch transistor 102 is non-conducting. The gate and source of the on-switch transistor 503 also have an equal potential so that the on-switch transistor 503 is also non-conducting. Thus, at the time of transition of clock signals CLK1 and CLK2, the backflow of charge in each of the initial stage cell 51, the pump cells 52 and 53 and the anti-backflow cell 54 can be prevented.

At time T2, clock signal CLK1 transitions from LOW level to HIGH level. Accordingly, voltages V51n, V52m, V53n and V54m decrease. As a result, voltages 51m to V54m and V51n to V54n are as follows:

$(V51m)=Vdd+\alpha \cdot Vdd\ (V51n)=Vdd$ $(V52m)=Vdd+\alpha \cdot Vdd\ (V52n)=Vdd+2\alpha \cdot Vdd$ $(V53m)=Vdd+3\alpha \cdot Vdd\ (V53n)=Vdd+2\alpha \cdot Vdd$ $(V54m)=Vdd+3\alpha \cdot Vdd\ (V54n)=Vdd+4\alpha \cdot Vdd-Vt$ In the initial stage 51m, the gate-source potential difference of the off-switch transistor 502 is "Vdd" so that the off-switch transistor 502 is conducting, and the charge transfer transistor 501 is non-conducting. On the other hand, in the initial stage 51n, the gate-source potential difference of the on-switch transistor 503 is "α·Vdd" so that the on-switch transistor 503 is conducting, and the charge transfer transistor 501 is also conducting.

In each of the pump stages 52n and 53m, the gate-source potential difference of the off-switch transistor 502 is "α·Vdd" so that the off-switch transistor 502 is conducting, and the charge transfer transistor 501 is non-conducting. On the other hand, in each of the pump stages 52m and 53n, the gate-source potential difference of the on-switch transistor 503 is "α·Vdd" so that the on-switch transistor 503 is conducting, and the charge transfer transistor 501 is also conducting.

In the anti-backflow circuit 54n, the gate-source potential difference of the off-switch transistor 502 is "α·Vdd" so that the off-switch transistor 502 is conducting, and the charge transfer transistor 501 is non-conducting. On the other hand, in the anti-backflow circuit 54m, the gate-source potential difference of the on-switch transistor 503 is "α·Vdd−Vt" so that the on-switch transistor 503 is conducting, and the charge transfer transistor 501 is also conducting.

In this way, charge is transferred in each of the initial stage 51n, the pump stages 52m and 53n and the anti-backflow circuit 54m, so that voltages V51n, V52m and V53n and pumped voltage Vpump increase. Further, in each of the initial stage 51m, the pump stages 52n and 53n and the anti-backflow circuit 54n, the backflow of charge can be prevented.

At time T3, clock signal CLK1 transitions from HIGH level to LOW level. Accordingly, voltages V51m, V52n, V53m and V54n decrease. Meanwhile, voltages V51n, V52m, V53n and V54m do not vary. As a result, voltages 51m to V54m and V51n to V54n are as follows:

$(V51m)=(V51n)=Vdd$ $(V52m)=(V52n)=Vdd+\alpha \cdot Vdd$ $(V53m)=(V53n)=Vdd+2\alpha \cdot Vdd$ $(V54m)=(V54n)=Vdd+3\alpha \cdot Vdd$ In each of the initial stages 51m and 51n, the pump stages 52m, 52n, 53m and 53n and the anti-backflow circuits 54m and 54n, the same process as that carried out at time T1 is performed.

At time T4, clock signal CLK2 transitions from LOW level to HIGH level. Accordingly, voltages V51n, V52m, V53n and V54m increase. Meanwhile, voltages V51m, V52n, V53m and V54n do not vary. As a result, voltages V51m to V54m and V51n to V54n are as follows:

$(V51m)=Vdd\ (V51n)=Vdd+\alpha \cdot Vdd$ $(V52m)=Vdd+2\alpha \cdot Vdd\ (V52n)=Vdd+\alpha \cdot Vdd$ $(V53m)=Vdd+2\alpha \cdot Vdd\ (V53n)=Vdd+3\alpha \cdot Vdd$ $(V54m)=Vdd+4\alpha \cdot Vdd-Vt\ (V54n)=Vdd+3\alpha \cdot Vdd$ In the initial stage 51n, the pump stages 52m and 53n and the anti-backflow circuit 54m, the off-switch transistor 502 is conducting, and the charge transfer transistor 501 is non-conducting. On the other hand, in the initial stage 51m, the pump stages 52n and 53m and the anti-backflow circuit 54n, the on-switch transistor 503 is conducting, and the charge transfer transistor 501 is also conducting.

In this way, charge is transferred in each of the initial stage 51m, the pump stages 52n and 53m and the anti-backflow circuit 54n, so that voltages V51m, V52n and V53m and pumped voltage Vpump increase.

At time T5 and time T6, the same processes as those carried out at time T1 and time T2 are performed. In this way, the charge pump operation is repeated.

As described above, in each of the charge transfer transistor 501, the off-switch transistor 502 and the on-switch transistor 503, the gate-source potential difference and the gate-drain potential difference can be set to "α·Vdd" or lower. Therefore, the breakdown voltage limit on the transistors can be alleviated as compared with the conventional techniques. Further, the charge transfer efficiency in the anti-backflow cell 54 can be improved as compared with the conventional techniques.

It should be noted that the source of the off-switch transistor 502 may be connected to the input node N105 of a pump stage which is supplied with one of the clock signals corresponding to the pump stage that includes this off-switch transistor 502 and which is located at the same circuit stage as or a precedent circuit stage to the pump stage that includes this off-switch transistor 502.

The source of the on-switch transistor 503 may be connected to the output node N106 of a pump stage which is supplied with one of the clock signals not corresponding to the pump stage that includes this on-switch transistor 503 and which is located at the same circuit stage as or a subsequent circuit stage to the pump stage that includes this on-switch transistor 503.

The gate of the off-switch transistor 502 may be connected to the input node N105 of a pump stage which is supplied with one of the clock signals not corresponding to the pump stage that includes this off-switch transistor 502 and which is located at the same circuit stage as or a precedent circuit stage to the pump stage that includes this off-switch transistor 502.

The gate of the on-switch transistor 503 may be connected to the output node N106 of a pump stage which is supplied with one of the clock signals corresponding to the pump stage that includes this on-switch transistor 503 and which is located at the same circuit stage as or a subsequent circuit stage to the pump stage that includes this on-switch transistor 503.

Variations of Embodiment 5

Figure 18:
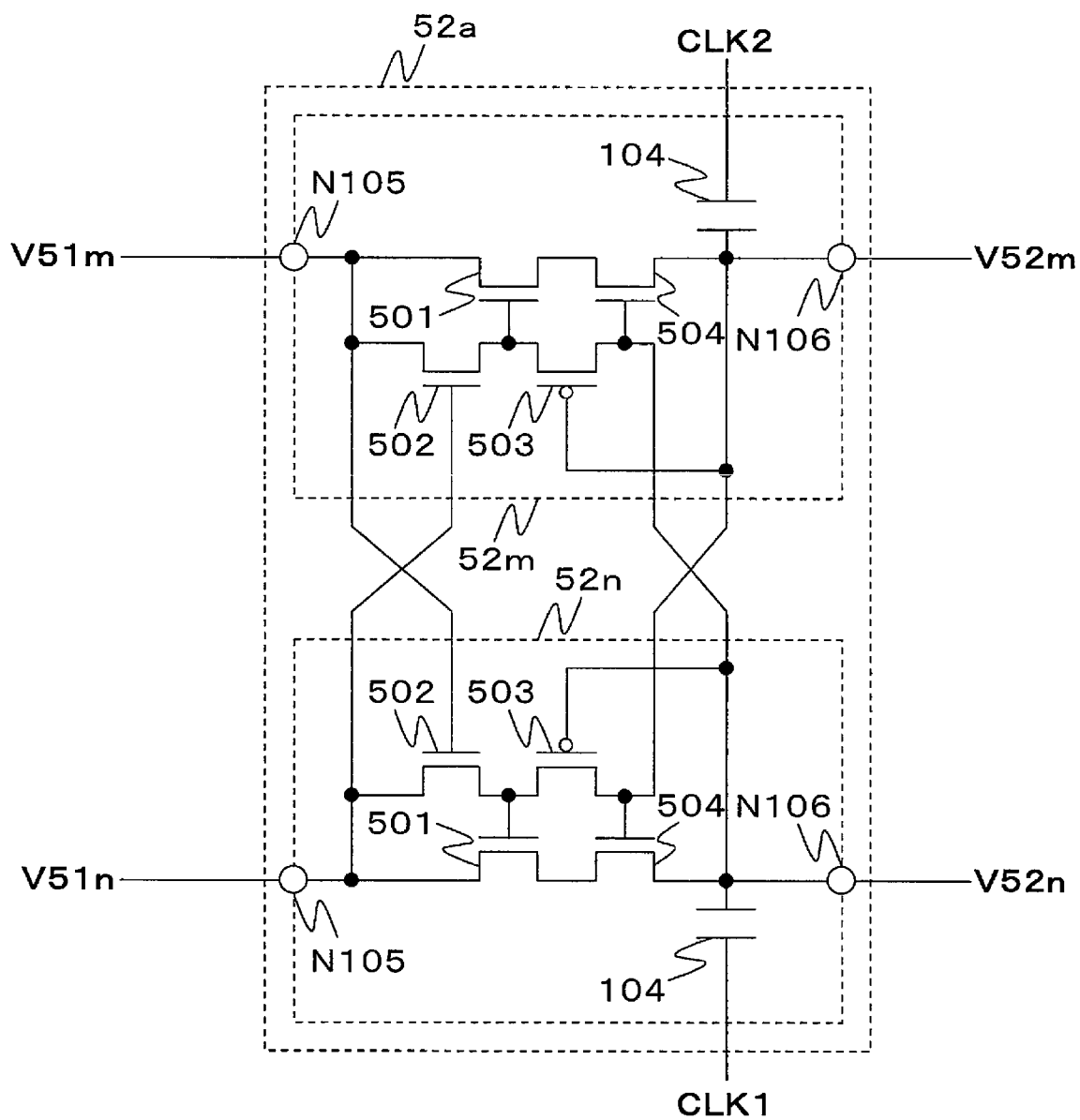
FIG. 18 is a circuit diagram showing a variation of the pump cell shown in FIG. 14.

It should be noted that, as shown in FIG. 18, a subsidiary charge transfer transistor 504 may be connected between the charge transfer transistor 501 and the output node N106. In a pump cells 52a shown in FIG. 18, the transistors 501, 502 and 503 can be driven by a voltage equal to or lower than the maximum voltage levels of clock signals CLK1 and CLK2. Therefore, the breakdown voltage limit on the transistors can be further alleviated.

Embodiment 6

Figure 19:
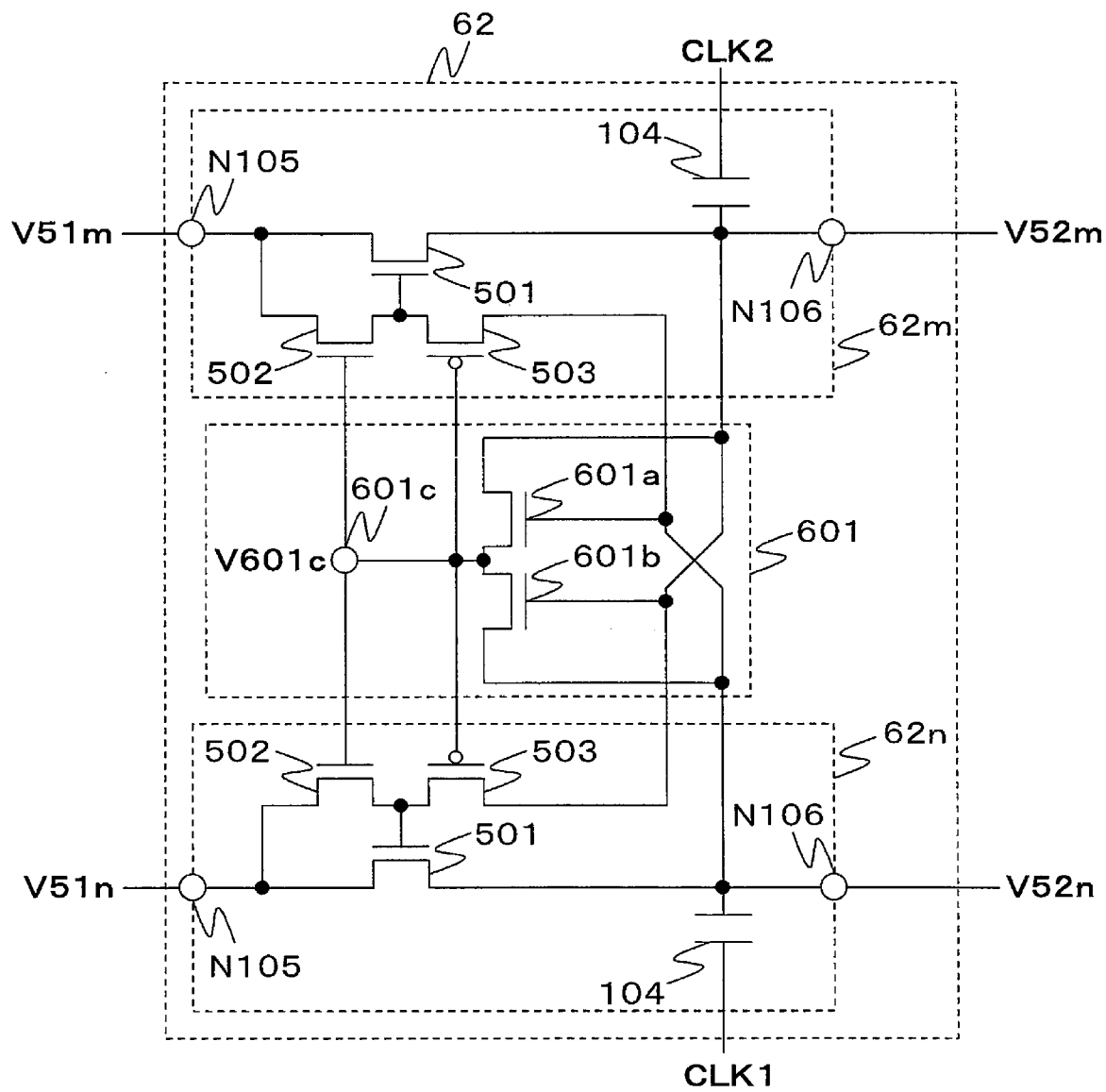
FIG. 19 is a circuit diagram showing the structure of a pump cell according to embodiment 6 of the present invention.

FIG. 19 shows the structure of a pump cell according to embodiment 6 of the present invention. The pump cell 62 shown in FIG. 19 includes pump stages 62m and 62n and an analog comparator circuit 601. The analog comparator circuit 601 corresponds to the pump stages 62m and 62n and includes transistors 601a and 601b. In each of the pump stages 62m and 62n, the gates of the off-switch transistor 502 and the on-switch transistor 503 are connected to a gate control node 601c. The analog comparator circuit 601 connects to the gate control node 601c one of the output nodes N106 of the pump stages 62m and 62n which has a lower voltage. The other elements are the same as those of the pump cell 52 of FIG. 14.

[Operation]

Figure 20:
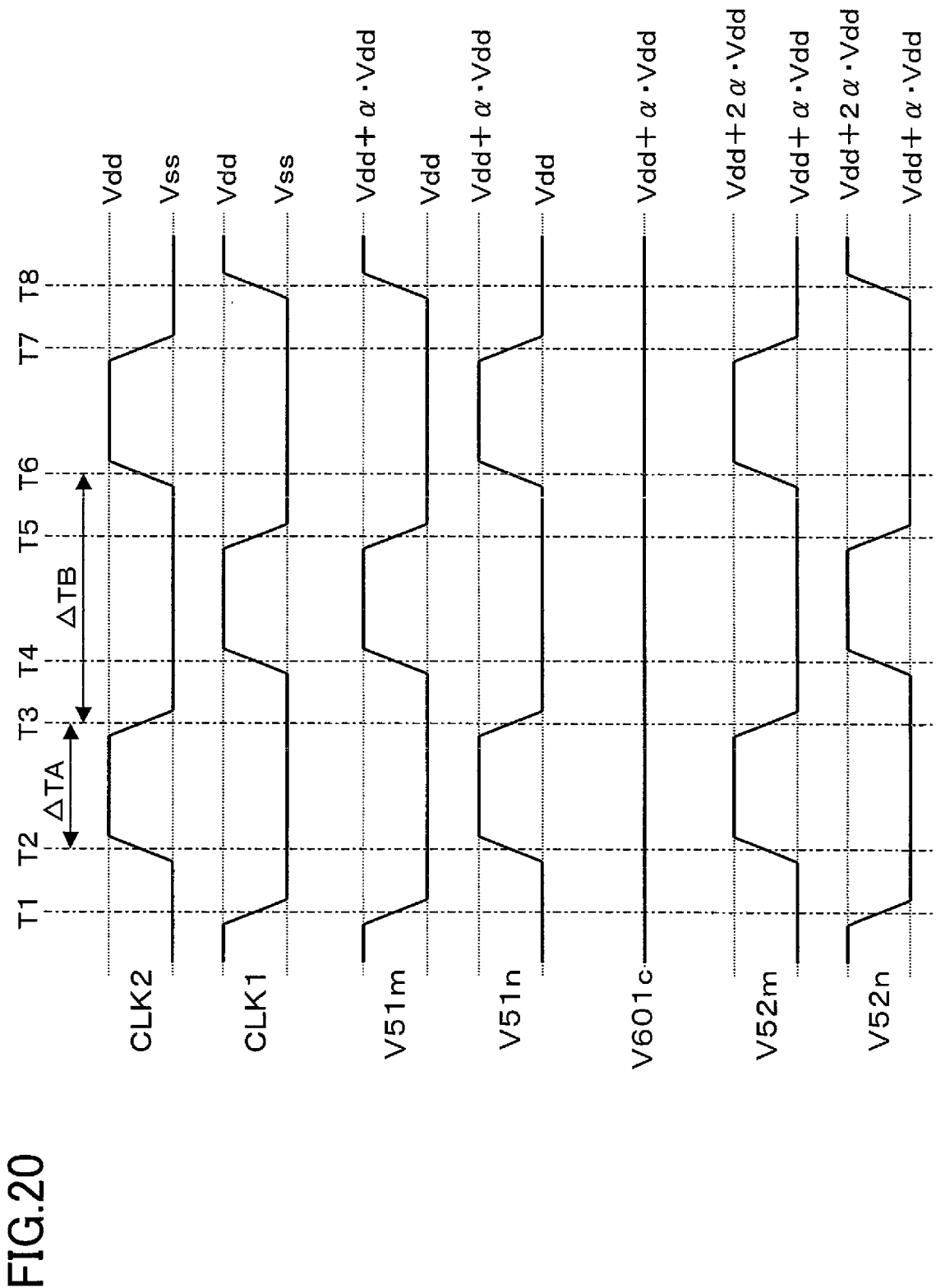
FIG. 20 is a timing chart which illustrates an operation of the pump cell shown in FIG. 19.

Next, an operation of the pump cell 62 shown in FIG. 19 is described with reference to FIG. 20.

When voltages V51m, V51n, V52m and V52n are, respectively, "Vdd", "Vdd+α·Vdd", "Vdd+2α·Vdd" and "Vdd+α·Vdd" (e.g., in the period from time T2 to time T3), in the analog comparator circuit 601, the transistor 601b is conducting so that the output node N106 of the pump stage 62n is connected to the gate control node 601c. In the pump stage 62m, the off-switch transistor 502 is conducting, and the charge transfer transistor 501 is non-conducting. On the other hand, in the pump stage 62n, the on-switch transistor 503 is conducting, and the charge transfer transistor 501 is also conducting.

When voltages V51m, V51n, V52m and V52n are, respectively, "Vdd+α·Vdd", "Vdd", "Vdd+α·Vdd" and "Vdd+2α·Vdd" (e.g., in the period from time T4 to time T5), in the analog comparator circuit 601, the transistor 601a is conducting so that the output node N106 of the pump stage 62m is connected to the gate control node 601c. In the pump stage 62m, the on-switch transistor 503 is conducting, and the charge transfer transistor 501 is also conducting. On the other hand, in the pump stage 62n, the off-switch transistor 502 is conducting, and the charge transfer transistor 501 is non-conducting.

When both voltages V51m and V51n are "Vdd" and both voltages V52m and V52n are "Vdd+α·Vdd" (e.g., in the period from time T1 to time T2), in the analog comparator circuit 601, both the transistors 601a and 601b are non-conducting. As a result, voltage V601c at the gate control node 601c is maintained at "Vdd+α·Vdd". In each of the pump stages 62m and 62n, the off-switch transistor 502 is conducting, and the charge transfer transistor 501 is non-conducting.

As described above, voltage V601c at the gate control node 601c is always maintained at "Vdd+α·Vdd". Therefore, in each of the charge transfer transistor 501, the off-switch transistor 502 and the on-switch transistor 503, the gate-drain potential difference and the gate-source potential difference can always be set to "α·Vdd" or lower. Therefore, the breakdown voltage limit on the transistors can be further alleviated.

In each of the gates of the off-switch transistor 502 and the on-switch transistor 503, the amount of charge to be charged or discharged can be reduced.

It should be noted that the analog comparator circuit 601 may correspond to a pump stage which is supplied with clock signal CLK1 and to a pump stage which is supplied with clock signal CLK2 and which is located at the same circuit stage as that pump stage.

Variations of Embodiment 6

Figure 21:
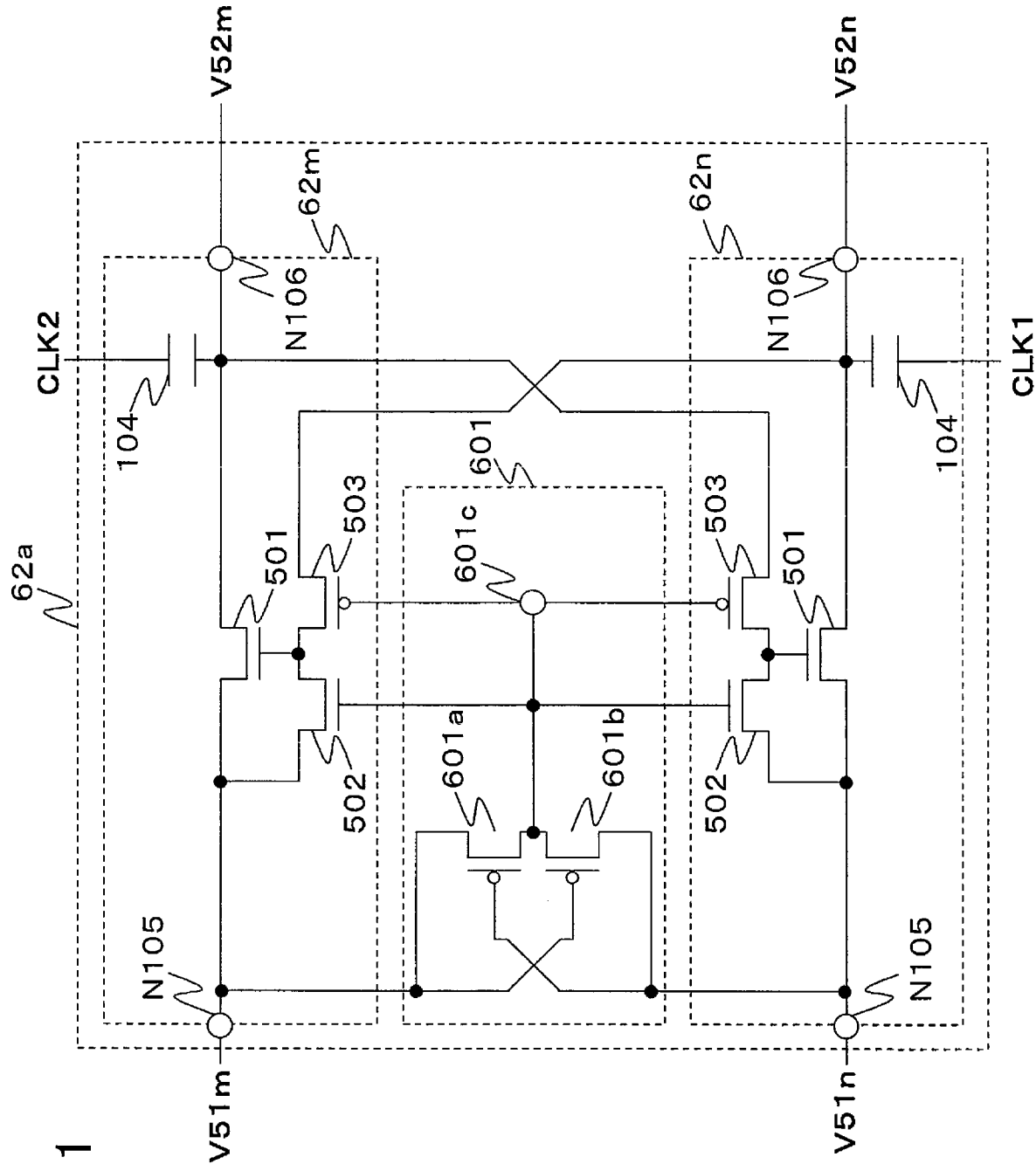
FIG. 21 is a circuit diagram showing a variation of the pump cell shown in FIG. 19.

Alternatively, as shown in FIG. 21, the analog comparator circuit 601 may compare the voltage at the input node N105 of the pump stage 62m and the voltage at the input node N105 of the pump stage 62n and select one of the input nodes N105 of the pump stages 62m and 62n according to the comparison result. In the pump cell 62a shown in FIG. 21, the analog comparator circuit 601 connects to the gate control node 601c one of the input nodes N105 of the pump stages 32m and 32n which has a higher voltage.

Even with such an arrangement, in each of the charge transfer transistor 501, the off-switch transistor 502 and the on-switch transistor 503, the gate-drain potential difference and the gate-source potential difference can always be set to "α·Vdd" or lower.

Embodiment 7

Figure 22:
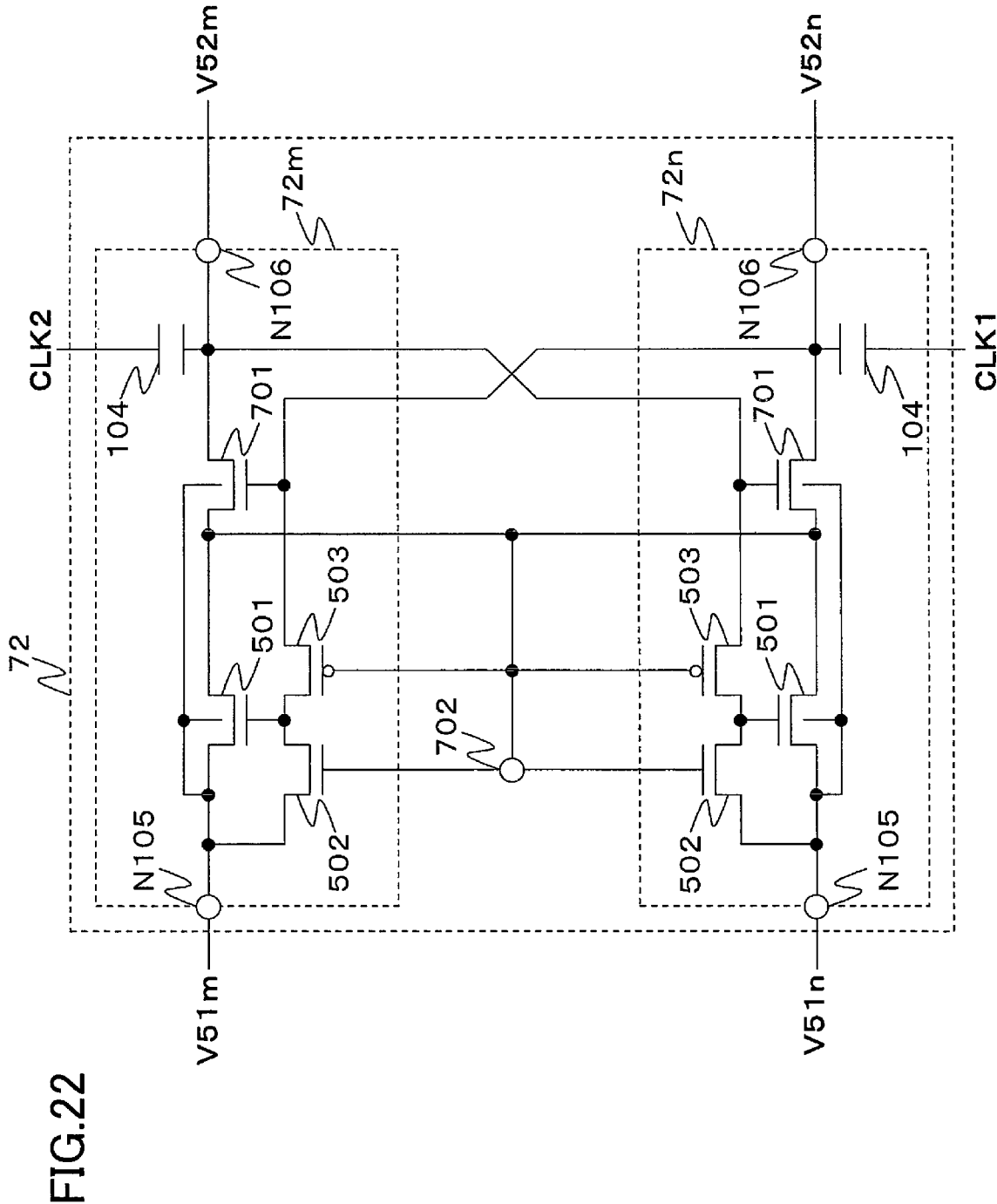
FIG. 22 is a circuit diagram showing the structure of a pump cell according to embodiment 7 of the present invention.

FIG. 22 shows the structure of a pump cell according to embodiment 7 of the present invention. In the pump cell 72 shown in FIG. 22, pump stages 72m and 72n each include a subsidiary charge transfer transistor 701 in addition to the charge transfer transistor 501, the off-switch transistor 502, the on-switch transistor 503 and the pump capacitor 104 shown in FIG. 14. The subsidiary charge transfer transistor 701 and the charge transfer transistor 501 have the same polarity and connected together in series between the input node N105 and the output node N106. The connection node of the charge transfer transistor 501 and the subsidiary charge transfer transistor 701 is connected to a gate control node 702. In each of the pump stages 72m and 72n, the gates of the off-switch transistor 502 and the on-switch transistor 503 are connected to a gate control node 702.

It should be noted that, in each of the pump stages 72m and 72n, the well of the charge transfer transistor 501 and the well of the subsidiary charge transfer transistor 701 are connected together for the purpose of area reduction.

[Operation]

Next, an operation of the pump cell 72 shown in FIG. 22 is described.

When voltages V51m, V51n, V52m and V52n are "Vdd+α·Vdd", "Vdd", "Vdd+α·Vdd" and "Vdd+2α·Vdd", respectively, the subsidiary charge transfer transistor 701 of the pump stage 72m is conducting while the subsidiary charge transfer transistor 701 of the pump stage 72n is non-conducting. As a result, the voltage at the gate control node 702 is "Vdd+α·Vdd". In the pump stage 72m, the on-switch transistor 503 is conducting, and the charge transfer transistor 501 is also conducting. On the other hard, in the pump stage 72n, the off-switch transistor 502 is conducting, and the charge transfer transistor 501 is non-conducting.

When voltages V51m, V51n, V52m and V52n are "Vdd", "Vdd+α·Vdd", "Vdd+2α·Vdd" and "Vdd+α·Vdd", respectively, the subsidiary charge transfer transistor 701 of the pump stage 72m is non-conducting while the subsidiary charge transfer transistor 701 of the pump stage 72n is conducting. As a result, the voltage at the gate control node 702 is "Vdd+α·Vdd". In the pump stage 72m, the off-switch transistor 502 is conducting, and the charge transfer transistor 501 is non-conducting. On the other hand, in the pump stage 72n, the on-switch transistor 503 is conducting, and the charge transfer transistor 501 is also conducting.

When both voltages V51m and V51n are "Vdd+α·Vdd" and both voltages V52m and V52n are "Vdd+2α·Vdd", in both the pump stages 72m and 72n, the subsidiary charge transfer transistor 701 is non-conducting. As a result, the voltage at the gate control node 702 is maintained at "Vdd+α·Vdd". In each of the pump stages 72m and 72n, the off-switch transistor 502 is conducting, and the charge transfer transistor 501 is non-conducting.

As described above, the voltage at the gate control node 702 is always maintained at "Vdd+α·Vdd". Thus, in each of the charge transfer transistor 501, the off-switch transistor 502 and the on-switch transistor 503, the gate-drain potential difference and the gate-source potential difference can always be set to "a-Vdd" or lower. Therefore, the breakdown voltage limit on the transistors can be further alleviated.

It should be noted that the gate of the subsidiary charge transfer transistor 701 may be connected to the output node N106 of a pump stage which is supplied with one of the clock signals not corresponding to the pump stage that includes this subsidiary charge transfer transistor 701 and which is located at the same circuit stage as or a subsequent circuit stage to the pump stage that includes this subsidiary charge transfer transistor 701.

Variations of Embodiment 7

Figure 23:
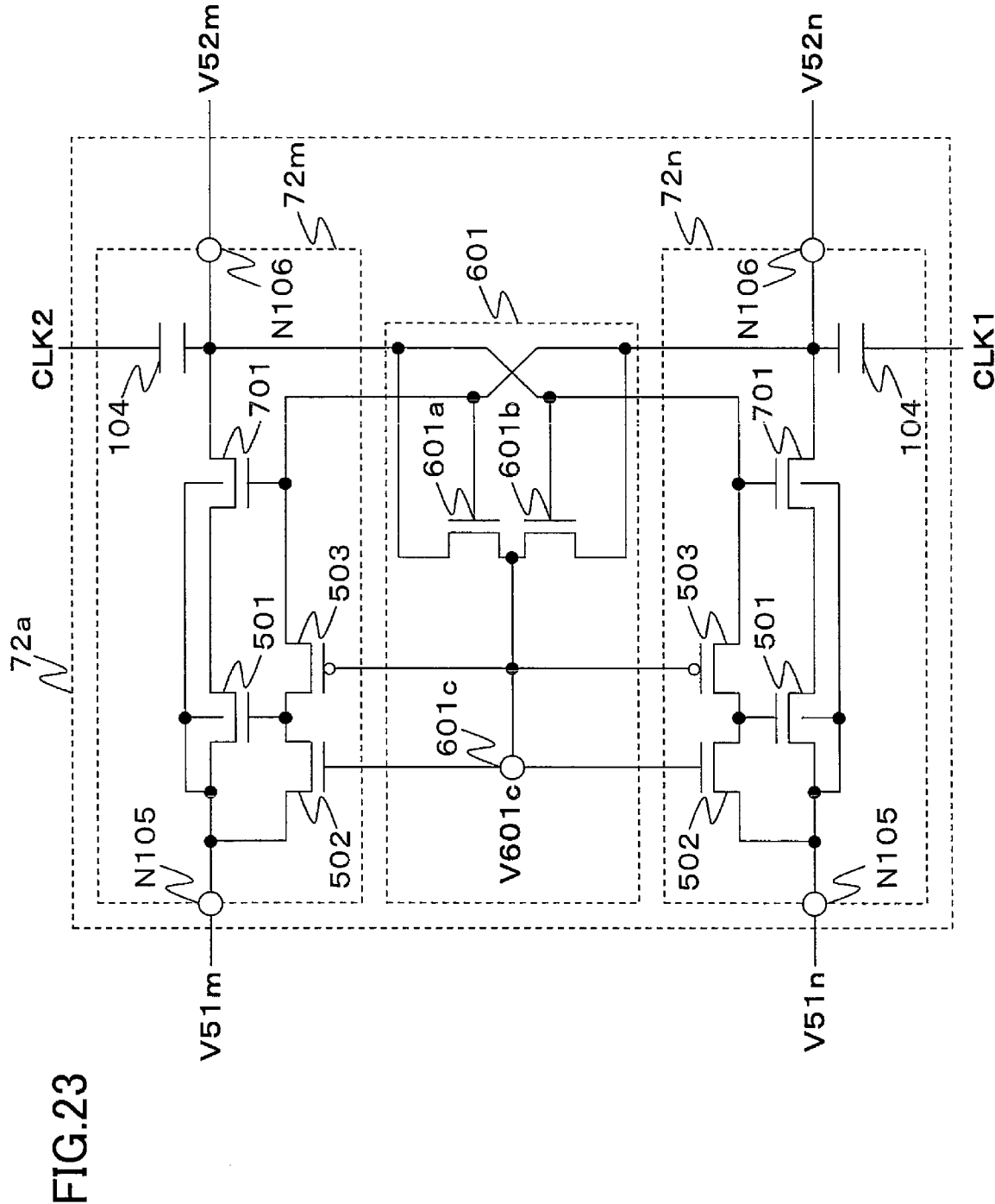
FIG. 23 is a circuit diagram showing a variation of the pump cell shown in FIG. 22.

As in a pump cell 72a shown in FIG. 23, the subsidiary charge transfer transistor 701 of FIG. 22 and the analog comparator circuit 601 of FIG. 19 may be used together. With such an arrangement, in each of the charge transfer transistor 501, the off-switch transistor 502, the on-switch transistor 503 and the subsidiary charge transfer transistor 701, the gate-drain potential difference and the gate-source potential difference can be set to "α·Vdd" or lower. Further, in each of the charge transfer transistor 501 and the subsidiary charge transfer transistor 701, the amount of charge to be charged or discharged in the diffusion capacitance can be reduced.

(Variations of Anti-Backflow Cell)

The anti-backflow cells of the charge pump circuits of the above-described embodiments may be replaced by any of anti-backflow cells 54a to 54g which are shown in FIG. 24 to FIG. 30, respectively.

[Anti-Backflow Cell Variation 1]

Figure 24:
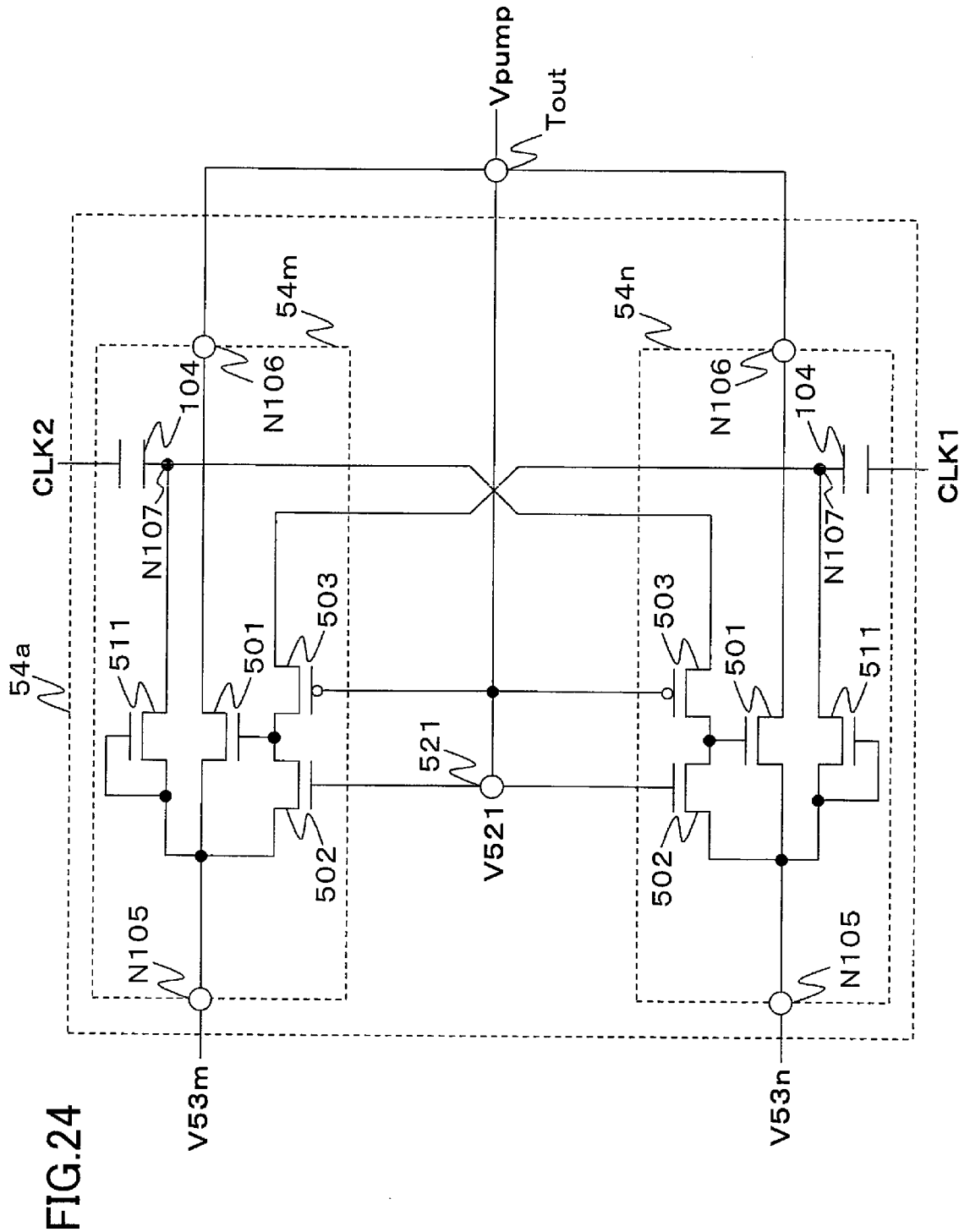
FIG. 24 is a circuit diagram showing anti-backflow cell variation 1.

The anti-backflow cell 54a shown in FIG. 24 includes the anti-backflow circuits 54m and 54n of FIG. 16. In each of the anti-backflow circuits 54m and 54n, the gates of the off-switch transistor 502 and the on-switch transistor 503 are connected to a gate control node 521. The gate control node 521 is connected to the output terminal Tout. The other elements are the same as those of the anti-backflow cell 54 of FIG. 16.

With such a structure, in each of the charge transfer transistor 501, the off-switch transistor 502 and the on-switch transistor 503, the gate-source potential difference and the gate-drain potential difference can always be set to "α·Vdd" or lower. Further, at each of the gates of the off-switch transistor 502 and the on-switch transistor 503, the amount of charge to be charged or discharged can be reduced.

[Anti-Backflow Cell Variation 2]

Figure 25:
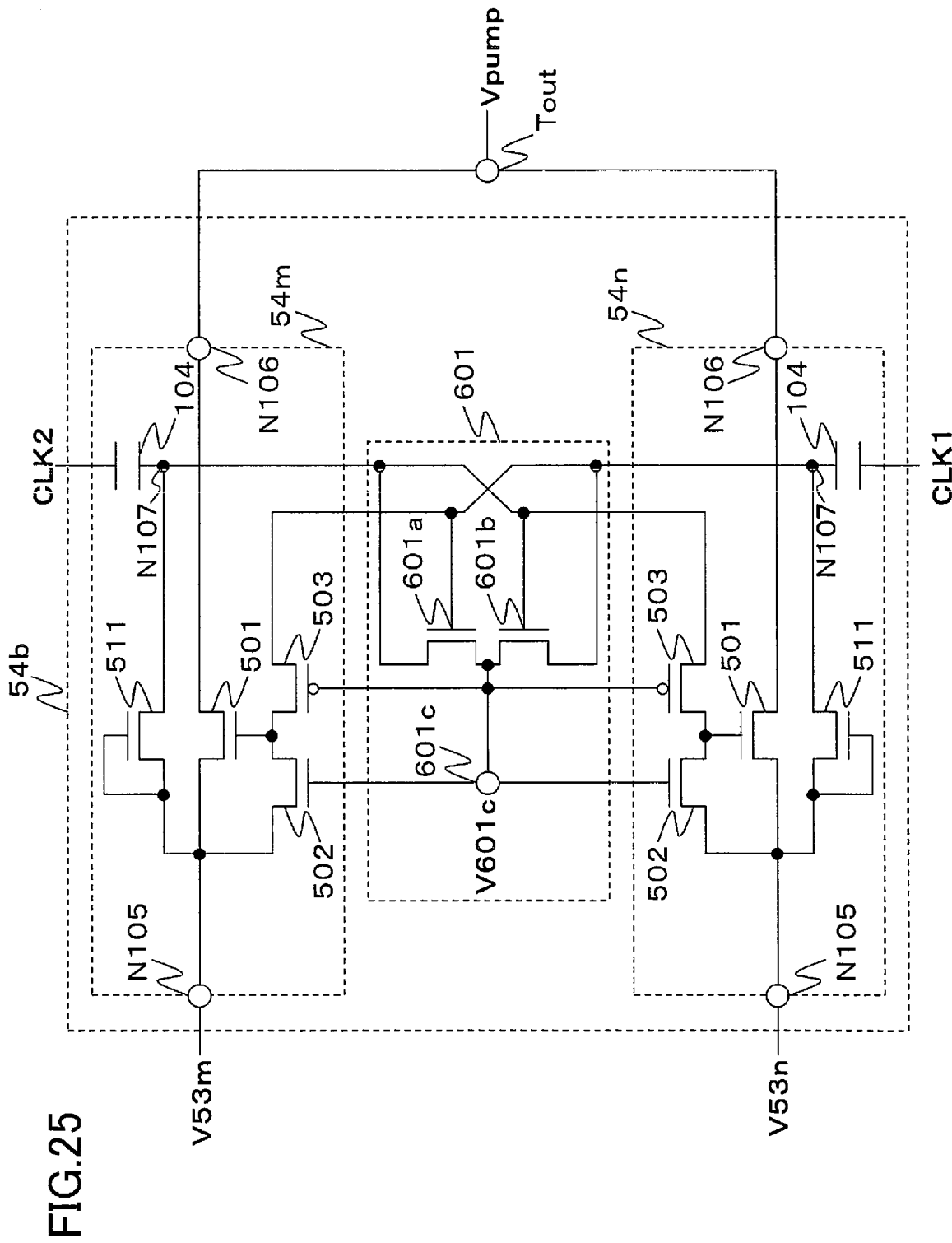
FIG. 25 is a circuit diagram showing anti-backflow cell variation 2.

The anti-backflow cell 54b shown in FIG. 25 includes the anti-backflow circuits 54m and 54n of FIG. 24 and the analog comparator circuit 601 of FIG. 19. In each of the anti-backflow circuits 54m and 54n, the gates of the off-switch transistor 502 and the on-switch transistor 503 are connected to the gate control node 601c. The other elements are the same as those of the anti-backflow cell 54a of FIG. 24.

This structure also achieves the same effects as those produced by the anti-backflow cell 54a of FIG. 24.

[Anti-Backflow Cell Variation 3]

Figure 26:
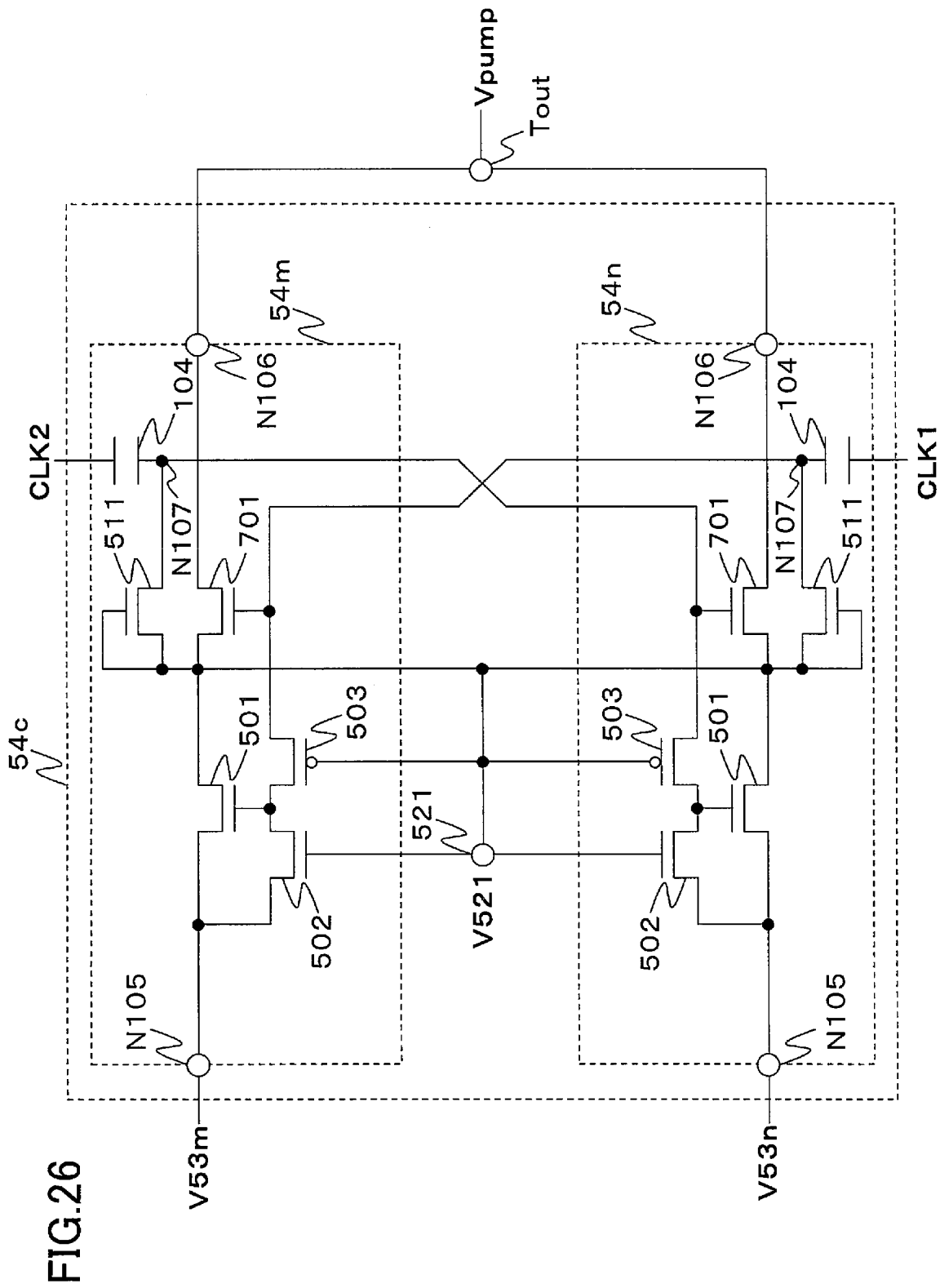
FIG. 26 is a circuit diagram showing anti-backflow cell variation 3.

In the anti-backflow cell 54c shown in FIG. 26, the anti-backflow circuits 54m and 54n each include the subsidiary charge transfer transistor 701 of FIG. 22 in addition to the charge transfer transistor 501, the off-switch transistor 502, the on-switch transistor 503, the pump capacitor 104 and the diode-connected transistor 511 shown in FIG. 16. The connection node of the charge transfer transistor 501 and the subsidiary charge transfer transistor 701 is connected to the gate control node 521. The gates of the off-switch transistor 502 and the on-switch transistor 503 are also connected to the gate control node 521. The diode-connected transistor 511 is connected between the intermediate node N107 and the connection node of the charge transfer transistor 501 and the subsidiary charge transfer transistor 701.

With this structure, the voltage between terminals of the charge transfer transistor 501 can be set to "α·Vdd" or lower.

[Anti-Backflow Cell Variation 4]

Figure 27:
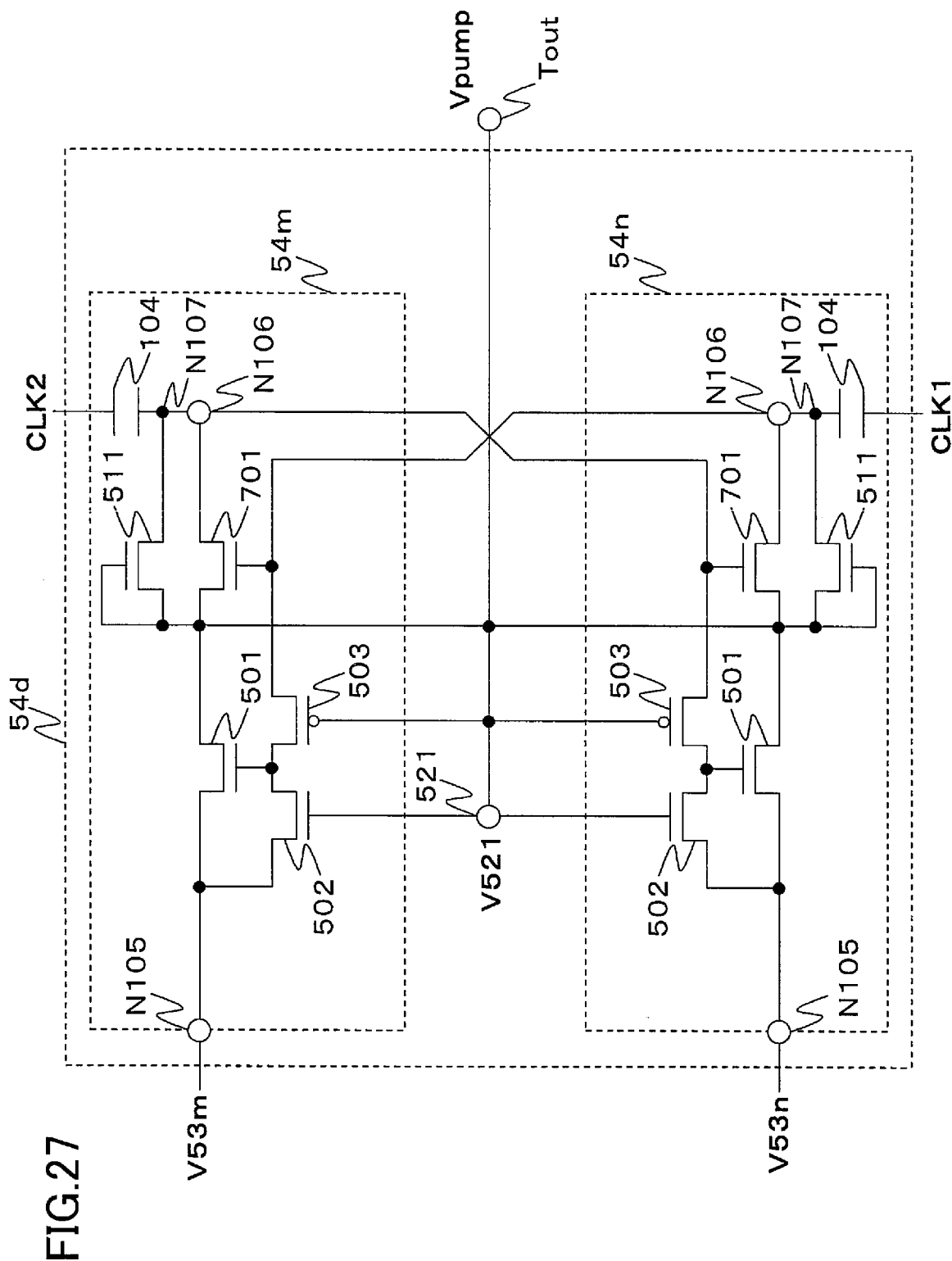
FIG. 27 is a circuit diagram showing anti-backflow cell variation 4.

In the anti-backflow cell 54d shown in FIG. 27, connected to the output terminal Tout is not the output node N106 but the gate control node 521. The output node N106 is connected to the intermediate node N107. The other elements are the same as those of the anti-backflow cell 54c of FIG. 26.

With such a structure, the voltage between terminals of the charge transfer transistor 501 can be set to "α·Vdd" or lower. With the subsidiary charge transfer transistor 701 connected between the intermediate node N107 and the output terminal Tout, a charge pump operation can be performed after the intermediate node N107 is set to a potential equal to the input node N105. Thus, the gate voltage of the charge transfer transistor 501 can be increased (specifically, by threshold voltage Vt), and therefore, the transfer efficiency and transfer rate of the charge transfer transistor 501 can be improved.

[Anti-Backflow Cell Variation 5]

Figure 28:
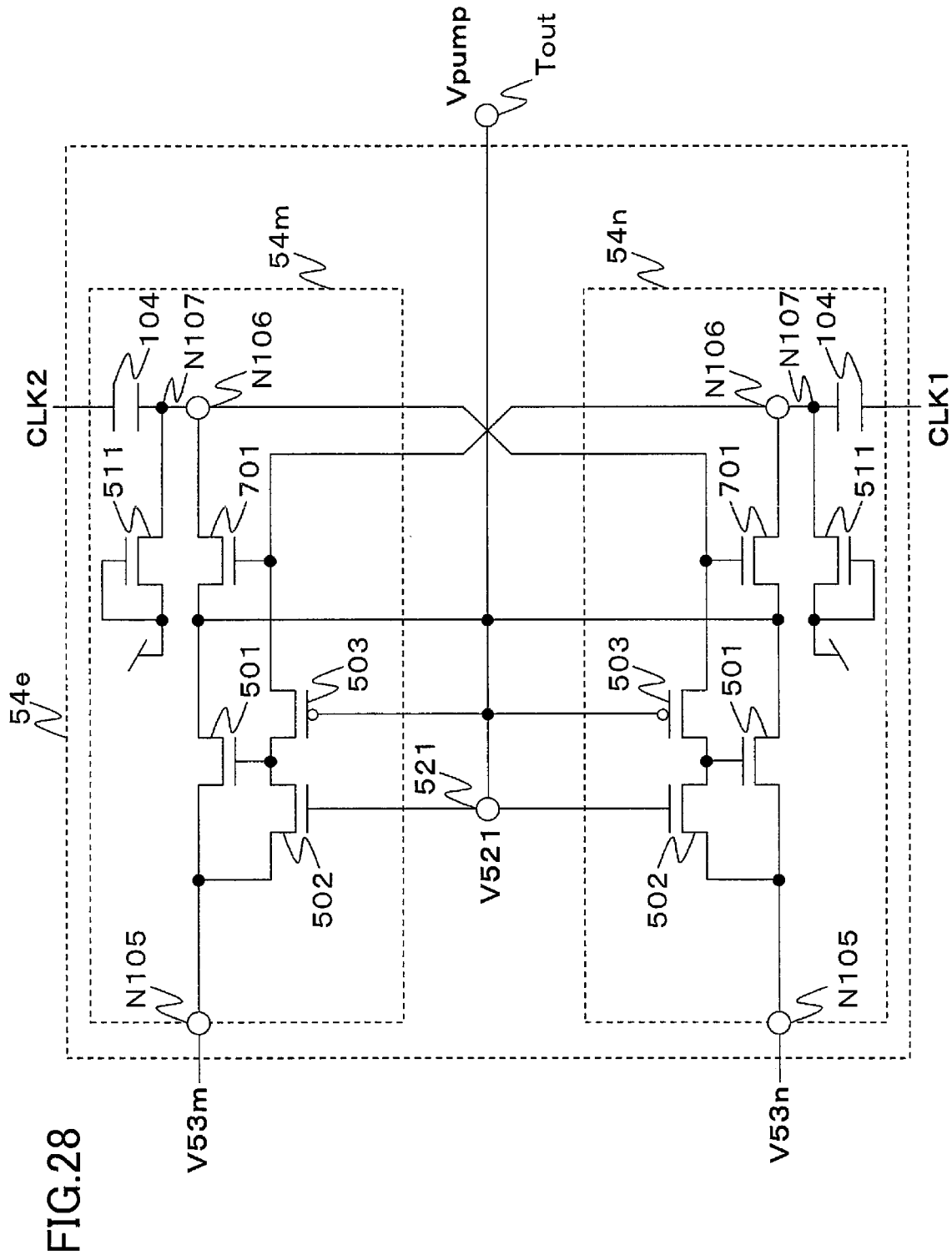
FIG. 28 is a circuit diagram showing anti-backflow cell variation 5.

In the anti-backflow cell 54e shown in FIG. 28, the diode-connected transistor 511 is connected between the power supply node and the intermediate node N107. The other elements are the same as those of the anti-backflow cell 54d of FIG. 27.

With this structure, the adverse effects of the parasitic capacitance of the diode-connected transistor 511 can be removed, and the pumping efficiency can be improved.

[Anti-Backflow Cell Variation 6]

Figure 29:
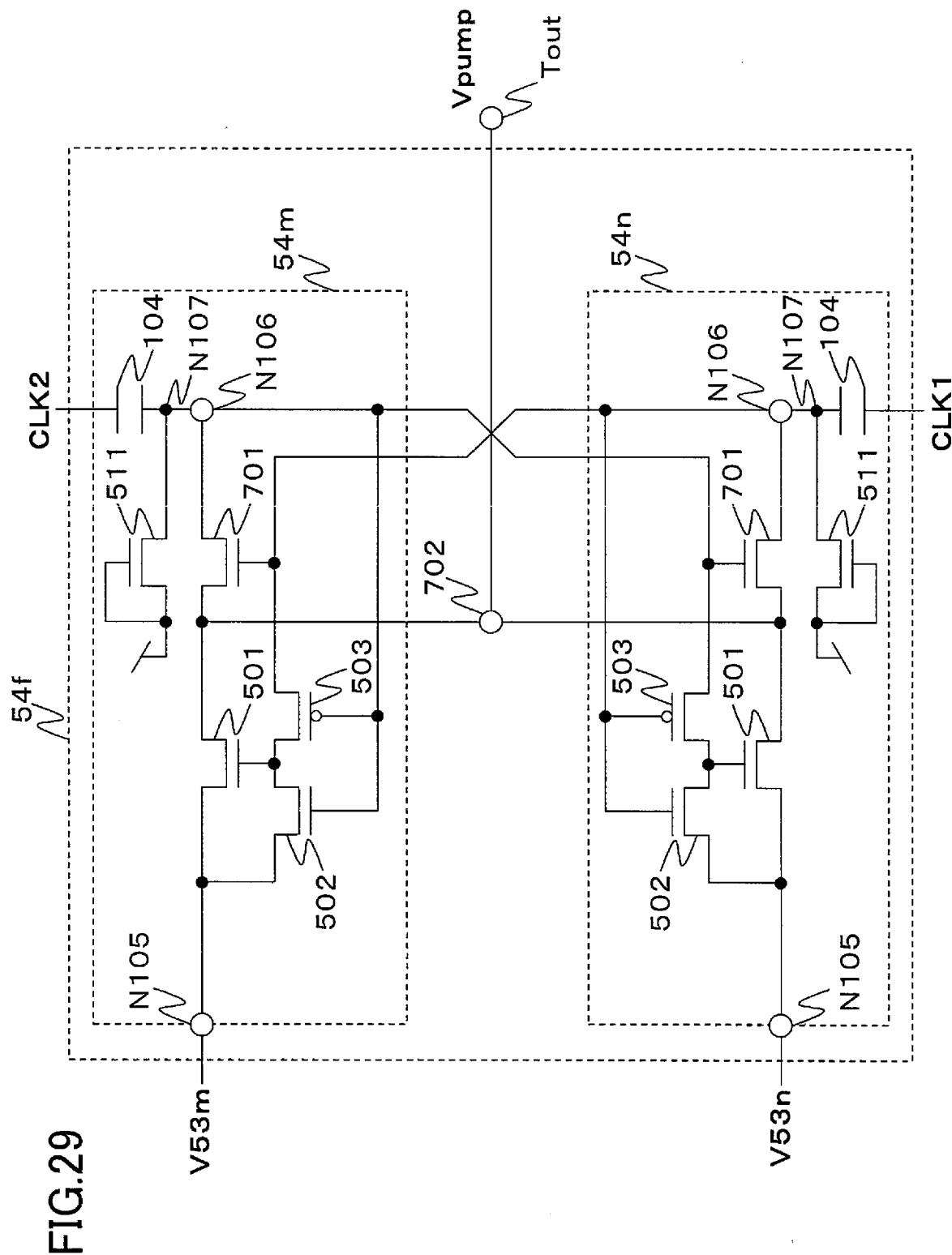
FIG. 29 is a circuit diagram showing anti-backflow cell variation 6.

In the anti-backflow cell 54f shown in FIG. 29, the gates of the off-switch transistor 502 and the on-switch transistor 503 are connected to the output node N106. The connection node of the charge transfer transistor 501 and the subsidiary charge transfer transistor 701 is connected to the gate control node 702, and the gate control node 702 is connected to the output terminal Tout. The other elements are the same as those of the anti-backflow cell 54e of FIG. 28.

With this structure, the adverse effects of the parasitic capacitance of the diode-connected transistor 511 can be removed, and the pumping efficiency can be improved.

[Anti-Backflow Cell Variation 7]

Figure 30:
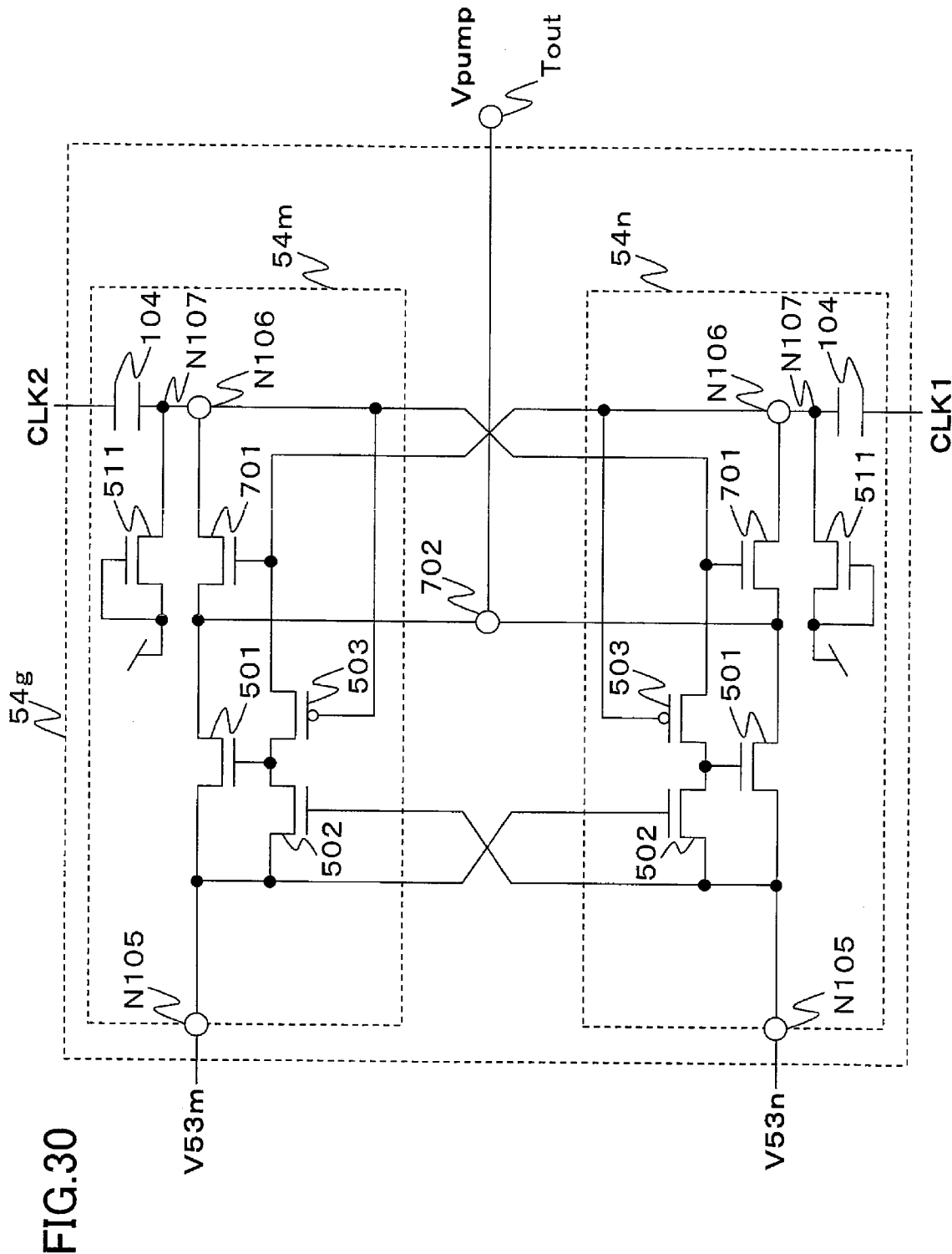
FIG. 30 is a circuit diagram showing anti-backflow cell variation 7.

In the anti-backflow cell 54g shown in FIG. 30, the gate of the off-switch transistor 502 included in each of the anti-backflow circuits 54m and 54n is connected to the input node N105 of the counterpart anti-backflow circuit. The other elements are the same as those of the anti-backflow cell 54f of FIG. 29.

With this structure, the adverse effects of the parasitic capacitance of the diode-connected transistor 511 can be removed, and the pumping efficiency can be improved.

(Negative Voltage Generating Charge Pump Circuit)

Figure 31:
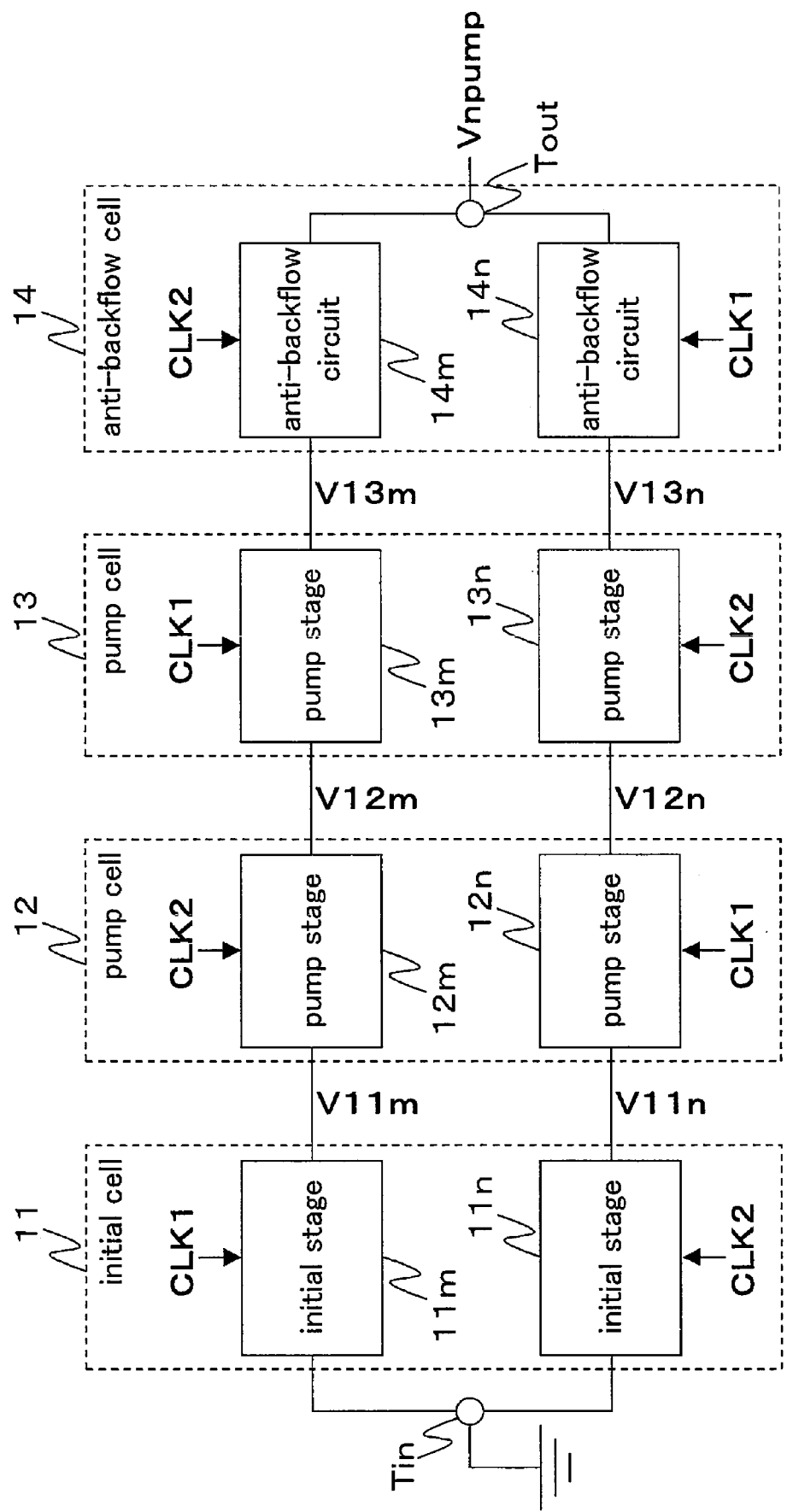
FIG. 31 is a block diagram showing the structure of a charge pump circuit designed to generate a negative pumped voltage.
Figure 32:
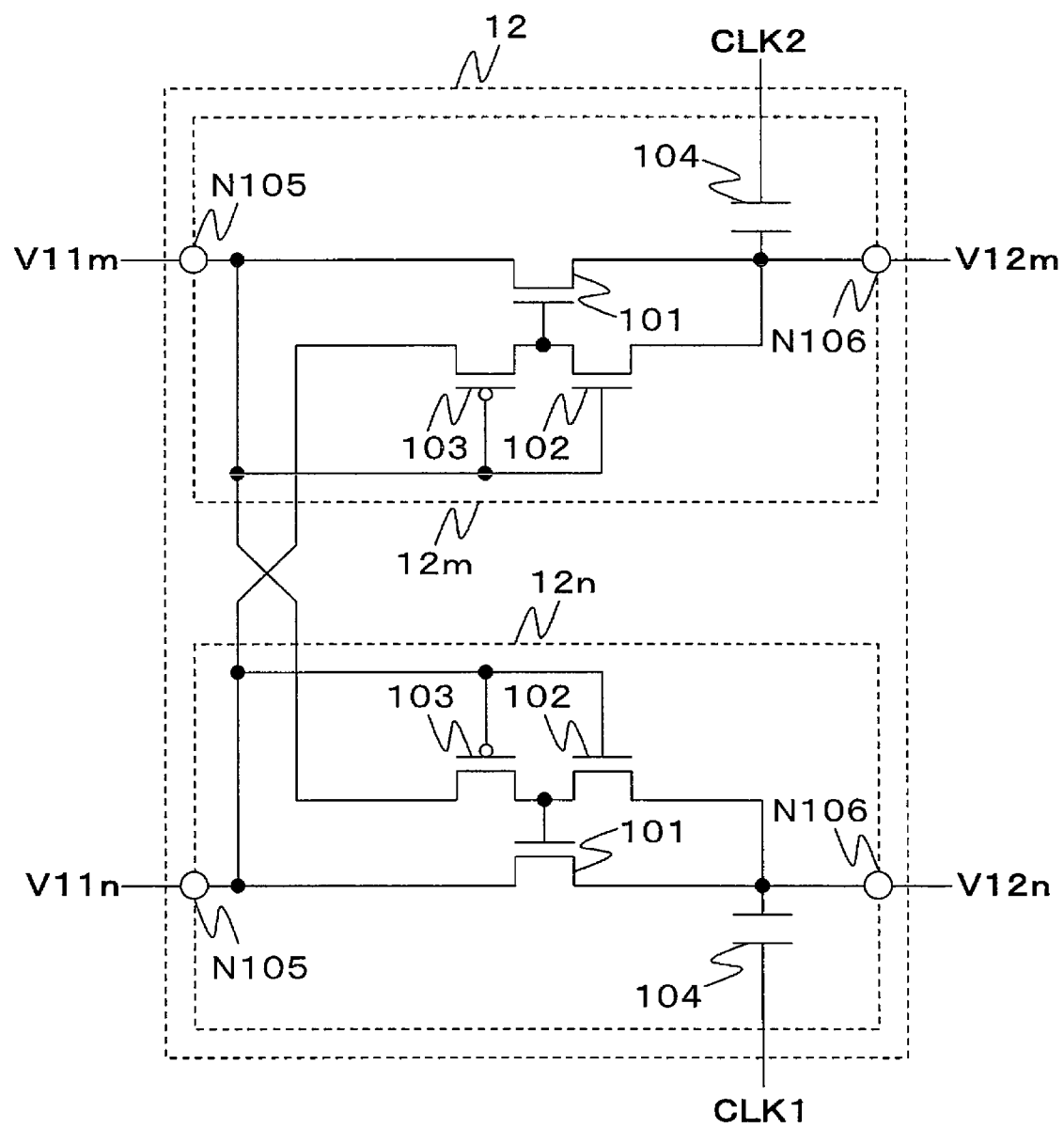
FIG. 32 is a circuit diagram showing the structure of a pump cell shown in FIG. 31.
Figure 33:
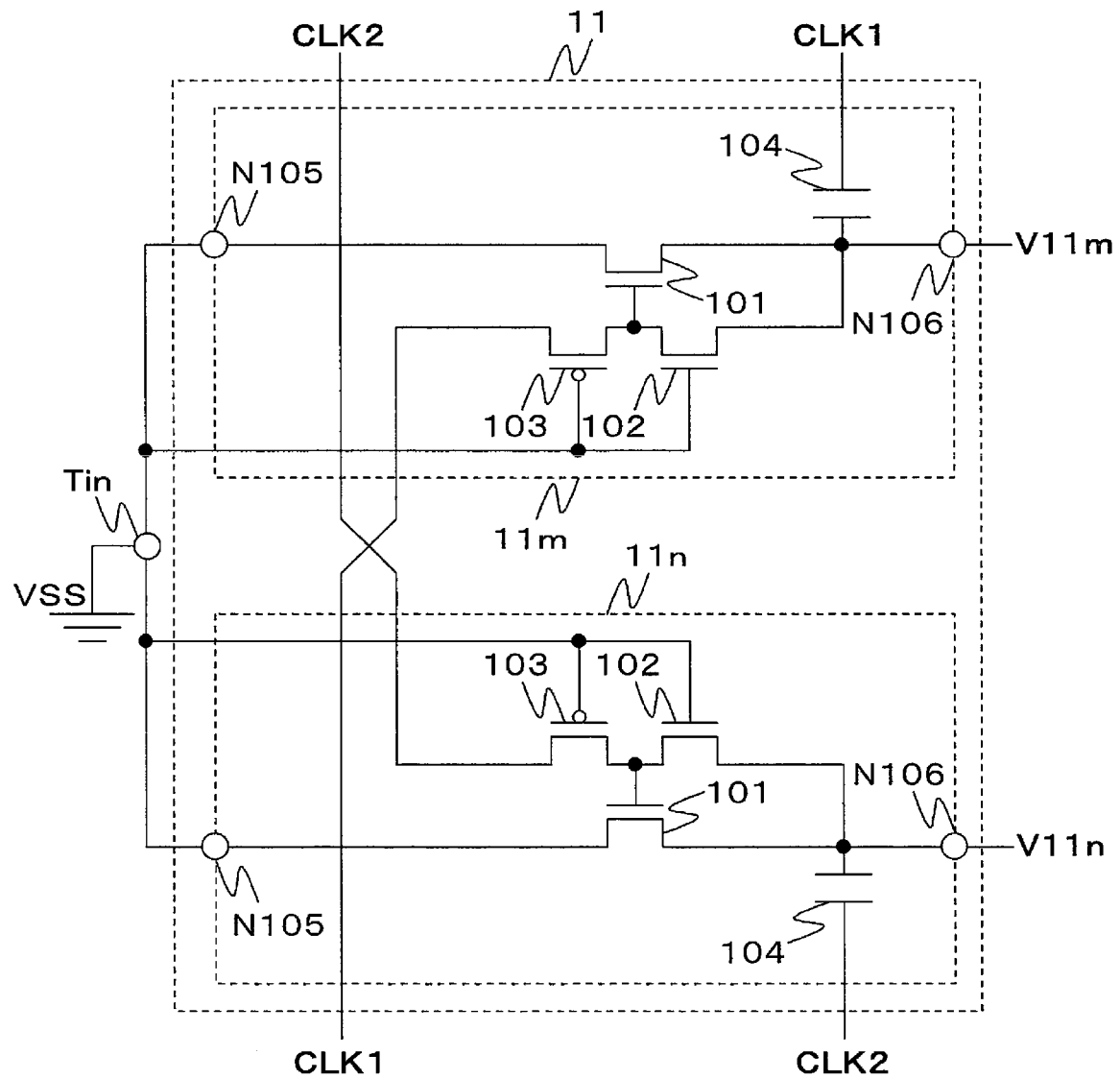
FIG. 33 is a circuit diagram showing the structure of an initial cell shown in FIG. 31.
Figure 34:
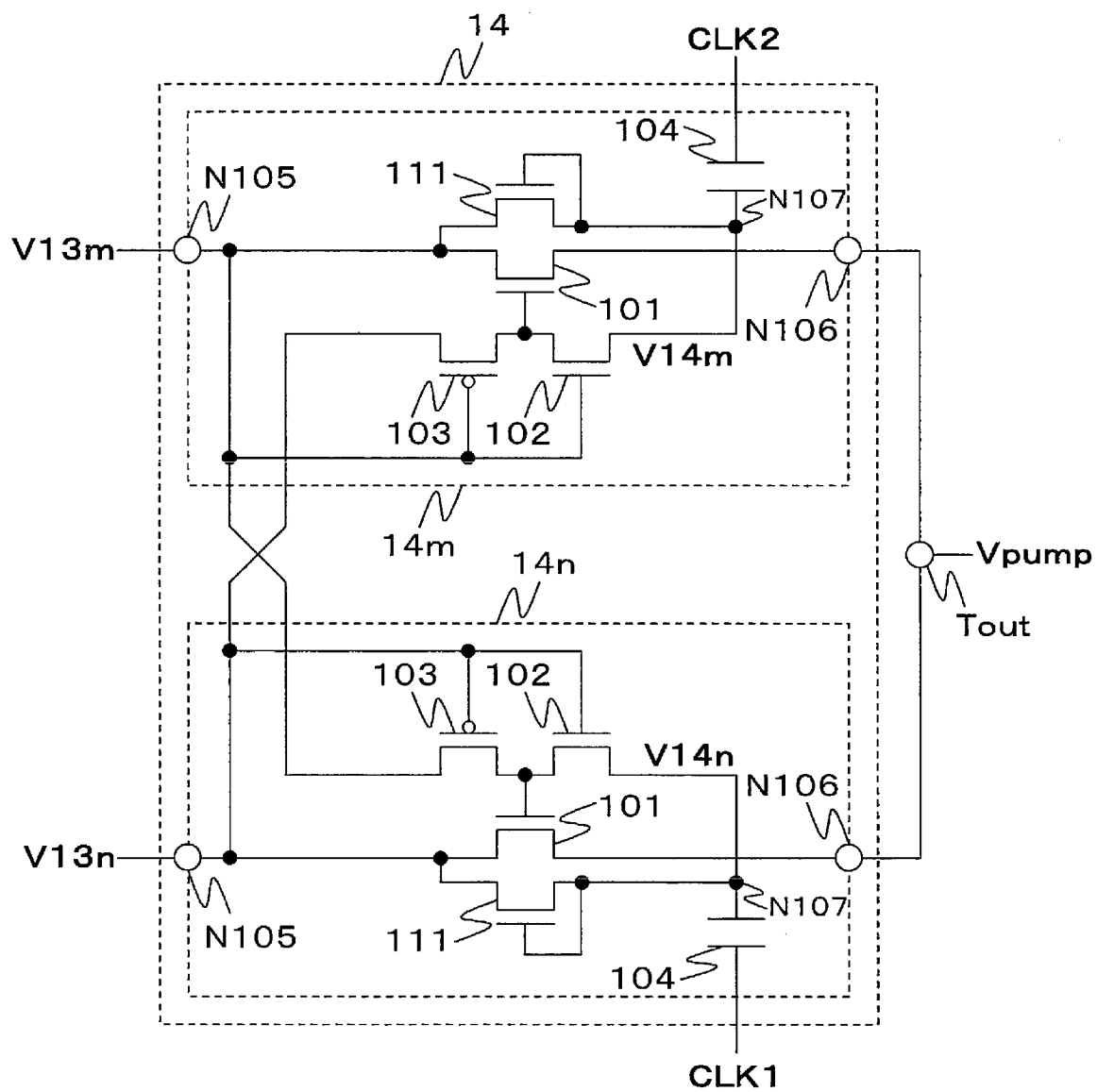
FIG. 34 is a circuit diagram showing the structure of an anti-backflow cell shown in FIG. 31.
Figure 35:
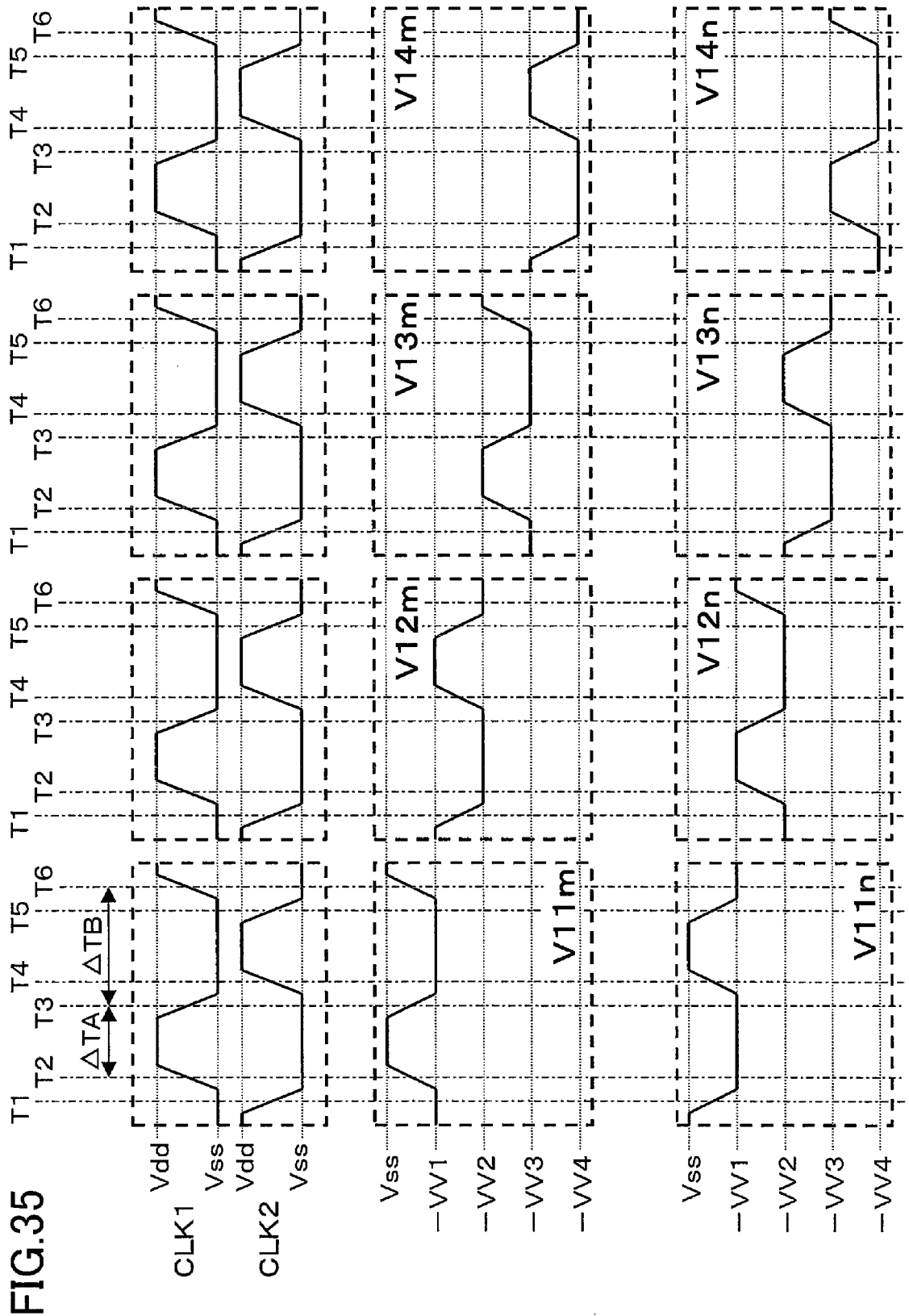
FIG. 35 is a timing chart which illustrates an operation of the charge pump circuit shown in FIG. 31.
Figure 36:
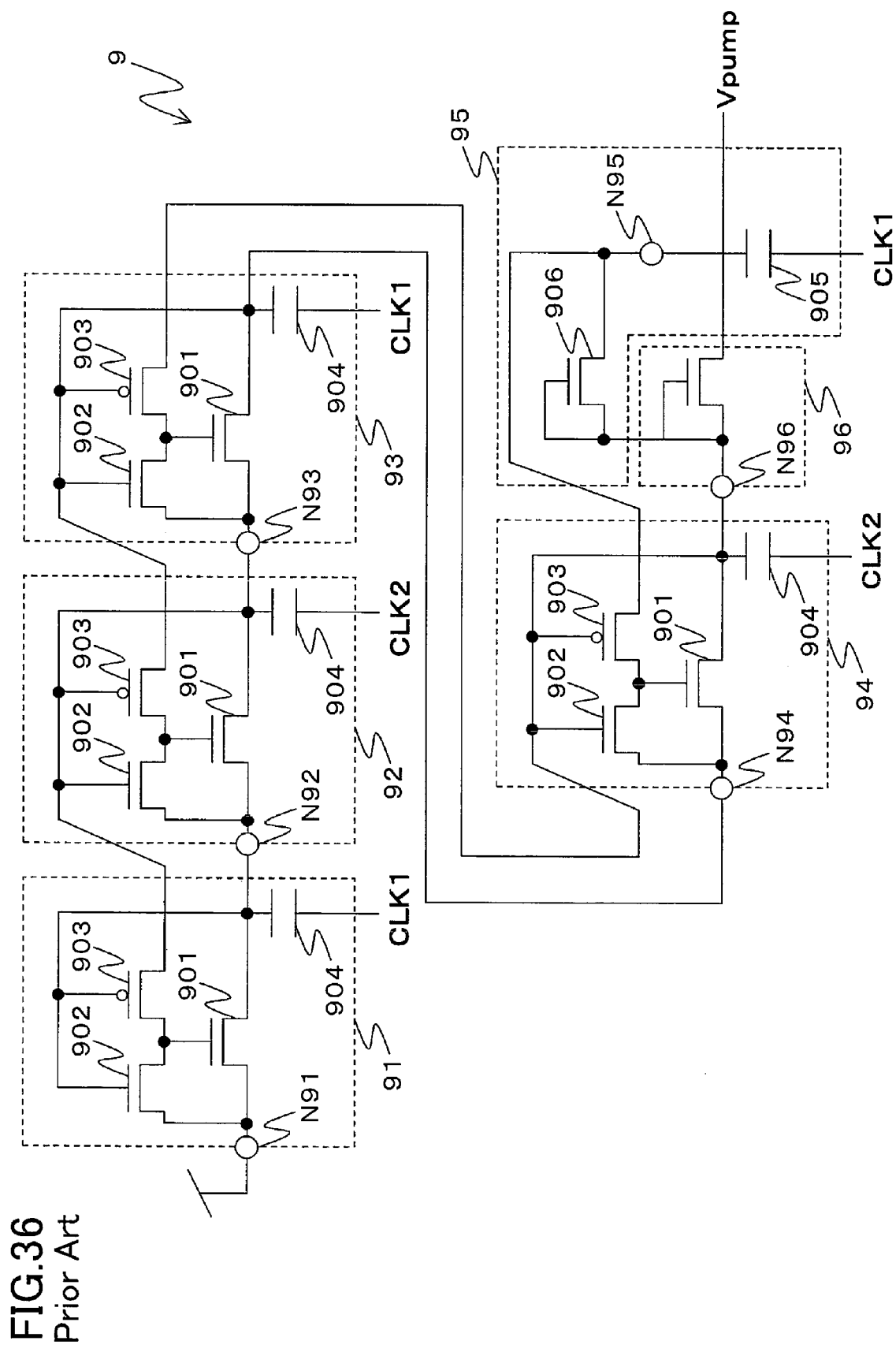
FIG. 36 is a circuit diagram showing the structure of a conventional charge pump circuit.
Figure 37:
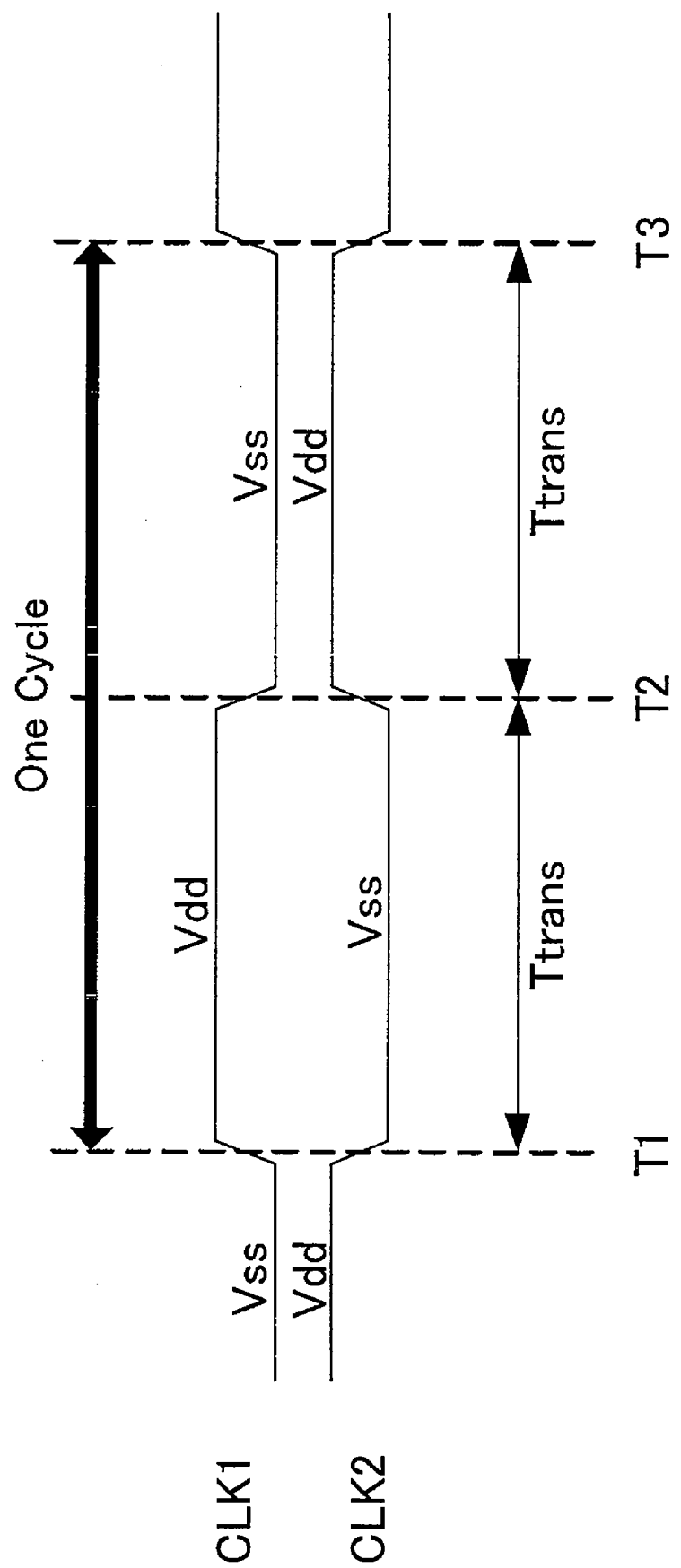
FIG. 37 is a timing chart showing signal waveforms, which illustrates an operation of the charge pump circuit shown in FIG. 36.

In each of the above-described embodiments, the charge pump circuit receives supply voltage VDD to generate positive pumped voltage Vpump. However, as shown in FIG. 31, the charge pump circuit may receive the ground voltage to generate negative pumped voltage Vnpump. For example, in the charge pump circuit 1 of embodiment 1, generation of negative pumped voltage Vnpump can be achieved by inverting the polarity of transistors in each of the initial stage cell 11, the pump cells 12 and 13 and the anti-backflow cell 14. Specifically, as shown in FIG. 32, FIG. 33 and FIG. 34, the charge transfer transistor 101 and the off-switch transistor 102 are changed from P-type to N-type, and the on-switch transistor 103 is changed from N-type to P-type. With such an arrangement, voltages V11m to V14m and V11n to V14n change in response to clock signals CLK1 and CLK2 as shown in FIG. 35.

When the pump cells 12, 22, 32, 32a, 42 and 42a are used to form a negative voltage generating charge pump circuit, the charge transfer transistor 101 can be formed by an N-type transistor. Therefore, the gate-substrate potential difference of the charge transfer transistor 101 can be decreased, and the breakdown voltage limit on the charge transfer transistor 101 can be further alleviated.

Also in the charge pump circuits of embodiments 5, 6 and 7, generation of a negative pumped voltage is achieved by inverting the polarity of transistors in the initial stage cells, pump cells and anti-backflow cells.

Other Embodiments

In each of the above-described embodiments, a diode element (or diode-connected transistor) may be provided in parallel with the charge transfer transistor between the input node N105 and the output node N106 in the initial stages, pump stages and anti-backflow circuits. This diode element transfers the charge from the input node N105 to the output node N106 in a unidirectional (irreversible) fashion.

Alternatively, in each of the above-described embodiments, a diode element (or diode-connected transistor), one end of which is connected to the power supply node and the other end connected to the source of the charge transfer transistor, may be provided in each of the initial stages, pump stages and anti-backflow circuits. This diode element transfers the charge from the power supply node to the source of the charge transfer transistor in a unidirectional (irreversible) fashion.

The timings of transition of clock signals CLK1 and CLK2 may be different or may be synchronous.

It should be noted that the charge pump circuit may be formed using pump cells of the same type or may be formed using two or more types of pump cells. For example, the initial stage cell 11 of FIG. 3, the pump cell 22 of FIG. 6, the pump cell 32 of FIG. 9, the pump cell 42 of FIG. 12 and the anti-backflow cell 24 of FIG. 8 may be formed as an initial stage cell (pump cell at the first circuit stage), a pump cell at the second circuit stage, a pump cell at the third circuit stage, a pump cell at the fourth circuit stage and an anti-backflow cell, respectively.

The charge pump circuit of this invention is useful for power supply circuits which are used in nonvolatile semiconductor memories, volatile semiconductor devices (DRAM and the like), liquid crystal devices, portable devices, etc., and power supply generation circuits which are used for improving the analog circuit characteristics in the CMOS processes.

What is claimed is:

1. A charge pump circuit which performs a charge pump operation in response to complementary first and second clock signals to generate a pumped voltage, the charge pump circuit comprising:

a first pump stage arranged in a first pump stage row and in a first pump cell; and a second pump stage arranged in a second pump stage row different from the first pump stage row and in the first pump cell, wherein:

each of the first pump stage and the second pump stage includes:

an input node;

an output node;

a charge transfer transistor, one end of which is connected to the output node, and the other end of which is connected to the input node;

a pump capacitor, one end of which is connected to the output node, and the other end of which receives one of the first and second clock signals; and a connection switcher connected to a gate of the charge transfer transistor and having two control nodes, the input node of the first pump stage and the output node of the second pump stage are connected to said two control nodes of the connection switcher of the first pump stage, respectively, and the pump capacitor of the first pump stage receives one of the first and second clock signals and the pump capacitor of the second pump stage receives the other one of the first and second clock signals.

2. The charge pump circuit of claim 1, wherein the connection switcher of the first pump stage switches a voltage between a voltage of the output node of the first pump stage and a voltage of the input node of the second pump stage to control the charge transfer transistor of the first pump stage.

3. A charge pump circuit which performs a charge pump operation in response to complementary first and second clock signals to generate a pumped voltage, the charge pump circuit comprising:

a first pump stage arranged in a first pump stage row and in a first pump cell; and a second pump stage arranged in a second pump stage row different from the first pump stage row and in the first pump cell, wherein:

each of the first pump stage and the second pump stage includes:

an input node;

an output node;

a charge transfer transistor, one end of which is connected to the output node, and the other end of which is connected to the input node;

a pump capacitor, one end of which is connected to the output node, and the other end of which receives one of the first and second clock signals; and a connection switcher connected to a gate of the charge transfer transistor and having two control nodes, the output node of the first pump stage and the input node of the second pump stage are connected to said two control nodes of the connection switcher of the first pump stage, respectively, and the pump capacitor of the first pump stage receives one of the first and second clock signals and the pump capacitor of the second pump stage receives the other one of the first and second clock signals.

4. The charge pump circuit of claim 3, wherein
the connection switcher of the first pump stage switches a voltage between a voltage of the input node of the first pump stage and a voltage of the output node of the second pump stage to control the charge transfer transistor of the first pump stage.

5. A charge pump circuit which performs a charge pump operation in response to complementary first and second clock signals to generate a pumped voltage, the charge pump circuit comprising:
 a first pump stage arranged in a first pump stage row and in a first pump cell; and
 a second pump stage arranged in a second pump stage row different from the first pump stage row and in the first pump cell; and
 an analog comparator circuit, wherein:
 each of the first pump stage and the second pump stage includes:
  an input node;
  an output node;
  a first charge transfer transistor, one end of which is connected to the output node, and the other end of which is connected to the input node;
  a pump capacitor, one end of which is connected to the output node, and the other end of which receives one of the first and second clock signals; and
  a connection switcher connected to a gate of the first charge transfer transistor, and
 the analog comparator circuit compares a voltage of the input node of the first pump stage with a voltage of the input node of the second pump stage, and
 an output node of the analog comparator circuit is connected to a control node of the connection switcher of the first pump stage and to a control node of the connection switcher of the second pump stage, and
 the pump capacitor of the first pump stage receives one of the first and second clock signals and the pump capacitor of the second pump stage receives the other one of the first and second clock signals.

6. The charge pump circuit of claim 5, further comprising:
 a second charge transfer transistor, one end of which is connected to the input node of the first pump stage, and the other end of which is connected to the first charge transfer transistor of the first pump stage; and
 a third charge transfer transistor, one end of which is connected to the input node of the second pump stage, and the other end of which is connected to the first charge transfer transistor of the second pump stage.

7. The charge pump circuit of claim 5, wherein
the connection switcher of the first pump stage switches a voltage between a voltage of the output node of the first pump stage and a voltage of the input node of the second pump stage to control the first charge transfer transistor of the first pump stage.

8. A charge pump circuit which performs a charge pump operation in response to complementary first and second clock signals to generate a pumped voltage, the charge pump circuit comprising:
 a first pump stage arranged in a first pump stage row and in a first pump cell; and
 a second pump stage arranged in a second pump stage row different from the first pump stage row and in the first pump cell; and
 an analog comparator circuit, wherein:
 each of the first pump stage and the second pump stage includes:
  an input node;
  an output node;
  a first charge transfer transistor, one end of which is connected to the output node, and the other end of which is connected to the input node;
  a pump capacitor, one end of which is connected to the output node, and the other end of which receives one of the first and second clock signals; and
  a connection switcher connected to a gate of the first charge transfer transistor, and
 the analog comparator circuit compares a voltage of the output node of the first pump stage with a voltage of the output node of the second pump stage, and
 an output node of the analog comparator circuit is connected to a control node of the connection switcher of the first pump stage and to a control node of the connection switcher of the second pump stage, and
 the pump capacitor of the first pump stage receives one of the first and second clock signals and the pump capacitor of the second pump stage receives the other one of the first and second clock signals.

9. The charge pump circuit of claim 8, further comprising:
 a second charge transfer transistor, one end of which is connected to the input node of the first pump stage, and the other end of which is connected to the first charge transfer transistor of the first pump stage; and
 a third charge transfer transistor, one end of which is connected to the input node of the second pump stage, and the other end of which is connected to the first charge transfer transistor of the second pump stage.

10. The charge pump circuit of claim 8, wherein
the connection switcher of the first pump stage switches a voltage between a voltage of the input node of the first pump stage and a voltage of the output node of the second pump stage to control the first charge transfer transistor of the first pump stage.

* * * * *